United States Patent
Gardner et al.

(10) Patent No.: US 11,738,562 B2
(45) Date of Patent: *Aug. 29, 2023

(54) LOGIC CIRCUITRY

(71) Applicant: Hewlett-Packard Development Company, L.P., Spring, TX (US)

(72) Inventors: James Michael Gardner, Corvallis, OR (US); Scott A. Linn, Corvallis, OR (US); Stephen D. Panshin, Corvallis, OR (US); Jefferson P. Ward, Vancouver, WA (US); David Owen Roethig, Vancouver, WA (US); David N. Olsen, Corvallis, OR (US); Anthony D. Studer, Corvallis, OR (US); Michael W. Cumbie, Corvallis, OR (US); Sirena Chi Lu, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,662

(22) Filed: Jul. 14, 2022

(65) Prior Publication Data

US 2022/0348022 A1 Nov. 3, 2022

Related U.S. Application Data

(63) Continuation of application No. 16/965,231, filed as application No. PCT/US2019/026145 on Apr. 5, (Continued)

(51) Int. Cl.
*B41J 2/175* (2006.01)
*B41J 29/393* (2006.01)
(Continued)

(52) U.S. Cl.
CPC .......... *B41J 2/17546* (2013.01); *B33Y 50/00* (2014.12); *B41J 2/1752* (2013.01); *B41J 2/1753* (2013.01);
(Continued)

(58) Field of Classification Search
CPC ............. B41J 2/17546; G03G 15/0856; G03G 15/0863; G03G 21/1878; G03G 21/1882;
(Continued)

(56) References Cited

U.S. PATENT DOCUMENTS 3,109,125 A 10/1963 Wachowiak
3,553,483 A 1/1971 Jarvis
(Continued)

FOREIGN PATENT DOCUMENTS

AU 2014202104 A1 5/2014
CA 2507422 A1 1/2002
(Continued)

OTHER PUBLICATIONS

"The I2C-Bus Specification Version 2.1," retrieved at https://www.csd.uoc.gr/~hy428/reading/i2c_spec.pdf, Jan. 2000, 46 pages.
(Continued)

*Primary Examiner* — Anh T Vo
(74) *Attorney, Agent, or Firm* — Foley & Lardner LLP

(57) ABSTRACT

A logic circuitry package for a replaceable print apparatus component comprises an interface to communicate with a print apparatus logic circuit, and at least one logic circuit. The logic circuit may be configured to identify, from a command stream received from the print apparatus, parameters including a class parameter, and/or identify, from the command stream, a read request, and output, via the interface, a count value in response to a read request, the count value based on identified received parameters.

20 Claims, 21 Drawing Sheets

Related U.S. Application Data 2019, now Pat. No. 11,427,010, and a continuation of application No. PCT/US2018/063630, filed on Dec. 3, 2018, and a continuation of application No. PCT/US2018/063638, filed on Dec. 3, 2018, and a continuation of application No. PCT/US2018/063631, filed on Dec. 3, 2018, and a continuation of application No. PCT/US2018/063643, filed on Dec. 3, 2018, and a continuation of application No. PCT/US2018/063624, filed on Dec. 3, 2018.

(51) Int. Cl.
| | |
|---|---|
| *G01L 23/08* | (2006.01) |
| *G06F 13/42* | (2006.01) |
| *G06F 21/44* | (2013.01) |
| *G06K 15/00* | (2006.01) |
| *B33Y 50/00* | (2015.01) |
| *G03G 15/08* | (2006.01) |
| *G06K 15/10* | (2006.01) |
| *G06F 9/30* | (2018.01) |
| *G06F 21/62* | (2013.01) |
| *H04L 9/08* | (2006.01) |
| *H04L 9/32* | (2006.01) |

(52) U.S. Cl.
CPC ....... *B41J 2/17513* (2013.01); *B41J 2/17523* (2013.01); *B41J 2/17526* (2013.01); *B41J 2/17553* (2013.01); *B41J 2/17556* (2013.01); *B41J 2/17559* (2013.01); *B41J 2/17566* (2013.01); *B41J 29/393* (2013.01); *G01L 23/08* (2013.01); *G03G 15/0856* (2013.01); *G03G 15/0863* (2013.01); *G06F 9/30105* (2013.01); *G06F 13/42* (2013.01); *G06F 13/4282* (2013.01); *G06F 21/44* (2013.01); *G06F 21/62* (2013.01); *G06K 15/102* (2013.01); *G06K 15/4075* (2013.01); *H04L 9/0819* (2013.01); *H04L 9/3242* (2013.01); *B41J 2002/17516* (2013.01); *B41J 2002/17579* (2013.01); *B41J 2002/17586* (2013.01); *B41J 2202/13* (2013.01); *B41J 2202/20* (2013.01); *G05B 2219/49023* (2013.01); *G06F 2213/0016* (2013.01); *G06F 2213/40* (2013.01)

(58) Field of Classification Search
CPC ........ G06F 13/42; G06F 21/44; G06F 21/445; G06F 21/60; G06F 21/608; G06F 21/62; G06F 2213/0016; G06F 2213/40; G06G 13/4282; G06K 15/4075
See application file for complete search history.

(56) References Cited

U.S. PATENT DOCUMENTS

| | | |
|---|---|---|
| 3,614,576 A | 10/1971 | Raphael |
| 4,074,284 A | 2/1978 | Dexter et al. |
| 4,503,441 A | 3/1985 | Tamukai |
| 4,506,276 A | 3/1985 | Kyser et al. |
| 4,639,738 A | 1/1987 | Young et al. |
| 4,734,787 A | 3/1988 | Hayashi |
| 5,001,596 A | 3/1991 | Hart |
| 5,045,811 A | 9/1991 | Lewis |
| 5,079,570 A | 1/1992 | Mohr et al. |
| 5,142,909 A | 9/1992 | Baughman |
| 5,329,254 A | 7/1994 | Takano |
| 5,438,351 A | 8/1995 | Trenchard et al. |
| 5,471,176 A | 11/1995 | Henson et al. |
| 5,583,544 A | 12/1996 | Stamer et al. |
| 5,680,960 A | 10/1997 | Keyes et al. |
| 5,682,184 A | 10/1997 | Stephany et al. |
| 5,699,091 A | 12/1997 | Bullock et al. |
| 5,731,824 A | 3/1998 | Kneezel et al. |
| 5,751,323 A | 5/1998 | Swanson et al. |
| 5,757,406 A | 5/1998 | Kaplinsky et al. |
| 5,777,646 A | 7/1998 | Barinaga et al. |
| 5,788,388 A | 8/1998 | Cowger et al. |
| 5,861,780 A | 1/1999 | Fukuda |
| 5,975,688 A | 11/1999 | Kanaya et al. |
| 6,068,363 A | 5/2000 | Saito |
| 6,098,457 A | 8/2000 | Poole |
| 6,151,039 A | 11/2000 | Hmelar et al. |
| 6,164,766 A | 12/2000 | Erickson |
| 6,175,929 B1 | 1/2001 | Hsu et al. |
| 6,219,933 B1 | 4/2001 | Taniguchi et al. |
| 6,299,273 B1 | 10/2001 | Anderson et al. |
| 6,312,074 B1 | 11/2001 | Walker |
| 6,341,853 B1 | 1/2002 | Scheffelin et al. |
| 6,386,693 B1 | 5/2002 | Michele et al. |
| 6,402,299 B1 | 6/2002 | Demeerleer et al. |
| 6,412,901 B2 | 7/2002 | Su et al. |
| 6,431,670 B1 | 8/2002 | Schantz et al. |
| 6,456,802 B1 | 9/2002 | Phillips |
| 6,457,355 B1 | 10/2002 | Philipp |
| 6,494,553 B1 | 12/2002 | Donahue et al. |
| 6,494,568 B2 | 12/2002 | Hou et al. |
| 6,542,844 B1 | 4/2003 | Hanna |
| 6,598,963 B1 | 7/2003 | Yamamoto et al. |
| 6,641,240 B2 | 11/2003 | Hsu et al. |
| 6,641,243 B2 | 11/2003 | Anderson et al. |
| 6,648,434 B2 | 11/2003 | Walker et al. |
| 6,685,290 B1 | 2/2004 | Farr et al. |
| 6,736,497 B2 | 5/2004 | Jung |
| 6,796,644 B1 | 9/2004 | Anderson et al. |
| 6,802,581 B2 | 10/2004 | Hasseler et al. |
| 6,802,602 B2 | 10/2004 | Sakai et al. |
| 6,811,250 B2 | 11/2004 | Buchanan et al. |
| 6,902,256 B2 | 6/2005 | Anderson et al. |
| 6,908,179 B2 | 6/2005 | Pan et al. |
| 6,959,599 B2 | 11/2005 | Feldstein et al. |
| 6,966,222 B2 | 11/2005 | Carlson et al. |
| 6,969,137 B2 | 11/2005 | Maeda |
| 7,039,734 B2 | 5/2006 | Sun et al. |
| 7,077,506 B2 | 7/2006 | Chen |
| 7,155,972 B2 | 1/2007 | Kosugi |
| 7,171,323 B2 | 1/2007 | Shipton et al. |
| 7,240,130 B2 | 7/2007 | Larson et al. |
| 7,260,662 B2 | 8/2007 | Moriwaki et al. |
| 7,328,115 B2 | 2/2008 | Shipton et al. |
| 7,380,042 B2 | 5/2008 | Wang et al. |
| 7,458,656 B2 | 12/2008 | Smith |
| 7,533,960 B2 | 5/2009 | Yasuda et al. |
| 7,547,082 B2 | 6/2009 | Lee et al. |
| 7,630,304 B2 | 12/2009 | Larson et al. |
| 7,686,423 B2 | 3/2010 | Sato et al. |
| 7,740,347 B2 | 6/2010 | Silverbrook et al. |
| 7,775,638 B2 | 8/2010 | Hirosawa et al. |
| 7,841,712 B2 | 11/2010 | Muyskens et al. |
| 7,886,197 B2 | 2/2011 | Wegman |
| 7,890,690 B2 | 2/2011 | Naderi et al. |
| 7,970,042 B2 | 6/2011 | Hardin et al. |
| 8,040,215 B2 | 10/2011 | Zakriti |
| 8,161,224 B2 | 4/2012 | Laurencin et al. |
| 8,215,018 B2 | 7/2012 | Morita et al. |
| 8,220,910 B2 | 7/2012 | Wanibe |
| 8,224,602 B2 | 7/2012 | Lory et al. |
| 8,289,788 B2 | 10/2012 | Asauchi |
| 8,331,581 B2 | 12/2012 | Pennock |
| 8,348,377 B2 | 1/2013 | Asauchi |
| 8,350,628 B1 | 1/2013 | Bennett |
| 8,364,859 B2 | 1/2013 | Sato |
| 8,386,657 B2 | 2/2013 | Adkins et al. |
| 8,393,718 B2 | 3/2013 | Kida et al. |
| 8,393,721 B2 | 3/2013 | Katoh et al. |
| 8,429,437 B2 | 4/2013 | Asauchi |
| 8,432,421 B2 | 4/2013 | Muraki et al. |
| 8,438,919 B2 | 5/2013 | Phillips et al. |
| 8,454,137 B2 | 6/2013 | Price et al. |
| 8,556,394 B2 | 10/2013 | Chen et al. |
| 8,558,577 B1 | 10/2013 | Soriano et al. |

(56) References Cited

U.S. PATENT DOCUMENTS

| | | |
|---|---|---|
| 8,562,091 B2 | 10/2013 | Sabanovic et al. |
| 8,591,012 B2 | 11/2013 | Yoshino et al. |
| 8,608,276 B2 | 12/2013 | Oohashi et al. |
| 8,621,116 B2 | 12/2013 | Fister et al. |
| 8,651,614 B2 | 2/2014 | Sakamoto et al. |
| 8,651,643 B2 | 2/2014 | Harvey et al. |
| 8,721,059 B2 | 5/2014 | Kodama et al. |
| 8,721,203 B2 | 5/2014 | Ehrhardt, Jr. |
| 8,752,943 B2 | 6/2014 | Hirano et al. |
| 8,864,277 B2 | 10/2014 | Rice et al. |
| 8,876,257 B2 | 11/2014 | Harada et al. |
| 8,888,207 B2 | 11/2014 | Furness et al. |
| 8,892,798 B2 | 11/2014 | Tailliet et al. |
| 8,898,358 B2 | 11/2014 | Decesaris et al. |
| 8,978,487 B2 | 3/2015 | Fergusson et al. |
| 8,990,467 B2 | 3/2015 | Saito |
| 9,079,414 B2 | 7/2015 | Lester et al. |
| 9,108,448 B1 | 8/2015 | Bergstedt |
| 9,132,656 B2 | 9/2015 | Nicholson et al. |
| 9,137,093 B1 | 9/2015 | Abraham et al. |
| 9,176,921 B2 | 11/2015 | Fister et al. |
| 9,194,734 B2 | 11/2015 | Mehrer et al. |
| 9,213,395 B2 | 12/2015 | Samson et al. |
| 9,213,396 B1 | 12/2015 | Booth et al. |
| 9,213,927 B1 | 12/2015 | Ahne |
| 9,254,661 B2 | 2/2016 | Otaka et al. |
| 9,298,908 B1 | 3/2016 | Booth et al. |
| 9,370,934 B2 | 6/2016 | Asauchi et al. |
| 9,400,204 B2 | 7/2016 | Schoenberg |
| 9,413,356 B1 | 8/2016 | McKinley |
| 9,413,359 B2 | 8/2016 | Stirk |
| 9,454,504 B2 | 9/2016 | Evans |
| 9,483,003 B2 | 11/2016 | Thacker, III |
| 9,487,017 B2 | 11/2016 | Ge et al. |
| 9,496,884 B1 | 11/2016 | Azenkot et al. |
| 9,511,596 B2 | 12/2016 | Anderson et al. |
| 9,561,662 B2 | 2/2017 | Ward et al. |
| 9,582,443 B1 | 2/2017 | Switzer et al. |
| 9,599,500 B2 | 3/2017 | Ge et al. |
| 9,619,663 B2 | 4/2017 | Refstrup |
| 9,671,820 B2 | 6/2017 | Maruyama et al. |
| 9,734,121 B2 | 8/2017 | Pitigoi-Aron |
| 9,738,087 B2 | 8/2017 | Kato et al. |
| 9,746,799 B2 | 8/2017 | Jeran |
| 9,770,914 B2 | 9/2017 | Harvey et al. |
| 9,776,412 B2 | 10/2017 | Ge et al. |
| 9,789,697 B1 | 10/2017 | Knierim et al. |
| 9,796,178 B2 | 10/2017 | Maxfield |
| 9,852,282 B2 | 12/2017 | Jeran et al. |
| 9,876,794 B2 | 1/2018 | Adkins et al. |
| 9,895,917 B2 | 2/2018 | Corvese et al. |
| 9,914,306 B2 | 3/2018 | Jeran |
| 9,922,276 B2 | 3/2018 | Fister et al. |
| 9,994,036 B2 | 6/2018 | Angulo et al. |
| 10,031,882 B2 | 7/2018 | Srivastava |
| 10,052,878 B2 | 8/2018 | Bonneton |
| 10,107,667 B2 | 10/2018 | Cumbie et al. |
| 10,146,608 B2 | 12/2018 | Giovannini et al. |
| 10,155,379 B2 | 12/2018 | Ng et al. |
| 10,214,018 B2 | 2/2019 | Nozawa et al. |
| 10,214,019 B2 | 2/2019 | Gampbell-Brown et al. |
| 10,259,230 B2 | 4/2019 | Asauchi |
| 10,279,594 B2 | 5/2019 | Horade et al. |
| 10,338,838 B2 | 7/2019 | Olarig |
| 10,412,461 B2 | 9/2019 | Long et al. |
| 10,471,725 B2 | 11/2019 | Esterberg et al. |
| 10,875,318 B1 | 12/2020 | Gardner et al. |
| 10,894,423 B2 | 1/2021 | Gardner et al. |
| 11,034,157 B2 | 6/2021 | Gardner et al. |
| 2001/0029554 A1 | 10/2001 | Namba |
| 2001/0033316 A1 | 10/2001 | Eida |
| 2002/0012016 A1 | 1/2002 | Wilson et al. |
| 2002/0012616 A1 | 1/2002 | Zhou et al. |
| 2002/0033855 A1 | 3/2002 | Kubota et al. |
| 2002/0109761 A1 | 8/2002 | Shimizu et al. |
| 2002/0129650 A1 | 9/2002 | Zimmermann et al. |
| 2002/0154181 A1 | 10/2002 | Kubota et al. |
| 2003/0009595 A1 | 1/2003 | Collins |
| 2003/0018300 A1 | 1/2003 | Duchon et al. |
| 2003/0071862 A1 | 4/2003 | Tsukada et al. |
| 2003/0202024 A1 | 10/2003 | Corrigan |
| 2004/0021711 A1 | 2/2004 | Hasseler et al. |
| 2004/0036733 A1 | 2/2004 | Kubota et al. |
| 2004/0085382 A1 | 5/2004 | Kosugi et al. |
| 2004/0155913 A1 | 8/2004 | Kosugi et al. |
| 2004/0252146 A1 | 12/2004 | Naka et al. |
| 2005/0010910 A1 | 1/2005 | Lindhorst et al. |
| 2005/0093910 A1 | 5/2005 | Im |
| 2005/0125105 A1 | 6/2005 | Halstead et al. |
| 2005/0126282 A1 | 6/2005 | Maatuk |
| 2005/0185595 A1 | 8/2005 | Lee |
| 2005/0229699 A1 | 10/2005 | Chai et al. |
| 2006/0007253 A1 | 1/2006 | Kosugi |
| 2006/0007295 A1 | 1/2006 | Ueda |
| 2006/0072952 A1 | 4/2006 | Walmsley et al. |
| 2006/0110199 A1 | 5/2006 | Walmsley et al. |
| 2006/0181583 A1 | 8/2006 | Usuda |
| 2006/0181719 A1 | 8/2006 | Aoki et al. |
| 2006/0221386 A1 | 10/2006 | Brooks et al. |
| 2006/0244795 A1 | 11/2006 | Hayasaki et al. |
| 2006/0268030 A1 | 11/2006 | Walmsley et al. |
| 2006/0274103 A1 | 12/2006 | Kim |
| 2006/0290723 A1 | 12/2006 | Jeong |
| 2007/0024650 A1 | 2/2007 | Reinten et al. |
| 2007/0068249 A1 | 3/2007 | Eguchi et al. |
| 2007/0088816 A1 | 4/2007 | Hrustemovic et al. |
| 2007/0115307 A1 | 5/2007 | Smith |
| 2007/0146409 A1 | 6/2007 | Kubota et al. |
| 2007/0247497 A1 | 10/2007 | Buchanan et al. |
| 2008/0018724 A1 | 1/2008 | Silverbrook et al. |
| 2008/0024555 A1 | 1/2008 | Kimura |
| 2008/0041152 A1 | 2/2008 | Schoenberg |
| 2008/0107151 A1 | 5/2008 | Khadkikar et al. |
| 2008/0129779 A1 | 6/2008 | Walmsley et al. |
| 2008/0143476 A1 | 6/2008 | Kwok et al. |
| 2008/0165232 A1 | 7/2008 | Yuen |
| 2008/0192074 A1 | 8/2008 | Dubois et al. |
| 2008/0211838 A1 | 9/2008 | Zhang |
| 2008/0246626 A1 | 10/2008 | Sheafor et al. |
| 2008/0298455 A1 | 12/2008 | Greenblat et al. |
| 2008/0307134 A1 | 12/2008 | Geissler et al. |
| 2009/0013779 A1 | 1/2009 | Usui et al. |
| 2009/0021766 A1 | 1/2009 | Yamazaki |
| 2009/0177823 A1 | 7/2009 | Chao |
| 2009/0179678 A1 | 7/2009 | Hardin et al. |
| 2009/0222886 A1 | 9/2009 | Lee et al. |
| 2009/0290005 A1 | 11/2009 | Wanibe et al. |
| 2009/0309941 A1 | 12/2009 | Price et al. |
| 2010/0082271 A1 | 4/2010 | McCann et al. |
| 2010/0138745 A1 | 6/2010 | McNamara et al. |
| 2010/0205350 A1 | 8/2010 | Bryant-Rich |
| 2010/0220128 A1 | 9/2010 | Zaba et al. |
| 2010/0248208 A1 | 9/2010 | Okubo et al. |
| 2010/0254202 A1 | 10/2010 | Asauchi |
| 2010/0257327 A1 | 10/2010 | Kosugi |
| 2010/0306431 A1 | 12/2010 | Adkins et al. |
| 2011/0009938 A1 | 1/2011 | Dowling |
| 2011/0029705 A1 | 2/2011 | Evans |
| 2011/0050793 A1 | 3/2011 | Kumagai et al. |
| 2011/0087914 A1 | 4/2011 | Files et al. |
| 2011/0113171 A1 | 5/2011 | Radhakrishnan et al. |
| 2011/0131441 A1 | 6/2011 | Asauchi |
| 2011/0134479 A1 | 6/2011 | Refstrup |
| 2011/0279530 A1 | 11/2011 | Love et al. |
| 2011/0285027 A1 | 11/2011 | Lee |
| 2011/0304664 A1 | 12/2011 | Kubo et al. |
| 2012/0056954 A1 | 3/2012 | Asauchi et al. |
| 2012/0128379 A1 | 5/2012 | Takeda |
| 2012/0134687 A1 | 5/2012 | Jones et al. |
| 2012/0243559 A1 | 9/2012 | Pan et al. |
| 2012/0284429 A1 | 11/2012 | Adkins et al. |
| 2012/0299989 A1 | 11/2012 | Prothon et al. |
| 2013/0018513 A1 | 1/2013 | Metselaar |
| 2013/0054933 A1 | 2/2013 | Fister et al. |

(56) References Cited

U.S. PATENT DOCUMENTS

| | | |
|---|---|---|
| 2013/0067015 A1 | 3/2013 | Vasters |
| 2013/0067016 A1 | 3/2013 | Adkins et al. |
| 2013/0155142 A1 | 6/2013 | Browning et al. |
| 2013/0250024 A1 | 9/2013 | Kakishima |
| 2013/0295245 A1 | 11/2013 | Gardner et al. |
| 2014/0040517 A1 | 2/2014 | Fister et al. |
| 2014/0095750 A1 | 4/2014 | Tailliet |
| 2014/0164660 A1 | 6/2014 | Decesaris et al. |
| 2014/0211241 A1 | 7/2014 | Rice et al. |
| 2014/0260520 A1 | 9/2014 | Schoenberg |
| 2014/0265049 A1 | 9/2014 | Burris et al. |
| 2014/0288085 A1 | 9/2014 | Yadav |
| 2014/0337553 A1 | 11/2014 | Du et al. |
| 2014/0351469 A1 | 11/2014 | Fister et al. |
| 2014/0354729 A1 | 12/2014 | Vanbrocklin et al. |
| 2014/0372652 A1 | 12/2014 | Shu |
| 2014/0375321 A1 | 12/2014 | Ikeya |
| 2014/0375730 A1 | 12/2014 | Campbell-Brown et al. |
| 2015/0028671 A1 | 1/2015 | Ragaini et al. |
| 2015/0052996 A1 | 2/2015 | Niemann |
| 2015/0074304 A1 | 3/2015 | Adkins et al. |
| 2015/0089630 A1 | 3/2015 | Lee |
| 2015/0239254 A1 | 8/2015 | Muyskens et al. |
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1 | 4/2016 | Booth et al. |
| 2016/0114590 A1 | 4/2016 | Arpin |
| 2016/0279962 A1 | 9/2016 | Ishida et al. |
| 2016/0357691 A1 | 12/2016 | Ahne |
| 2016/0364305 A1 | 12/2016 | Pitigoi-Aron |
| 2016/0368273 A1 | 12/2016 | Ishikawa |
| 2017/0032135 A1 | 2/2017 | Refstrup |
| 2017/0050383 A1 | 2/2017 | Bell et al. |
| 2017/0063394 A1 | 3/2017 | Halbert et al. |
| 2017/0100941 A1 | 4/2017 | Kuribayashi |
| 2017/0144448 A1 | 5/2017 | Smith |
| 2017/0157929 A1 | 6/2017 | Yokoo et al. |
| 2017/0168976 A1 | 6/2017 | Yost |
| 2017/0169623 A1 | 6/2017 | Chen et al. |
| 2017/0182786 A1 | 6/2017 | Angulo et al. |
| 2017/0189011 A1 | 7/2017 | Stone et al. |
| 2017/0194913 A1 | 7/2017 | Wilson et al. |
| 2017/0230540 A1 | 8/2017 | Sasaki |
| 2017/0330449 A1 | 11/2017 | Lunardhi et al. |
| 2018/0050537 A1 | 2/2018 | Bakker et al. |
| 2018/0100753 A1 | 4/2018 | Cumbie et al. |
| 2018/0143935 A1 | 5/2018 | Cox et al. |
| 2018/0157943 A1 | 6/2018 | Fister et al. |
| 2018/0162137 A1 | 6/2018 | Van et al. |
| 2018/0212593 A1 | 7/2018 | Usuda |
| 2018/0264808 A1 | 9/2018 | Bakker et al. |
| 2018/0281394 A1 | 10/2018 | Horade et al. |
| 2018/0281438 A1 | 10/2018 | Horade et al. |
| 2018/0290457 A1 | 10/2018 | Ge et al. |
| 2018/0302110 A1 | 10/2018 | Solan |
| 2018/0304640 A1 | 10/2018 | Horne |
| 2019/0004991 A1 | 1/2019 | Foust et al. |
| 2019/0011306 A1 | 1/2019 | Cumbie et al. |
| 2019/0012663 A1 | 1/2019 | Masters |
| 2019/0013731 A1 | 1/2019 | Gritti |
| 2019/0023020 A1 | 1/2019 | Anderson |
| 2019/0061347 A1 | 2/2019 | Bakker et al. |
| 2019/0064408 A1 | 2/2019 | Smit |
| 2019/0097785 A1 | 3/2019 | Elenes |
| 2019/0111694 A1 | 4/2019 | Cumbie et al. |
| 2019/0111695 A1 | 4/2019 | Anderson et al. |
| 2019/0111696 A1 | 4/2019 | Anderson et al. |
| 2019/0118527 A1 | 4/2019 | Anderson et al. |
| 2019/0126631 A1 | 5/2019 | Anderson et al. |
| 2019/0137316 A1 | 5/2019 | Anderson et al. |
| 2019/0138484 A1 | 5/2019 | De et al. |
| 2019/0217628 A1 | 7/2019 | Horade et al. |
| 2019/0226930 A1 | 7/2019 | Cumbie et al. |
| 2019/0240985 A1 | 8/2019 | Ge et al. |
| 2020/0159689 A1 | 5/2020 | Koshisaka et al. |
| 2021/0334392 A1 | 10/2021 | Panshin et al. |

FOREIGN PATENT DOCUMENTS

| | | |
|---|---|---|
| CN | 1336588 A | 2/2002 |
| CN | 2603934 Y | 2/2004 |
| CN | 2734479 Y | 10/2005 |
| CN | 101318406 A | 12/2008 |
| CN | 101971134 A | 2/2011 |
| CN | 201761148 U | 3/2011 |
| CN | 102112959 A | 6/2011 |
| CN | 102231054 A | 11/2011 |
| CN | 102736627 A | 10/2012 |
| CN | 103879149 A | 6/2014 |
| CN | 203651218 U | 6/2014 |
| CN | 105760318 A | 7/2016 |
| CN | 107209743 A | 9/2017 |
| CN | 107924698 A | 4/2018 |
| CN | 108090010 A | 5/2018 |
| CN | 108819486 A | 11/2018 |
| CN | 209014461 U | 6/2019 |
| DE | 3712699 A1 | 11/1988 |
| EP | 0015954 B1 | 6/1984 |
| EP | 0720916 A2 | 7/1996 |
| EP | 0994779 A1 | 4/2000 |
| EP | 1164022 A2 | 12/2001 |
| EP | 1232871 A1 | 8/2002 |
| EP | 1238811 A1 | 9/2002 |
| EP | 1285764 A1 | 2/2003 |
| EP | 1314565 A2 | 5/2003 |
| EP | 1389531 A1 | 2/2004 |
| EP | 1524120 A2 | 4/2005 |
| EP | 1800872 A1 | 6/2007 |
| EP | 1839872 A1 | 10/2007 |
| EP | 2237163 A1 | 10/2010 |
| EP | 2385468 A1 | 11/2011 |
| EP | 2854063 A1 | 4/2015 |
| EP | 3208736 A1 | 8/2017 |
| GB | 2519181 A | 4/2015 |
| JP | 04-220353 A | 8/1992 |
| JP | 2001-292133 A | 10/2001 |
| JP | 2002-026471 A | 1/2002 |
| JP | 2003-326726 A | 11/2003 |
| JP | 2005-262458 A | 9/2005 |
| JP | 2009-258604 A | 11/2009 |
| JP | 2010-079199 A | 4/2010 |
| JP | 2011-113336 A | 6/2011 |
| JP | 2012-063770 A | 3/2012 |
| JP | 2013-197677 A | 9/2013 |
| JP | 2014-534917 A | 12/2014 |
| JP | 5644052 B2 | 12/2014 |
| JP | 2016-185664 A | 10/2016 |
| JP | 2017-196842 A | 11/2017 |
| JP | 2018-049141 A | 3/2018 |
| JP | 2018-136774 A | 8/2018 |
| JP | 2018-161785 A | 10/2018 |
| JP | 2018-531394 A | 10/2018 |
| KR | 10-2008-0003539 A | 1/2008 |
| KR | 10-1785051 B1 | 10/2017 |
| TW | 200707209 A | 2/2007 |
| TW | 201202948 A | 1/2012 |
| TW | 201546620 A | 12/2015 |
| WO | 98/55318 A1 | 12/1998 |
| WO | 2007/107957 A1 | 9/2007 |
| WO | 2008/117194 A1 | 10/2008 |
| WO | 2009/145774 A1 | 12/2009 |
| WO | 2012/020443 A1 | 2/2012 |
| WO | 2012/054050 A1 | 4/2012 |
| WO | 2012/057755 A1 | 5/2012 |
| WO | 2013/048430 A1 | 4/2013 |
| WO | 2015/116092 A1 | 8/2015 |
| WO | 2016/061480 A2 | 4/2016 |
| WO | 2016/114759 A1 | 7/2016 |
| WO | 2016/130157 A1 | 8/2016 |
| WO | 2017/074334 A1 | 5/2017 |
| WO | 2017/074342 A1 | 5/2017 |
| WO | 2017/174363 A1 | 10/2017 |

(56) References Cited

FOREIGN PATENT DOCUMENTS

| WO | 2017/184147 | A1 | 10/2017 |
|---|---|---|---|
| WO | 2017/189009 | A1 | 11/2017 |
| WO | 2017/189010 | A1 | 11/2017 |
| WO | 2017/189011 | A1 | 11/2017 |
| WO | 2017/189013 | A1 | 11/2017 |
| WO | 2018/017066 | A1 | 1/2018 |
| WO | 2018/022038 | A1 | 2/2018 |
| WO | 2018/186847 | A1 | 10/2018 |
| WO | 2018/199886 | A1 | 11/2018 |
| WO | 2018/199891 | A1 | 11/2018 |
| WO | 2018/199895 | A1 | 11/2018 |
| WO | 2018/217185 | A1 | 11/2018 |
| WO | 2019/017963 | A1 | 1/2019 |
| WO | 2019/078834 | A1 | 4/2019 |
| WO | 2019/078835 | A1 | 4/2019 |
| WO | 2019/078839 | A1 | 4/2019 |
| WO | 2019/078840 | A1 | 4/2019 |
| WO | 2019/078843 | A1 | 4/2019 |
| WO | 2019/078844 | A1 | 4/2019 |
| WO | 2019/078845 | A1 | 4/2019 |

OTHER PUBLICATIONS

Arnostech, "Thermal Inkjet Printers," retrieved at https://www.arnostech.com/machinery/, retrived on Jul. 1, 2019, 3 pages.
Epson, "Epson provides the best inks for the job," retrieved at https://www.epson.co.nz/microsite/excellence/inks_why.asp, retrieved on Jul. 1, 2019, 3 pages.
HP, "Development of the HP DeskJet 1200C Print Cartridge Platform", platform Development Team, Feb. 1994, 9 pages.
International Searching Authority "International Search Report and Written Opinion" issued in connection with PCT/US2018/063633 dated Jul. 23, 2019, 12 pages.
International Searching Authority "International Search Report and Written Opinion" issued in connection with PCT/US2019/026124 dated Aug. 26, 2019, 15 pages.
International Searching Authority "International Search Report and Written Opinion" issued in connection with PCT/US2019/026133 dated Aug. 26, 2019, 18 pages.
International Searching Authority "International Search Report and Written Opinion" issued in connection with PCT/US2019/026159 dated Aug. 13, 2019, 15 pages.
International Searching Authority "International Search Report and Written Opinion"issued in connection with PCT/US2018/063638 dated Aug. 26, 2019, 13 pages.
International Searching Authority "International Search Report and Written Opinion" issued in connection with PCT/US2018/063624 dated Aug. 23, 2019, 13 pages.
International Searching Authority "International Search Report and Written Opinion" issued in connection with PCT/US2018/063630 dated Aug. 22, 2019, 15 pages.
International Searching Authority "International Search Report and Written Opinion" issued in connection with PCT/US2018/063631 dated Aug. 23, 2019, 13 pages.
International Searching Authority "International Search Report and Written Opinion" issued in connection with PCT/US2018/063643 dated Aug. 20, 2019, 13 pages.
International Searching Authority "International Search Report and Written Opinion" issued in connection with PCT/US2019/017511 dated Jul. 25, 2019, 12 pages.
International Searching Authority "International Search Report and Written Opinion" issued in connection with PCT/US2019/026145 dated Sep. 5, 2019, 16 pages.
International Searching Authority "International Search Report and Written Opinion" issued in connection with PCT/US2019/026154 dated Sep. 5, 2019, 16 pages.
International Searching Authority "International Search Report and Written Opinion" issued in connection with PCT/US2019/026161 dated Aug. 26, 2019, 20 pages.
Laureto, J., et al., "Open Source Multi-Head 3D Printer for Polymer-Metal Composite Component Manufacturing," HAL archives, Apr. 26, 2019, pp. 1-23.
Maxim Integrated Products "1-to-8 I2C Bus Switches/Multiplexers with Bus Lock-Up Detection, Isolation, and Notification" retrieved at https://www.maximintegrated.com/en/products/analog/analog-switches-multiplexers/MAX7356.html, Sep. 2008, 22 pages.
NXP "Introducing A10006 Secure Authenticator Tamper-Resistant Anti Counterfeit Solution", retrieved at https://www.nxp.com/docs/en/supporting-information/A1006-Secure-Authenticator.pdf, retrieved on Jul. 3, 2019, 29 pages.
NXP Semiconductors N.V. "NXP 2-, 4-, and 8-channel I2C/SMBus muxes and switches PCA954x" retrieved at https://www.nxp.com/docs/en/brochure/75016529.pdf, Apr. 1, 2014, 34 pages.
NXP Semiconductors N.V. "PCA9641: 2-channel I2C-bus master arbiter Product data Sheet" retrieved at https://www.nxp.com/docs/en/data-sheet/PCA9641.pdf, Oct. 23, 2014, 77 pages.
Reddit, "Use an accelerometer to measure Z wobble", retrieved at https://www.reddit.com/r/Reprap/comments/6qsoyd/use_an_accelerometer_to_measure_z_wobble/, retrieved on Jul. 1, 2019, 3 pages.
United States Patent and Trademark Office, "Non-Final office action ," issued in connection with U.S. Appl. No. 16/502,479, dated Dec. 11, 2019, 13 pages.
United States Patent and Trademark Office, "Non-Final Office action," issued in connection with U.S. Appl. No. 16/460,016, dated Sep. 12, 2019, 12 pages.
United States Patent and Trademark Office, "Non-Final Office action," issued in connection with U.S. Appl. No. 16/505,090, dated Sep. 10, 2019, 20 pages.
United States Patent and Trademark Office, "Notice of Allowance," issued in connection with U.S. Appl. No. 16/505,090, dated Oct. 22, 2019, 5 Pages.
United States Patent and Trademark Office, "Notice of Allowance ," issued in connection with U.S. Appl. No. 16/502,479, dated Apr. 9, 2020, 9 pages.
United States Patent and Trademark Office, "Notice of allowance," issued in connection with U.S. Appl. No. 16/460,016, dated Mar. 25, 2020, 10 pages.
United States Patent and Trademark Office, "Notice of Allowance," issued in connection with U.S. Appl. No. 16/505,090, dated Feb. 12, 2020, 9 pages.
United States Patent and Trademark Office, "Restriction Requirement," issued in connection with U.S. Appl. No. 16/502,479, dated Aug. 15, 2019, 7 pages.
United States Patent and Trademark Office, "Notice of ,Allowance," Issued in connection with U.S. Appl. No. 16/728,207, dated Feb. 19, 2020 19 pages.

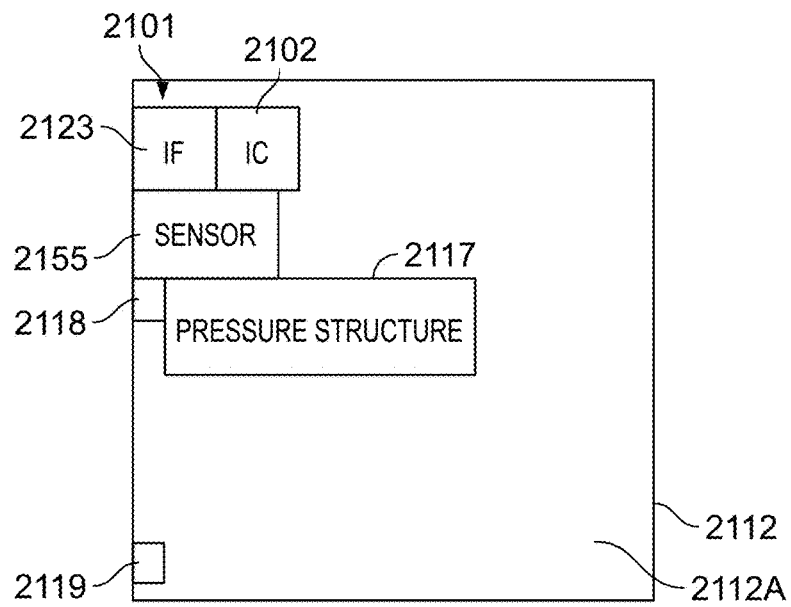
Fig. 21
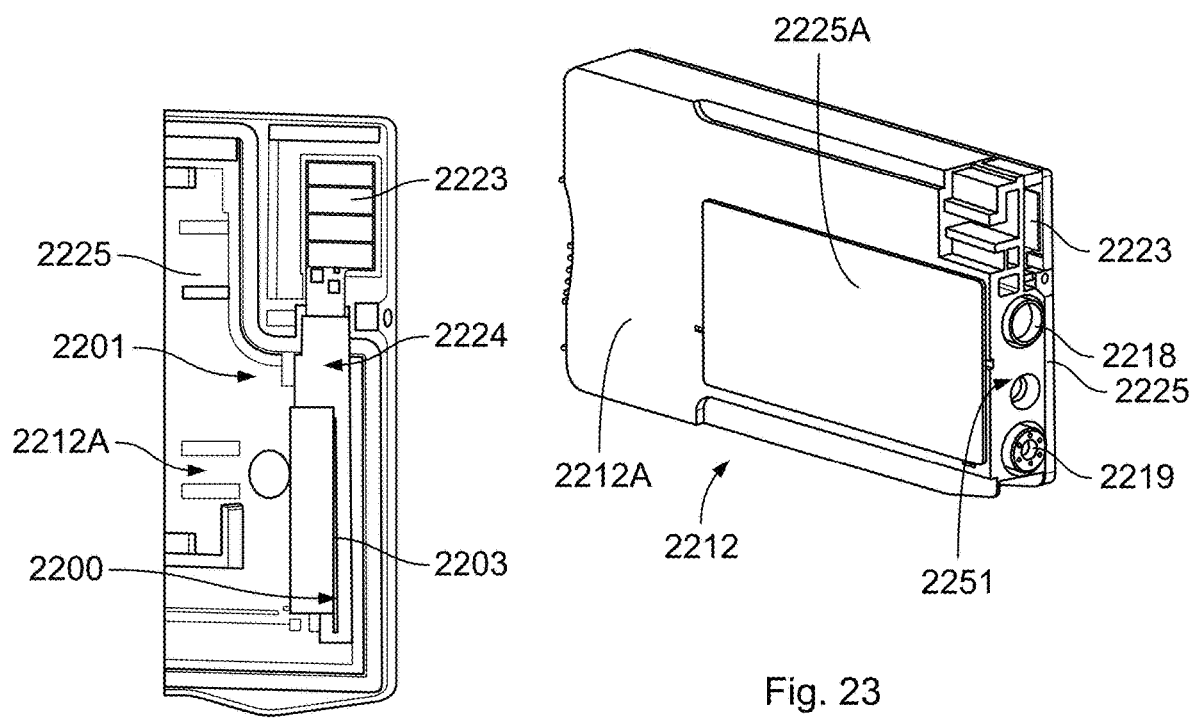
Fig. 22
Fig. 23

LOGIC CIRCUITRY

RELATED APPLICATIONS

This patent is a continuation of U.S. patent application Ser. No. 16/965,231, filed on Jul. 27, 2020, which is the U.S. national stage of International Patent Application Serial No. PCT/US2019/026145, filed Apr. 5, 2019, and entitled "LOGIC CIRCUITRY." International Patent Application Serial No. PCT/US2019/026145 claims priority to International Patent Application Serial No. PCT/US2018/063624, filed on Dec. 3, 2018; International Patent Application Serial No. PCT/US2018/063630, filed on Dec. 3, 2018; International Patent Application Serial No. PCT/US2018/063631, filed on Dec. 3, 2018; International Patent Application Serial No. PCT/US2018/063638, filed on Dec. 3, 2018; and International Patent Application Serial No. PCT/US2018/063643, filed on Dec. 3, 2018. International Patent Application Serial No. PCT/US2018/063624, International Patent Application Serial No. PCT/US2018/063630, International Patent Application Serial No. PCT/US2018/063631, International Patent Application Serial No. PCT/US2018/063638, International Patent Application Serial No. PCT/US2018/063643, International Patent Application Serial No. PCT/US2019/026145, and U.S. patent application Ser. No. 16/965,231 are hereby incorporated by reference in their entireties.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analogue communications may be used.

Some 2D and 3D printing systems include one or more replaceable print apparatus components, such as print material containers (e.g. inkjet cartridges, toner cartridges, ink supplies, 3D printing agent supplies, build material supplies etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status and the like. In further examples, print material containers may include circuitry to execute one or more monitoring functions such as print material level sensing.

BRIEF DESCRIPTION OF DRAWINGS

Non-limiting examples will now be described with reference to the accompanying drawings, in which:

FIG. 21 shows an example of a replaceable print component.

FIG. 22 shows an example of a portion of a replaceable print component.

FIG. 23 shows another example of a replaceable print component.

DETAILED DESCRIPTION

Figure 1:
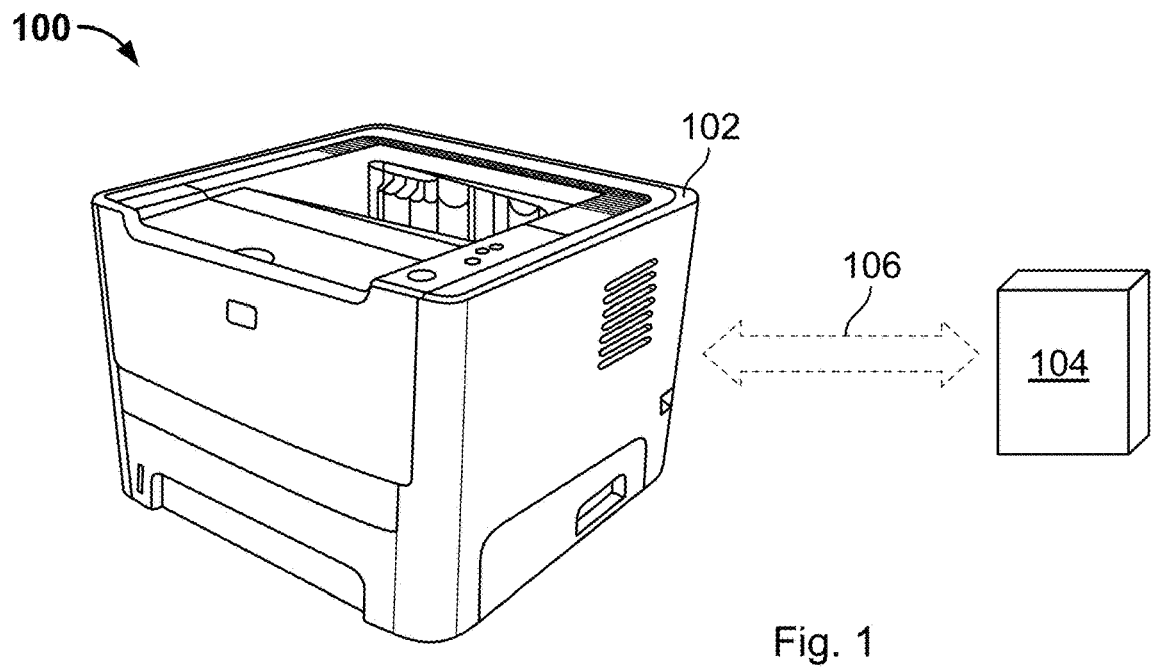
FIG. 1 is an example of a printing system.

Some examples of applications described herein in the context of print apparatus. However, not all the examples are limited to such applications, and at least some of the principles set out herein may be used in other contexts.

The contents of other applications and patents cited in this disclosure are incorporated by reference.

In certain examples, Inter-integrated Circuit ($I^2C$, or I2C, which notation is adopted herein) protocol allows at least one 'master' integrated circuit (IC) to communicate with at least one 'slave' IC, for example via a bus. I2C, and other communications protocols, communicate data according to a clock period. For example, a voltage signal may be generated, where the value of the voltage is associated with data. For example, a voltage value above x may indicate a logic "1" whereas a voltage value below x volts may indicate a logic "0", where x is a predetermined numerical value. By generating an appropriate voltage in each of a series of clock periods, data can be communicated via a bus or another communication link.

Certain example print material containers have slave logic that utilize I2C communications, although in other examples, other forms of digital or analogue communications could also be used. In the example of I2C communication, a master IC may generally be provided as part of the print apparatus (which may be referred to as the 'host') and a replaceable print apparatus component would comprise a 'slave' IC, although this need not be the case in all examples. There may be a plurality of slave ICs connected to an I2C communication link or bus (for example, containers of different colors of print agent). The slave IC(s) may comprise a processor to perform data operations before responding to requests from logic circuitry of the print system.

Communications between print apparatus and replaceable print apparatus components installed in the apparatus (and/or the respective logic circuitry thereof) may facilitate various functions.

Logic circuitry within a print apparatus may receive information from logic circuitry associated with a replaceable print apparatus component via a communications interface, and/or may send commands to the replaceable print apparatus component logic circuitry, which may comprise commands to write data to a memory associated therewith, or to read data therefrom.

This disclosure may refer to print apparatus components, which may include replaceable print apparatus components. Certain print apparatus components may include a reservoir holding print agent or print material. In this disclosure print material and print agent mean the same thing and are intended to encompass different example print materials including ink, toner particles, liquid toner, three-dimensional printing agents (including stimulators and inhibitors), three-dimensional printing build material, three-dimensional print powder.

For example, the identity, functionality and/or status of a replaceable print apparatus component and/or the logic circuitry associated therewith may be communicated to logic circuitry of a print apparatus via a communications interface. For example, a print agent container logic circuit may be configured to communicate an identity. For example, the identity may be stored on the logic circuit to facilitate the checking thereof by a compatible print apparatus logic circuit, wherein in different examples the identity may be in the form of a product serial number, another cartridge number, a brand name, a signature or bit indicating an authenticity, etc. In certain examples of this disclosure, multiple functions or logic circuits may be associated with a single logic circuit package of a single print apparatus component whereby multiple corresponding identities may be stored on and/or read from the logic circuit package. For example, the logic circuitry of the print apparatus component may store print apparatus component characteristics data, for example comprising data representative of at least one characteristic of a print material container, for example print material identifying characteristics, such as, total volume, initial fill volume and/or fill proportion (see for example EP patent publication No. 0941856); color such as cyan, magenta, yellow or black; color data including compressed or non-compressed color maps or portions thereof (see for example international patent application publication No. WO2015/016860); data to reconstruct colour maps such as recipes (see for example international patent application publication No. WO2016/028272); etc. For example, the print material characteristics may be configured to enhance a functionality or output with respect to a print apparatus in which it is installed. In a further example, a status, such as print material level-related data (e.g. a fill level) or other sensed (e.g. dynamic) property, may be provided via a communications interface, for example such that a print apparatus may generate an indication of the fill level to a user. In some examples, a validation process may be carried out by a print apparatus. An example of a cryptographically authenticated communication scheme is explained in US patent publication 9619663. For example, the print apparatus may verify that a print agent container originates from an authorized source, so as to ensure the quality thereof (for example, performing an authentication thereof). Examples of logic circuits of replaceable components that are configured to respond to authentication requests are US patent publication No. 9619663, US patent publication No. 9561662 and/or US patent publication No. 9893893.

In certain examples of this disclosure, a validation process may include an integrity check to ensure that the replaceable print apparatus component and/or the logic circuitry associated therewith is functioning as expected, for example that communicated identity or identities, print material characteristics and status are as expected. The validation process may further comprise requesting sensor information such that logic circuitry of a print apparatus component can check that this sensor data complies with expected parameters.

Examples of sensors and sensor arrays are disclosed in prior international patent application publications WO2017/074342, WO2017/184147, and WO2018/022038. These or other sensor types, or other arrangements that simulate signal outputs similar to these sensor arrays, could be used in accordance with this disclosure.

In turn, instructions to perform tasks may be sent to logic circuitry of a print apparatus component from logic circuitry associated with a print apparatus via the communications interface.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples the package may be directly affixed to a cartridge wall. In some examples, the package may comprise an interface, for example comprising pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component. A logic circuitry package may alternatively be referred to as a logic circuitry assembly, or simply as logic circuitry or processing circuitry.

In some examples, the logic circuitry package may respond to various types of requests (or commands) from a host (e.g. a print apparatus). A first type of request may comprise a request for data, for example identification and/or authentication information. A second type of request from a host may be a request to perform a physical action, such as performing at least one measurement. A third type of request may be a request for a data processing action. There may be additional types or requests.

In some examples, there may be more than one address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different addresses.

In at least some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between master to slaves in accordance with the I2C protocol. In other examples, other forms of digital and/or analogue communication can be used.

FIG. 1 is an example of a printing system 100. The printing system 100 comprises a print apparatus 102 in communication with logic circuitry associated with a replaceable print apparatus component 104 via a communications link 106. Although for clarity, the replaceable print apparatus component 104 is shown as external to the print apparatus 102, in some examples, the replaceable print apparatus component 104 may be housed within the print apparatus. While a particular type of 2D print apparatus 102 is shown, a different type of 2D print apparatus or a 3D print apparatus may instead be provided.

The replaceable print apparatus component 104 may comprise, for example a print material container or cartridge (which, again, could be a build material container for 3D printing, a liquid or dry toner container for 2D printing, or a liquid print agent container for 2D or 3D printing), which may in some examples comprise a print head or other dispensing or transfer component. The replaceable print apparatus component 104 may for example contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example comprising print agent containers of different colors, print heads (which may be integral to the containers), or the like. In other examples the print apparatus components 104 could comprise service components, for example to be replaced by service personnel, examples of which could include print heads, toner process cartridges or logic circuit package by itself to adhere to corresponding print apparatus component and communicate to a compatible print apparatus logic circuit.

In some examples, the communications link 106 may comprise an I2C capable or compatible bus (herein after, an I2C bus).

Figure 2:
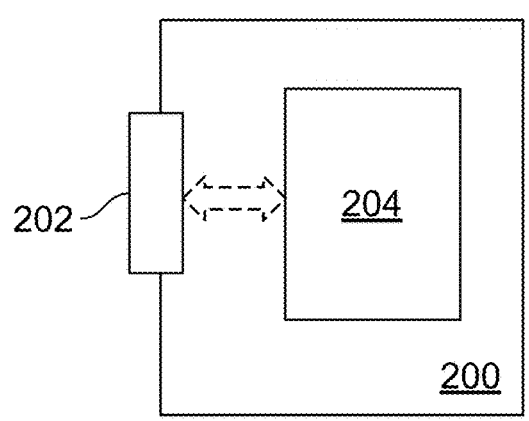
FIG. 2 is an example of a replaceable print apparatus component.

FIG. 2 shows an example of a replaceable print apparatus component 200, which may provide the replaceable print apparatus component 104 of FIG. 1. The replaceable print apparatus component 200 comprises a data interface 202 and a logic circuitry package 204. In use of the replaceable print apparatus component 200, the logic circuitry package 204 decodes data received via the data interface 202. The logic circuitry may perform other functions as set out below. The data interface 202 may comprise an I2C or other interface. In certain examples the data interface 202 may be part of the same package as the logic circuitry package 204.

In some examples, the logic circuitry package 204 may be further configured to encode data for transmission via the data interface 202. In some examples, there may be more than one data interface 202 provided.

In some examples, the logic circuitry package 204 may be arranged to act as a 'slave' in I2C communications.

Figure 3:
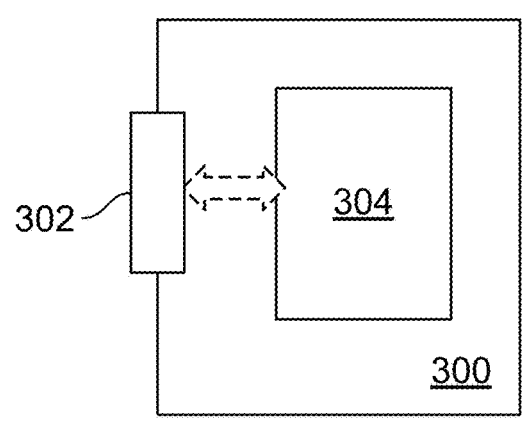
FIG. 3 shows an example of a print apparatus.

FIG. 3 shows an example of a print apparatus 300. The print apparatus 300 may provide the print apparatus 102 of FIG. 1. The print apparatus 300 may serve as a host for replaceable components. The print apparatus 300 comprises an interface 302 for communicating with a replaceable print apparatus component and a controller 304. The controller 304 comprises logic circuitry. In some examples, the interface 302 is an I2C interface.

In some examples, controller 304 may be configured to act as a host, or a master, in I2C communications. The controller 304 may generate and send commands to at least one replaceable print apparatus component 200, and may receive and decode responses received therefrom. In other examples the controller 304 may communicate with the logic circuitry package 204 using any form of digital or analogue communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4A:
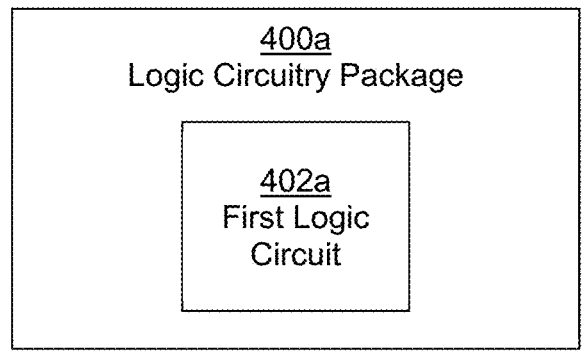
FIGS. 4A, 4B, 4C, 4D and 4E show examples of logic circuitry packages and processing circuitry.

FIG. 4A shows an example of a logic circuitry package 400a, which may for example provide the logic circuitry package 204 described in relation to FIG. 2. The logic circuitry package 400a may be associated with, or in some examples affixed to and/or be incorporated at least partially within, a replaceable print apparatus component 200.

In some examples, the logic circuitry package 400a is addressable via a first address and comprises a first logic circuit 402a, wherein the first address is an I2C address for the first logic circuit 402a. In some examples, the first address may be configurable. In other examples, the first address is a fixed address, e.g. "hard-wired", intended to remain the same address during the lifetime of the first logic circuit 402a. The first address may be associated with the logic circuitry package 400a at and during the connection with the print apparatus logic circuit, outside of the time periods that are associated with a second address, as will be set out below. In example systems where a plurality of replaceable print apparatus components are to be connected to a single print apparatus, there may be a corresponding plurality of different first addresses. In certain examples, the first addresses can be considered standard I2C address for logic circuitry packages 400*a* or replaceable print components.

In some examples, the logic circuitry package 400*a* is also addressable via a second address. For example, the second address may be associated with different logic functions or, at least partially, with different data than the first address. In some examples, the second address may be associated with a different hardware logic circuit or a different virtual device than the first address.

In some examples, the second address may be configurable. The second address may be an initial and/or default second address at the start of a communication session via the second address and may be reconfigured to a different address after the start of the session. In some examples, the second address may be used for the duration of the communication session, the logic circuitry package 400*a* may be configured to set the address to a default or initial address at the end of the session, or at or before the beginning of a new session. Communications in such a communication session may be directed to the second address and between communication sessions may be directed to the first address, whereby the print apparatus logic circuit 304 may verify, for example, different identities, characteristics and/or status through these different communication sessions via different addresses. In examples where the end of a communication session via the second address is associated with a loss of power to at least part of the logic circuit as is further set out below, this loss of power may cause the second 'temporary' address to be discarded (for example, the second address may be held in volatile memory, whereas the initial or default address may be held in persistent memory). Therefore a 'new' or 'temporary' second address may be set each time after the corresponding communications session is started (although in some cases the 'new' or 'temporary' second address may have been previously used in relation to the logic circuitry).

In other examples the logic circuit package 400*a* may not set itself back to the initial second address for starting each corresponding communication session. Rather, it may allow for configuring the second address at each corresponding communication session, without switching to the initial or default second address.

In other words, the second address may be configured to be an initial second address at the start of a time period during which the communication session is to take place. The logic circuitry package 400*a* may be configured to reconfigure its second address to a temporary address in response to a command sent to the initial second address and including that temporary address during that time period. The logic circuitry package 400*a* may then be effectively reset such that upon receiving a subsequent command indicative of the task and time period sent to the first address, the logic circuitry package 400*a* is configured to have the same initial second address.

In some examples, the initial and/or default second address of different logic circuitry packages 204, 400*a*, for example associated with different print material types (such as different colours or agents) and compatible with the same print apparatus logic circuit 304, may be the same. However, for each communication session with the second address, each logic circuitry package 400*a* may be temporarily associated with a different temporary address, which may be set as the second address for each communication session. In certain examples, a random temporary second address can be used each time, in some examples with the condition that each enabled second address on a common I2C bus at a particular instant is different from the other enabled addresses. In some examples a 'random' second address may be a second address which is selected from a predetermined pool of possible second addresses, which may, in some examples, be stored on the print apparatus. The temporary address may be generated by the print apparatus logic circuit 304 for each connected logic circuitry package 400*a* and communicated through said command.

In some examples, the logic circuitry package 400*a* may comprise a memory to store the second address (in some examples in a volatile manner). In some examples, the memory may comprise a programmable address memory register for this purpose.

In some examples, the package 400*a* is configured such that, in response to a first command indicative a first time period sent to the first address (and in some examples a task), the package 400*a* may respond in various ways. In some examples, the package 400*a* is configured such that it is accessible via at least one second address for the duration of the time period. Alternatively or additionally, in some examples, the package may perform a task, which may be the task specified in the first command. In other examples, the package may perform a different task.

The first command may, for example, be sent by a host such as a print apparatus in which the logic circuitry package 400*a* (or an associated replaceable print apparatus component) is installed. As set out in greater detail below, the task may comprise a monitoring task, for example, monitoring a timer (and in some examples, monitoring the time period). In other examples, the task may comprise a computational task, such as performing a mathematical challenge. In some examples, the task may comprise activating a second address and/or effectively deactivating the first address for communication purposes (or may comprise performance of actions which result in the activation or enabling of a second address and/or effectively deactivating or disabling of the first address). In some examples, activating or enabling a second address may comprise setting (e.g. writing, re-writing or changing), or triggering the setting of, a second address (for example, a temporary second address), for example by writing the second address in a portion of memory which is indicative of an address of the logic circuitry package 400*a*.

Where a task is specified, the task and/or time period may be specified explicitly in the first command, or may be inferred by the logic circuitry package 400*a* by reference to a lookup table or the like. In one example, the first command may for example comprise mode data and time data. For example, a first data field, which may be sent as part of a serial data package, may comprise a mode field. This may for example be around one or a few bits or bytes in size. A second data field, which may be sent as part of the serial data packet of the first data field in some examples, may comprise a 'dwell time' data field. For example, this may be around two or a few bits or bytes in size and may specify a time period, for example in milliseconds.

In some examples, the package 400*a* is configured so as to be inaccessible via the second address (the default or temporary second address or any address other the first address) for a second time period preceding (in some examples, immediately preceding) the first time period and/or for a third time period following (in some examples, immediately following) the first time period. In some examples, the first logic circuit 402a is to ignore I2C traffic sent to the first address (or any address other than a currently active second address) for the duration of the time period. In other words, the package 400a may respond to commands directed to the first address and not to commands directed to the second address outside the first time period; and may respond to commands directed to the second address and not to commands directed to the first address during the first time period. The term 'ignore' as used herein with respect to data sent on the bus may comprise any or any combination of not receiving (in some examples, not reading the data into a memory), not acting upon (for example, not following a command or instruction) and/or not responding (i.e. not providing an acknowledgement, and/or not responding with requested data). For example, 'ignoring' I2C traffic sent to the first address may be defined as the logic circuitry package 400a not responding to communications directed to the first address (or any address other than a currently active second address as perceivable by the print apparatus logic circuit 304).

Causing the first logic circuit 402a to 'ignore' (or otherwise not respond to) I2C traffic sent to the first address for the duration of the time period for which the second address is activated or in use allows the first and second addresses to be entirely independent of one another. For example, the first address may be I2C compliant whereas a second address may be of any format, including in some examples a non-I2C compliant format. In addition, if the first address is effectively disabled for the duration of the time period, consideration need not be made as to any response to a command which the package 400a may consider to be addressed to the first address. For example, the first address may be represented by a particular bit sequence and, if there is a possibility that the first address may be recognized when the package is not to be addressed using the first address, precautions may be taken such that this identifying bit sequence is avoided when the package is not to be addressed using the first address. The likelihood of this event could increase in the instance where communication is established via different temporary second addresses of respective different logic circuitry packages within a single time period over the same serial bus. If these situations are not managed correctly, indeterminate or unexpected behaviour may be seen. However, if the first address is effectively disabled during the time period, there need be no such consideration or precautions, and commands which could otherwise be inadvertently received and interpreted by the package 400a as having been received by the first address will not be received as the first address is effectively inactivated. The reverse may also be true (i.e. commands which may be inadvertently taken to be addressed to any second address will not be received by the package 400a outside the time period if that address is effectively disabled outside the time period).

In some examples, the first and the second addresses may be of different lengths. For example, the first address may be a 10-bit address and the second address may be a 7-bit address. In other examples, the first and second address may be of the same length, for example both comprising a 7-bit or 10-bit address. In certain examples the first and the default second address are hardwired, while the second address allows for reconfiguration to the temporary address, as explained above. In other examples the first and second address may be programmed.

In some examples, the first logic circuit 402a is to perform a task, which may be the task specified in the command received, for the duration of the time period. However, in other examples, for example to allow for increased compatibility, the first logic circuit 402a may not perform the specified task (for example, if it is unable to do so, or it is unnecessary to do so) to keep the first logic circuit 402a 'busy', as described below).

In some examples, the first logic circuit 402a may in effect not respond to (i.e., ignore) requests sent to the first address as a result of performing a task, which may be a task specified in the first command. In some examples, the task may at least substantially consume the processing capacity of the first logic circuit 402a. For example, the task may comprise monitoring a timer in such a way that the processing capacity of the first logic circuit 402a is substantially dedicated to that task. In other examples, the processing capacity may be substantially dedicated to performing a computational task, such as an arithmetical task. In a simple example, the first logic circuit 402a may be tasked with calculating a value such as pi. This task may be, according to present understanding, unlimited in the sense that a processor could continue calculating pi to further decimal places for an infinite amount of time. Therefore, the performance of this task to completion exceeds any likely time period specified in the first command. For example, such time periods may be, in some examples, in the order of seconds or tens of seconds. If the first logic circuit is dedicated to the task of calculating pi/monitoring a timer until the time period has passed, it may not also be monitoring traffic sent thereto via a communications bus or the like. Therefore, even if the communications were sent to the first address, these would be ignored. It may be noted that certain I2C slave devices will generally ignore a bus while performing any kind of processing. However, the processing specified herein is associated with the time period. It is noted that, given that the logic circuit package is not responsive to communications to its first address for the time for which the second address is activated, in some examples, the (temporary) second address could be the same as the first address whereby the desired function corresponding to that second address may still be achieved. However, as explained before, in other examples, the second address is different to the first address.

It will be appreciated that the task of calculating pi is merely one example of a task which may generally exceed a time period specified in a first command. Other examples of computational tasks having a completion time which is likely to exceed the time period may be selected, for example based on the length of the time period under consideration. For example, if the time period is to last for no longer than 3 seconds, a processing task which will exceed 3 seconds in duration may be performed (and, in some examples, instructed in the first command). Moreover, in other examples, as noted above, the task may comprise monitoring a time period.

In other examples, the logic circuitry packages 400a may be configured to, in response to such a first command including the task and time period, not respond to communications directed to its first address, not necessarily by performing a processing task but effectively by being programmed not to respond.

In some examples, the package 400a is configured to provide a first set of responses, or to operate in a first mode, in response to instructions sent to the first address and to provide a second set of responses, or to operate in a second mode, in response to instructions sent to the second address. In other words, the address may trigger different functions provided by the package 400a. In some examples, at least one response of the first set of responses is output in response to commands sent to the first address and not in response to commands sent to the second address and at least one response of the second set of responses is output in response to commands sent to the second address and not in response to commands sent to the first address. In some examples, the first set of responses may be cryptographically authenticated (i.e. accompanied by a message authentication code generated using a base key, or otherwise cryptographically 'signed', and/or encrypted, see for example US patent publication No. 9619663) and the second set of responses is not cryptographically authenticated. In some examples, the second set of responses may relate to sensor data and the first set of responses may not relate to sensor data. In some examples, messages may be accompanied by a session key identifier. For example an identity of a logic circuit of the package 400a could be communicated in the first and the second set of responses, whereby it is cryptographically authenticated in the first set but not in the second set. This may allow the package 400a to provide two distinct functions. Data may be output from an output data buffer of the package 400a.

In some examples, the package 400a may be configured to participate in a first validation process using I2C communications sent to the first address, and to participate in a second validation process using communications sent to the second address. As noted above, the second address may be a reconfigurable address, and in some examples may be reconfigured after the first validation process has been carried out. In some examples, the first validation process may comprise an exchange of encrypted or authenticable messages, wherein the messages are encrypted and/or signed based on a base key stored in the package, which may be a secret key (or based on a secret base key) that corresponds to a secret key stored or held in the print apparatus. In some examples, the second validation process may comprise an integrity check, in which the package 400a may return requested data values such that a host apparatus can verify that these data values meet predetermined criteria.

In examples set out above, the addresses used to communicate with the circuitry package 400a have been described. Further communication may be directed to memory addresses to be used to request information associated with these memory addresses. The memory addresses may have a different configuration than the first and second address of the logic circuitry package 400a. For example, a host apparatus may request that a particular memory register is read out onto the bus by including the memory address in a read command. In other words, a host apparatus may have a knowledge and/or control of the arrangement of a memory. For example, there may be a plurality of memory registers and corresponding memory addresses associated with the second address. A particular register may be associated with a value, which may be static or reconfigurable. The host apparatus may request that the register be read out onto the bus by identifying that register using the memory address. In some examples, the registers may comprise any or any combination of address register(s), parameter register(s) (for example to store gain and/or offset parameters), sensor identification register(s) (which may store an indication of a type of sensor), sensor reading register(s) (which may store values read or determined using a sensor), sensor number register(s) (which may store a number or count of sensors), version identity register(s), memory register(s) to store a count of clock cycles, memory register(s) to store a value indicative of a read/write history of the logic circuitry, or other registers.

Figure 4B:
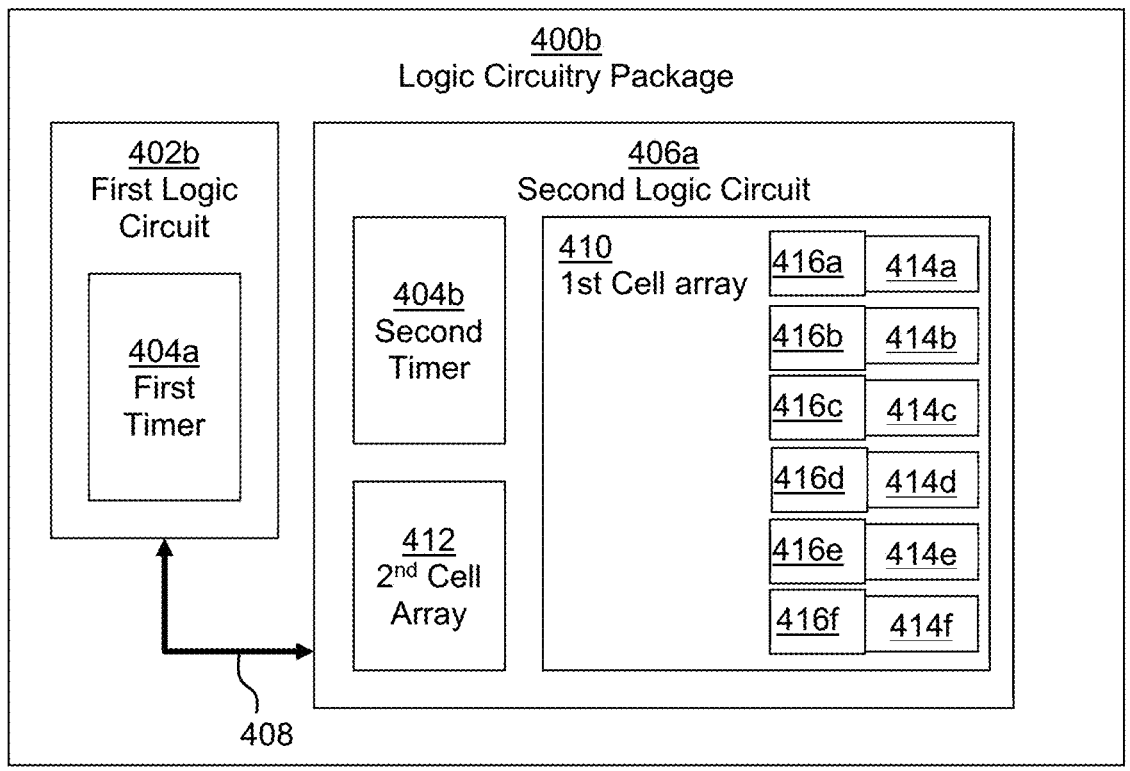

FIG. 4B shows another example of a logic circuitry package 400b. In this example, the package 400b comprises a first logic circuit 402b, in this example, comprising a first timer 404a, and a second logic circuit 406a, in this example, comprising a second timer 404b. While in this example, each of the first and second logic circuits 402b, 406a comprises its own timer 404, in other examples, they may share a timer, or reference at least one external timer. In a further example, the first logic circuit 402b and the second logic circuit 406a are linked by a dedicated signal path 408.

In one example, the logic circuitry package 400b may receive a first command comprising two data fields. A first data field is a one byte data field setting a requested mode of operation. For example, there may be a plurality of predefined modes, such as a first mode, in which the logic circuitry package 400b is to ignore data traffic sent to the first address (for example, while performing a task), and a second mode in which the logic circuitry package 400b is to ignore data traffic sent to the first address and to transmit an enable signal to the second logic circuit 406a, as is further set out below.

The first command may comprise additional fields, such as an address field and/or a request for acknowledgement.

The logic circuitry package 400b is configured to process the first command. If the first command cannot be complied with (for example, a command parameter is of an invalid length or value, or it is not possible to enable the second logic circuit 406a), the logic circuitry package 400b may generate an error code and output this to a communication link to be returned to host logic circuitry, for example in the print apparatus.

If however, the first command is validly received and can be complied with, the logic circuitry package 400b measures the duration of the time period included in the first command, for example utilising the timer 404a. In some examples, the timer 404a may comprise a digital "clock tree". In other examples, the timer 404a may comprise an RC circuit, a ring oscillator, or some other form of oscillator or timer. In this example, in response to receiving a valid first command, the first logic circuit 402b enables the second logic circuit 406a and effectively disables the first address, for example by tasking the first logic circuit 402b with a processing task as described above. In some examples, enabling the second logic circuit 406a comprises sending, by the first logic circuit 402b, an activation signal to the second logic circuit 406a. In other words, in this example, the logic circuitry package 400b is configured such that the second logic circuit 406a is selectively enabled by the first logic circuit 402b.

In this example, the second logic circuit 406a is enabled by the first logic circuit 402b sending a signal via a signal path 408, which may or may not be a dedicated signal path 408, that is, dedicated to enable the second logic circuit 406a. In one example, the first logic circuit 402b may have a dedicated contact pin or pad connected to the signal path 408, which links the first logic circuit 402b and the second logic circuit 406a. In a particular example, the dedicated contact pin or pad may be a General Purpose Input/Output (a GPIO) pin of the first logic circuit 402b. The contact pin/pad may serve as an enablement contact of the second logic circuit 406a.

The voltage of the signal path 408 may be driven to be high in order to enable the second logic circuit 406a. In some examples, such a signal may be present for substantially the duration of the first time period, for example, starting following receipt of the first command and may cease at the end of the first time period. As noted above, the enablement may be triggered by a data field in the command. In other examples, the second logic circuit may be selectively enabled/disable, for example for the duration of the time period, in another way.

In some examples, such a contact pad or pin is provided in a manner so as to be generally inaccessible from the exterior of a replaceable print apparatus component. For example, it may be relatively distant from an interface and/or may be fully enclosed by a housing. This may be useful in ensuring that it is only triggered via the first logic circuit 402b.

In this example, the second logic circuit 406a is addressable via at least one second address. In some examples, when the second logic circuit 406a is activated or enabled, it may have an initial, or default, second address, which may be an I2C address or have some other address format. The second logic circuit 406a may receive instructions from a master or host logic circuitry to change the initial address to a temporary second address. In some examples, the temporary second address may be an address which is selected by the master or host logic circuitry. This may allow the second logic circuit 406a to be provided in one of a plurality of packages 400 on the same I2C bus which, at least initially, share the same initial second address. This shared, default, address may later be set to a specific temporary address by the print apparatus logic circuit, thereby allowing the plurality of packages to have different second addresses during their temporary use, facilitating communications to each individual package. At the same time, providing the same initial second address may have manufacturing or testing advantages.

In some examples, the second logic circuit 406a may comprise a memory. The memory may comprise a programmable address register to store the initial and/or temporary second address (in some examples in a volatile manner). In some examples, the second address may be set following, and/or by executing, an I2C write command. In some examples, the second address may be settable when the enablement signal is present or high, but not when it is absent or low. The second address may be set to a default address when an enablement signal is removed and/or on restoration of enablement of the second logic circuit 406a. For example, each time the enable signal over the signal path 408 is low, the second logic circuit 406a, or the relevant part(s) thereof, may be reset. The default address may be set when the second logic circuit 406a, or the relevant part(s) thereof, is switched out-of-reset. In some examples the default address is a 7-bit or 10-bit identification value. In some examples, the default address and the temporary second address may be written in turn to a single, common, address register.

In some examples, the address of the second logic circuit 406a may be rewritten at any time at which it is enabled. In some examples, when connected to the bus, the second logic circuit 406a may be in a low current state except when it is in an enabled state.

In some examples, the second logic circuit 406a may comprise a power-on reset (POR) device. This may comprise an electronic device which detects the power applied to the second logic circuit 406a and generates a reset impulse that goes to the entire second logic circuit 406a placing it into a known state. Such a POR device may be of particular utility in testing the package 400b prior to installation.

In some examples, a plurality of further logic circuits may be 'chained' together, with further pins (which may be GPIO pins) or the like. In some examples, once the second address has been written (i.e. the logic circuit has an address which is different to its default address), it may activate an 'out' pin or pad, and an 'in' pin or pad of the next logic circuit in the chain (if one exists) thereby be driven high and the logic circuit may be enabled. Such a further logic circuit(s) may function as described in relation to the second logic circuitry 406a. Such further logic circuits may have the same default address as the second logic circuit 406a in some examples. There is no absolute limit as to how many logic circuits can be serially chained and accessed in this way, however there may be a practical limitation in a given implementation based on the series resistance on the bus lines, the number of Slave IDs, and the like.

In one example, the first logic circuit 402b is configured to generate an enablement signal that may be an active low asynchronous reset signal. In some examples, when this signal is removed (or is driven to a logic 0), the second logic circuit 406a may immediately cease operations. For example, data transfers may immediately cease, and a default state (which may be a sleep state and/or a low current state) may be assumed by the second logic circuit 406a. In some examples, memories such as registers may revert to an initialised state (for example, a default address may comprise an initialised state of an address register).

In an example in which an I2C bus is used for communications with the package 400b, the first logic circuit 402b and the second logic circuit 406a may be connected to the same I2C bus. As noted above, an additional connection, for example provided between GPIO pins of the first logic circuit 402b and the second logic circuit 406a may be selectively enabled following receipt of a dedicated command. For example, the first logic circuit 402b may drive a dedicated GPIO pin to be high for a time period specified in a command (whereas by default the pin may be in a low state). For the duration of this time period, the first logic circuit 402b may not acknowledge ('NAK') any attempts to communicate using the first address. At the end of the specified time period, the dedicated contact pin may be returned to the 'low' state, and the first logic circuit 402b may be receptive to communications on the I2C bus sent to the first address once again. However, while the contact pin is driven to be high, the second logic circuit 406a may be enabled, and receptive to communications on the I2C bus.

It may be noted that, by sharing I2C contacts between the first logic circuit 402b and the second logic circuit 406a, electrical interconnection cost is small. Additionally, if the second logic circuit is selectively powered only for the duration of the time period, it may be less susceptible to electrochemical wear. In addition, this may allow multiple packages comprising respective first logic circuits 402b and second logic circuits 406a to be provided on the same serial I2C bus, where the second logic circuits 406a may (at least initially) share an address, which may in turn reduce manufacturing and deployment complexities.

In some examples, as outlined above, the logic circuitry package 400b comprises a first operational mode in which it responds to communication sent to the first address and not any second address and a second operational mode in which it responds to communications sent to a second address (e.g. the second address currently in use, and in some examples, currently stored in a dedicated register of the second logic circuit 406a) and not the first address.

In the example illustrated in FIG. 4b, the second logic circuit 406a comprises a first array 410 of cells and at least one second cell 412 or second array of second cells. The first cells 416 a-f, 414 a-f and the at least one second cell 412 can comprise resistors. The first cells 416 a-f, 414 a-f and the at least one second cell 412 can comprise sensors. In one example the first cell array 410 comprises a print material level sensor and the at least one second cell 412 comprises another sensor and/or other sensor array.

In this example, the first cell array 410 comprises a sensor configured to detect a print material level of a print supply, which may in some examples be a solid but in examples described herein is a liquid, for example, an ink or other liquid print agent. The first cell array 410 may comprise a series of temperature sensors (e.g. cells 414a-f) and a series of heating elements (e.g. cells 416a-f), for example similar in structure and function as compared to the level sensor arrays described in WO2017/074342, WO2017/184147, and WO2018/022038. In this example, the resistance of a resistor cell 414 is linked to its temperature. The heater cells 416 may be used to heat the sensor cells 414 directly or indirectly using a medium. The subsequent behaviour of the sensor cells 414 depends on the medium in which they are submerged, for example whether they are in liquid (or in some examples, encased in a solid medium) or in air. Those which are submerged in liquid/encased may generally lose heat quicker than those which are in air because the liquid or solid may conduct heat away from the resistor cells 414 better than air. Therefore, a liquid level may be determined based on which of the resistor cells 414 are exposed to the air, and this may be determined based on a reading of their resistance following (at least the start of) a heat pulse provided by the associated heater cell 416.

In some examples each sensor cell 414 and heater cell 416 are stacked with one being directly on top of the other. The heat generated by each heater cell 416 may be substantially spatially contained within the heater element layout perimeter, so that heat delivery is substantially confined to the sensor cell 414 stacked directly above the heater cell 416. In some examples, each sensor cell 414 may be arranged between an associated heater cell 416 and the fluid/air interface.

In this example, the second cell array 412 comprises a plurality of different cells that may have a different function such as different sensing function(s). For example, the first and second cell array 410, 412 may include different resistor types. Different cells arrays 410, 412 for different functions may be provided in the second logic circuit 406a.

Figure 4C:
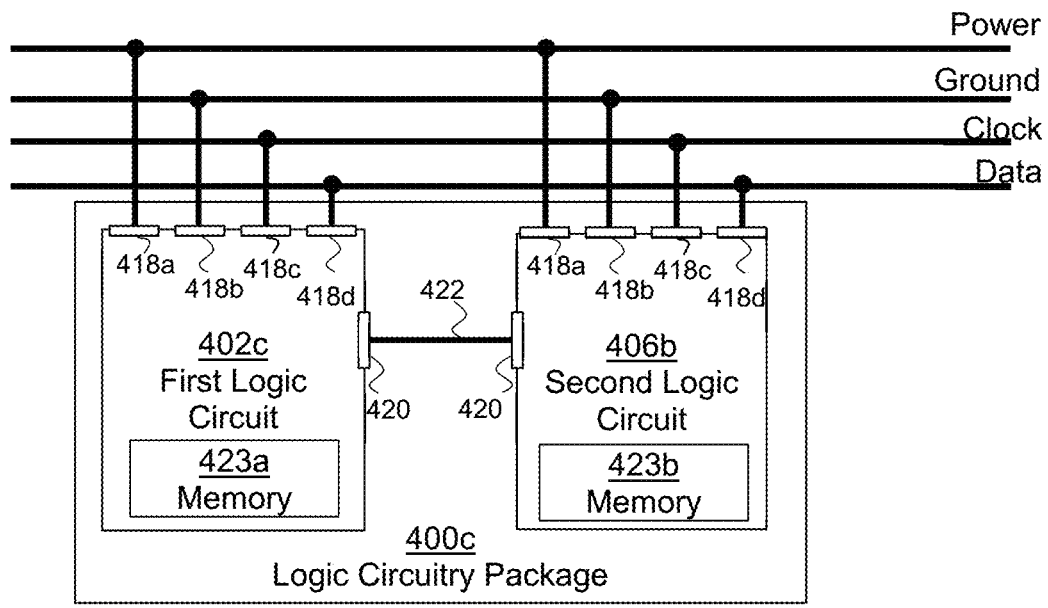

FIG. 4C shows an example of how a first logic circuit 402c and a second logic circuit 406b of a logic circuitry package 400c, which may have any of the attributes of the circuits/packages described above, may connect to an I2C bus and to each other. As is shown in the Figure, each of the circuits 402c, 406b has four pads (or pins) 418a-d connecting to the Power, Ground, Clock and Data lines of an I2C bus. In another example, four common connection pads are used to connect both logic circuits 402c, 406b to four corresponding connection pads of the print apparatus controller interface. It is noted that in some examples, instead of four connection pads, there may be less connection pads. For example, power may be harvested from the clock pad; an internal clock may be provided; or the package could be grounded through another ground circuit; so that, one or more of the pads may be omitted or made redundant. Hence, in different examples, the package could use only two or three interface pads and/or could include "dummy" pads.

Each of the circuits 402c, 406b has a contact pin 420, which are connected by a common signal line 422. The contact pin 420 of the second circuit serves as an enablement contact thereof.

In this example, each of the first logic circuit 402c and the second logic circuit 406b comprises a memory 423a, 423b.

The memory 423a of the first logic circuit 402c stores information comprising cryptographic values (for example, a cryptographic key and/or a seed value from which a key may be derived) and identification data and/or status data of the associated replaceable print apparatus component. In some examples the memory 423a may store data representing characteristics of the print material, for example any, any part, or any combination of its type, color, color map, recipe, batch number, age, et cetera.

The memory 423b of the second logic circuit 406b comprises a programmable address register to contain an initial address of the second logic circuit 406b when the second logic circuit 406b is first enabled and to subsequently contain a further (temporary) second address (in some examples in a volatile manner). The further, e.g. temporary, second address may be programmed into the second address register after the second logic circuit 406b is enabled, and may be effectively erased or replaced at the end of an enablement period. In some examples, the memory 423b may further comprise programmable registers to store any, or any combination of a read/write history data, cell (e.g. resistor or sensor) count data, Analogue to Digital converter data (ADC and/or DAC), and a clock count, in a volatile or non-volatile manner. Use of such data is described in greater detail below. Certain characteristics, such as cell count or ADC or DAC characteristics, could be derivable from the second logic circuit instead of being stored as separate data on the memory.

In one example, the memory 423b of the second logic circuit 406b stores any or any combination of an address, for example the second I2C address; an identification in the form of a revision ID; and the index number of the last cell (which may be the number of cells less one, as indices may start from 0), for example for each of different cell arrays or for multiple different cell arrays if they have the same number of cells.

In use of the second logic circuit 406b, in some operational states, the memory 423b of the second logic circuit 406 may store any or any combination of timer control data, which may enable a timer of the second circuit, and/or enable frequency dithering therein in the case of some timers such as ring oscillators; a dither control data value (to indicate a dither direction and/or value); and a timer sample test trigger value (to trigger a test of the timer by sampling the timer relative to clock cycles measureable by the second logic circuit 406b).

While the memories 423a, 423b are shown as separate memories here, they could be combined as a shared memory resource, or divided in some other way. The memories 423a, 423b may comprise a single or multiple memory devices, and may comprise any or any combination of volatile memory e.g. DRAM, SRAM, registers, etc. and non-volatile memory e.g. ROM, EEPROM, Flash, EPROM, memristor, etc.

While one package 400c is shown in FIG. 4C, there may be a plurality of packages with a similar or a different configuration attached to the bus.

Figure 4D:
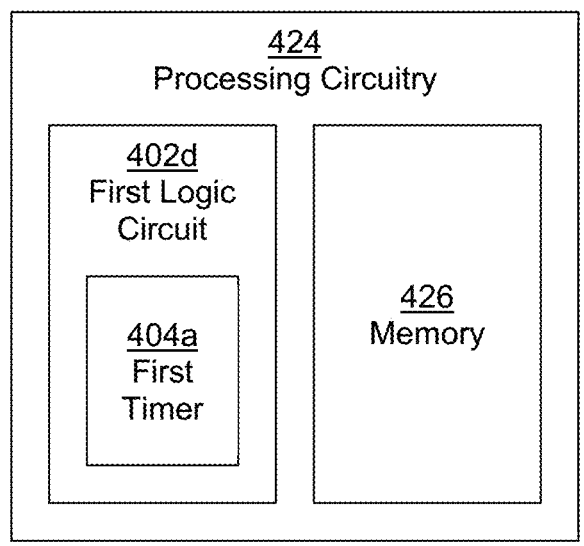

FIG. 4D shows an example of processing circuitry 424 which is for use with a print material container. For example, the processing circuitry 424 may be affixed or integral thereto. As already mentioned, the processing circuitry 424 may comprise any of the features of, or be the same as, any other logic circuitry package of this disclosure.

In this example, the processing circuitry 424 comprises a memory 426 and a first logic circuit 402d which enables a read operation from memory 426. The processing circuitry 424 is accessible via an interface bus of a print apparatus in which the print material container is installed and is associated with a first address and at least one second address. The bus may be an I2C bus. The first address may be an I2C address of the first logic circuit 402d. The first logic circuit 402d may have any of the attributes of the other examples circuits/packages described in this disclosure.

The first logic circuit 402d is adapted to participate in authentication of the print materials container by a print apparatus in which the container is installed. For example, this may comprise a cryptographic process such as any kind of cryptographically authenticated communication or message exchange, for example based on an encryption key stored in the memory 426, and which can be used in conjunction with information stored in the printer. In some examples, a printer may store a version of a key which is compatible with a number of different print material containers to provide the basis of a 'shared secret'. In some examples, authentication of a print material container may be carried out based on such a shared secret. In some examples, the first logic circuit 402d may participate in a message to derive a session key with the print apparatus and messages may be signed using a message authentication code based on such a session key. Examples of logic circuits configured to cryptographically authenticate messages in accordance with this paragraph are described in the earlier mentioned US patent publication No. 9619663.

In some examples, the memory 426 may store data comprising: identification data and read/write history data. In some examples, the memory 426 further comprises cell count data (e.g. sensor count data) and clock count data. Clock count data may indicate a clock speed of a first and/or second timer 404a, 404b (i.e. a timer associated with the first logic circuit or the second logic circuit). In some examples, at least a portion of the memory 426 is associated with functions of a second logic circuit, such as a second logic circuit 406a as described in relation to FIG. 4B above. In some examples, at least a portion of the data stored on the memory 426 is to be communicated in response to commands received via the second address. In some examples, the memory 426 comprises a programmable address register or memory field to store a second address of the processing circuitry (in some examples in a volatile manner). The first logic circuit 402d may enable read operation from the memory 426 and/or may perform processing tasks.

Other examples of first logic circuits 402 described herein may be adapted to participate in authentication processes in a similar manner.

The memory 426 may, for example, comprise data representing characteristics of the print material, for example any or any combination of its type, color, batch number, age, et cetera. The memory 426 may, for example, comprise data to be communicated in response to commands received via the first address. The processing circuitry may comprise first logic circuit to enable read operations from the memory and perform processing tasks In some examples, the processing circuitry 424 is configured such that, following receipt of the first command indicative of a task and a first time period sent to the first logic circuit 402d via the first address, the processing circuitry 424 is accessible by at least one second address for a duration of the first time period. Alternatively or additionally, the processing circuitry 424 may be configured such that in response to a first command indicative of a task and a first time period sent to the first logic circuit 402d addressed using the first address, the processing circuitry 424 is to disregard (e.g. 'ignore' or 'not respond to') I2C traffic sent to the first address for substantially the duration of the time period as measured by a timer of the processing circuitry 424 (for example a timer 404a, b as described above). In some examples, the processing circuitry may additionally perform a task, which may be the task specified in the first command. The term 'disregard' or 'ignore' as used herein with respect to data sent on the bus may comprise any or any combination of not receiving (in some examples, not reading the data into a memory), not acting upon (for example, not following a command or instruction) and/or not responding (i.e. not providing an acknowledgement, and/or not responding with requested data).

The processing circuitry 424 may have any of the attributes of the logic circuitry packages 400 described herein. In particular, the processing circuitry 424 may further comprise a second logic circuit wherein the second logic circuit is accessible via the second address. In some examples the second logic circuit may comprise at least one sensor which is readable by a print apparatus in which the print material container is installed via the second address. In some examples, such a sensor may comprise a print materials level sensor.

The processing circuitry 424 may have a first validation function, triggered by messages sent to a first address on an I2C bus and a second validation function, triggered by messages sent to a second address on the I2C bus.

Figure 4E:
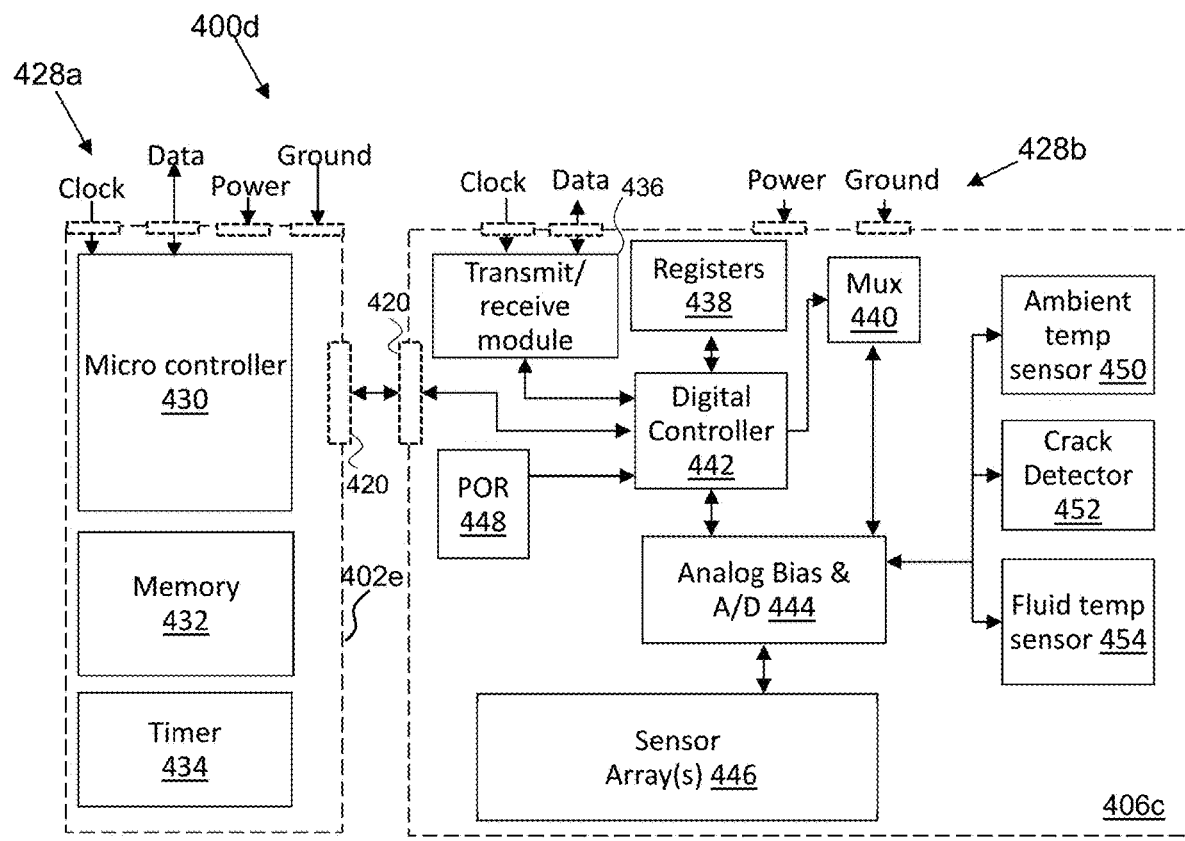

FIG. 4E shows another example of a first logic circuit 402e and second logic circuit 406c of a logic circuitry package 400d, which may have any of the attributes of the circuits/packages of the same names described herein, which may connect to an I2C bus via respective interfaces 428a, 428b and to each other. In one example the respective interfaces 428a, 428b are connected to the same contact pad array, with only one data pad for both logic circuits 402e, 406c, connected to the same serial I2C bus, see for example FIGS. 13A and 13B. In other words, in some examples, communications addressed to the first and the second address are received via the same data pad.

In this example, the first logic circuit 402e comprises a microcontroller 430, a memory 432 and a timer 434. The microcontroller 430 may be a secure microcontroller or customized integrated circuitry adapted to function as a microcontroller, secure or non-secure.

In this example, the second logic circuit 406c comprises a transmit/receive module 436 which receives a clock signal and a data signal from a bus to which the package 400d is connected, data registers 438, a multiplexer 440, a digital controller 442, an analogue bias and analogue to digital converter 444, at least one sensor or cell array 446 (which may in some examples comprise a level sensor with one or multiple arrays of resistor elements), and a power-on reset (POR) device 448. The POR device 448 may be used to allow operation of the second logic circuit 406c without use of a contact pin 420.

The analogue bias and analogue to digital converter 444 receives readings from the sensor array(s) 446 and from external sensors. For example, a current may be provided to a sensing resistor and the resultant voltage may converted to a digital value. That digital value may be stored in a register and read out (i.e. transmitted as serial data bits, or as a 'bitstream') over the I2C bus. The analogue to digital converter 444 may utilise parameters, for example, gain and/or offset parameters, which may be stored in registers.

In this example, there are different additional single sensors, including for example at least one of an ambient temperatures sensor 450, a crack detector 452 and/or a fluid temperature sensor 454. These may sense, respectively, an ambient temperature, a structural integrity of a die on which the logic circuitry is provided and a fluid temperature.

Figure 5:
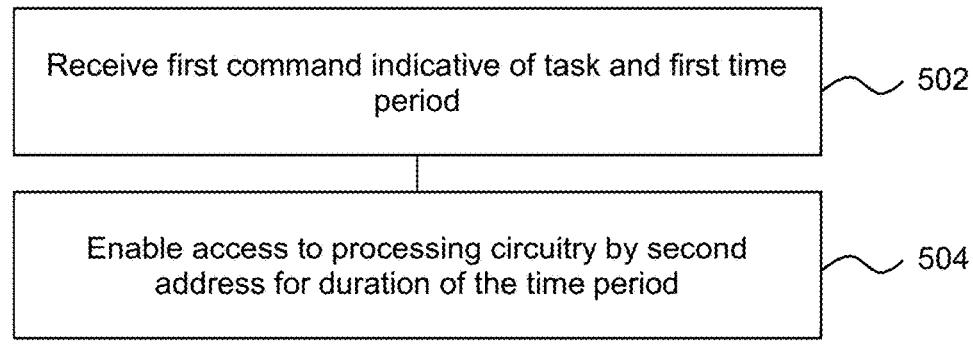
FIG. 5 is an example of a method which may be carried out by a logic circuitry package.

FIG. 5 shows an example of a method which may be carried out by processing circuitry, for example by a logic circuitry package such as the logic circuitry packages 400*a-d* described above, or by the processing circuitry 424 described in relation to FIG. 4D, and/or by processing circuitry provided on a replaceable print apparatus component, for example a consumable printing materials container.

Block 502 comprises receiving a first command indicative of a task and a first time period which is sent to a first address of processing circuitry. Block 504 comprises enabling, by the processing circuitry, access to the processing circuitry by at least one second address of the processing circuitry for the duration of the time period.

Figure 6:
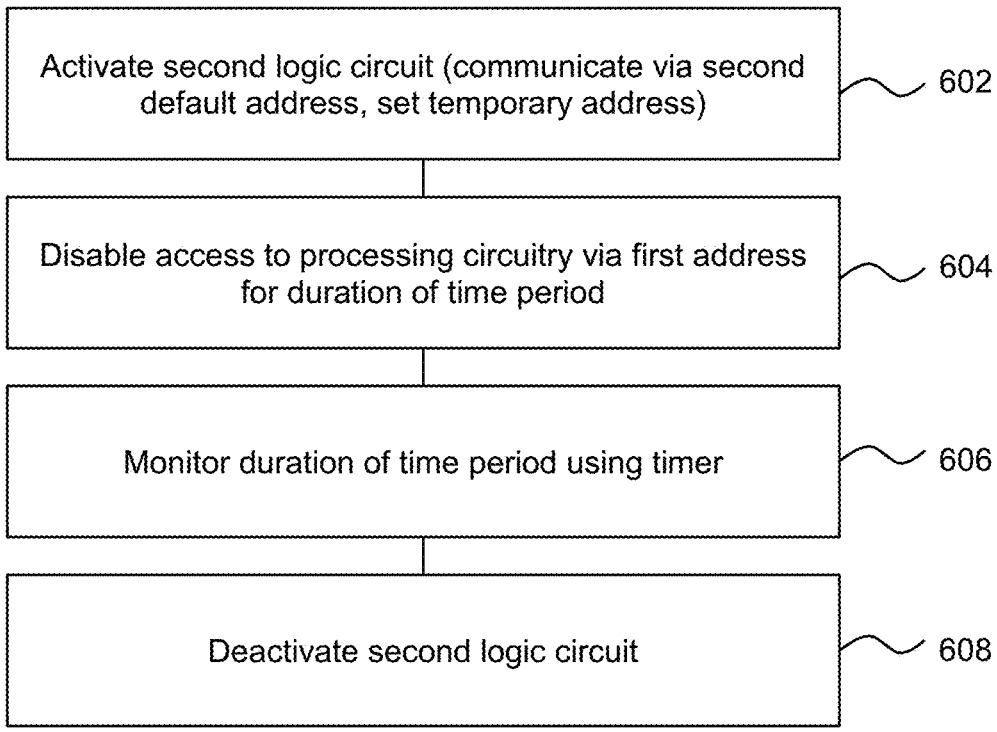
FIG. 6 is a further example of a method which may be carried out by a logic circuitry package.

FIG. 6 shows one example of the method of block 504 in greater detail. In this example, a first and second logic circuit are provided, each respectively associated with the first and at least one second address as described above with reference to FIG. 4B.

Block 602 comprises activating the second logic circuit. As described above, this may comprise a first logic circuit sending or transmitting an activation signal to a second logic circuit to activate the second logic circuit, for example via a dedicated signal path. In this example, activating the second logic circuit allows access to the processing circuitry using the at least one second address, for example using an initial or default second address. In some examples, following activation, the second logic circuit may be caused to set a new or temporary second address, for example to replace an initial or default address of the second logic circuit. In some examples, the temporary address may be set for the duration of a communication session.

Block 604 comprises disabling access to the processing circuitry via the first address (i.e. using communications addressed to the first address) for the duration of the time period by causing the first logic circuit to perform a processing task (in some examples, the processing task specified in the command received in block 502) for the duration of the time period. In other examples, the first address may be effectively disabled by preventing transmission of responses to messages sent to the first address. Block 606 comprises monitoring, by the processing circuitry, the duration of the time period using a timer of the processing circuitry. In some examples, monitoring the duration of the time period using the timer may itself comprise the processing task.

After the time period has expired, the method proceeds with block 608, which comprises deactivating the second logic circuit. For example, this may comprise removing an activation signal by the first logic circuit. Access to the processing circuitry via the second address may therefore be disabled after the duration of the time period. For example, the second logic circuit may be de-energized or placed in a sleep mode by the removal of the signal.

In examples where the end of a communication session is associated with a loss of power to at least part of the logic circuit, this loss of power may cause the second address to be discarded (for example, the second address may be held in volatile memory, whereas the initial or default address may be hardwired or held in persistent memory). After reset, the second address may again be set to the default or initial address before the beginning of a new session. In some examples, the initial or default address may be held in persistent memory and may be restored to a register of the second logic circuit when the second logic circuit is enabled. Therefore a 'new' second address may be set each time a communications session is started (although in some cases the 'new' second address may have previously been used in relation to the logic circuitry).

As set out in greater detail elsewhere herein, during the period of activation, the second logic circuit may provide services, for example cell or sensor readings or the like. However, in other examples, the second logic circuit may for example provide an output such as activating a light or sound (for example, the second logic circuit may control a light source or speaker or some other apparatus), may receive data (for example, may comprise a memory which is to store a data file), and/or may provide some other type of output or service.

Figure 7:
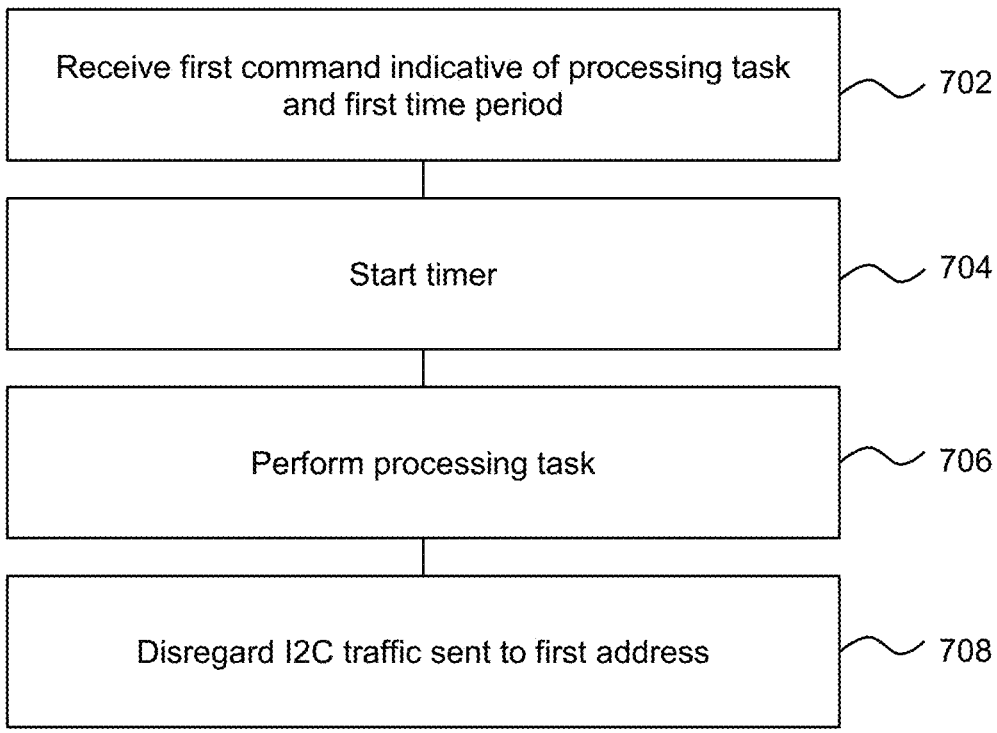
FIG. 7 shows an example of a method which may be carried out for example by processing circuitry.

FIG. 7 shows an example of a method which may be carried out for example by processing circuitry 424 or by a package 400*a-d* as described above. The method comprises, in block 702, receiving a first command indicative of a processing task and a first time period sent to a first address of processing circuitry via a communications bus, for example an I2C bus.

Block 704 comprises starting a timer of the processing circuitry. In other examples, a timer may be monitored rather than started. For example, an initial count of the timer may be recorded and an increase in the count may be monitored.

Block 706 comprises performing, by the processing circuitry, a processing task and block 708 comprises disregarding traffic sent to the first address. In some examples, disregarding the I2C traffic may be as a result of performing the task specified in the command, or another task. The task may comprise monitoring a timer. In other examples, the task may comprise a computational task, such as working to solve a mathematical challenge.

Block 708 may continue until the time period expires, as monitored using the timer.

The method may comprise any of the features described above in relation to a tasks and/or to disregarding (e.g. 'ignoring' or simply 'not responding to') traffic. The method may be carried out using processing circuitry which is associated with, or provided on, a printing material container and/or a replaceable print apparatus component.

In some examples, as described above, the method may comprise, for the duration of the time period, responding, by the processing circuitry, to I2C traffic sent to a second address of the processing circuitry. In some examples, the first address is associated with the first logic circuit of the processing circuitry and the second address is associated with the second logic circuit of the processing circuitry. In some examples, where first and second logic circuits are provided, the first logic circuit may perform the processing task and/or may send an activation signal to the second logic circuit, for example via a dedicated signal path, for the duration of the time period. In some examples, the second logic circuit may be deactivated by ceasing the activation signal.

Figure 8:
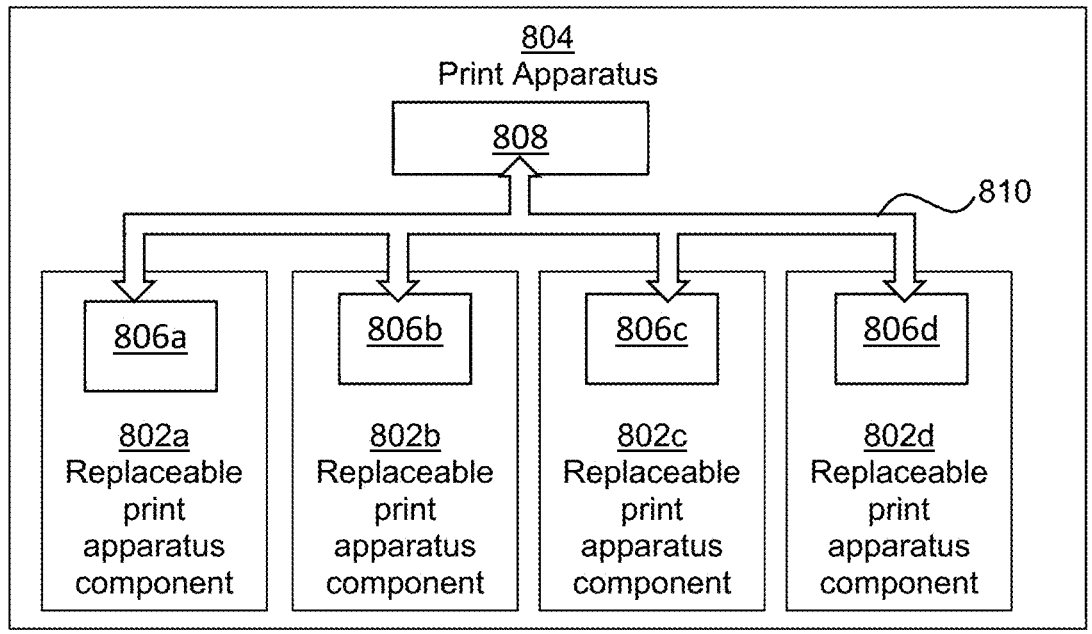
FIG. 8 shows an example arrangement of replaceable print apparatus components in a print apparatus.

FIG. 8 schematically shows an arrangement in which a plurality of replaceable print apparatus components 802*a-d* are provided in a print apparatus 804.

Each of the replaceable print apparatus components 802*a-d* is associated with a logic circuitry package 806*a-d*, which may be a logic circuitry package 400*a-d* as described above. The print apparatus 804 comprises host logic circuitry 808. The host logic circuitry 808 and the logic circuitry packages 806 are in communication via a common I2C bus 810. In one mode of operation, each of the logic circuitry packages 806 has a different first address. Therefore, each of the logic circuitry packages 806 (and by extension, each of the replaceable print apparatus components) may be addressed uniquely by the host print apparatus 804.

In an example, a first command may be sent to a particular one of the replaceable print apparatus component logic circuitry packages 806, i.e. being addressed using the unique first address for that logic circuitry package, instructing it to enable its (at least one) second address for a corresponding 'first command' time period. Therefore, that replaceable print apparatus component 802 may, for example, enable at least one second address and/or, in some examples, its associated functions. In some examples this results in enabling a second logic circuit as described above. For example, the addressed logic circuitry package 806 may ignore (e.g. not acknowledge and/or not respond to) I2C traffic sent to the first address of that logic circuitry package 806 for the duration of the first command time period, for example in response to the same command or a separate command. The other print apparatus components 802 may also be sent a second command resulting in them ignoring I2C traffic sent to their first addresses for the duration of a 'second command' time period. As noted above, when there are no other slave devices 'listening' to the I2C bus, restrictions as to the form and content of messages sent over the I2C bus may be reduced. Therefore, in this way, all of the first addresses may be effectively disabled whilst only one second address is in communication with the I2C bus 810. In other examples, more than one packages may be addressable by respective different addresses at the same time. In some examples, a first command may also result in an addressed component/package ignoring I2C traffic sent to their first addresses for the duration of the first command time period, and/or a second command may also result in an addressed component/package being accessible via at least one second address.

In some examples, the logic circuitry package(s) 806 may perform a processing task, which may be a processing task as specified in a command, so as to 'keep busy' and ignore I2C traffic sent to the first address for the duration of the specified time period. As noted above, this may comprise a computing task or a monitoring task, for example monitoring a timer.

Thus, the logic circuitry packages 806 may be configured to have a first response to a first command, which results in a second address of that package being enabled for the duration of the first command time period, and a second response to a second command, which results in the package ignoring I2C traffic sent to the first address (for example by performing a processing task such as monitoring a timer and/or carrying out a computational task which absorbs processing capacity) for the duration of the second command time period. In other words, each of the logic circuitry packages 806 may be enabled to carry out either of the methods of FIGS. 5 and/or 7, depending on the nature of the command received.

To consider a particular example, a host device such as a print apparatus 804 in this example wishing to communicate with a particular logic circuitry package 806 via its second address—in this example logic circuitry package 806a— may issue commands so as to instruct the other logic circuitry packages 806b-d to act in a manner which results in them ignoring traffic on the bus 810. This may comprise the logic circuitry 808 serially sending three commands addressed to a unique address of each of the other logic circuitry packages 806b-d, each command specifying a first mode of operation and a time period. The first mode of operation may result in traffic on the bus being ignored.

Next, the logic circuitry 808 may send a dedicated command to the target logic circuitry package 806a via its first address, the command specifying a second mode of operation and a time period. The second mode of operation may comprise an instruction resulting in traffic on the bus 810 sent to a first address being ignored and enablement of a second address. The first command time period and the second command time period for which traffic is ignored by different logic circuit packets 806 may be specified to overlap with one another, in some examples bearing in the mind the delay with which instructions will be received.

The host logic circuitry may then communicate with the selected logic circuitry package 806a via its second address for the duration of the time period. During this time period, as in some examples no other devices are 'listening' to the I2C bus, any communication protocol (including in some examples a non-I2C compliant protocol) may be used for communicating with the selected logic circuitry package 806a via its second address.

Of course, this is only one example. In other examples, some or all packages may be accessible via a second address concurrently, or a mixture of first and second addresses of respective packages may be accessible.

Figure 9:
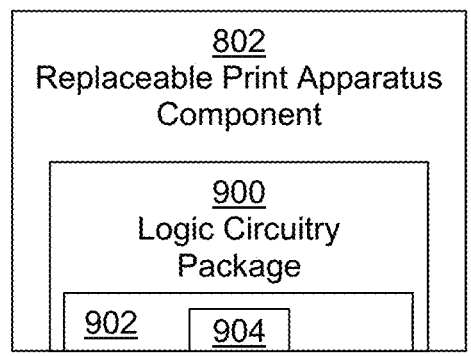
FIG. 9 shows an example of a replaceable print apparatus component.

FIG. 9 shows an example of a replaceable print apparatus component 802 which includes an I2C compatible logic circuitry package 900, which may comprise any of the attributes of the packages 400a-d or of the circuitry 424 described in relation to FIGS. 4A-E, and which may in some examples be configured to carry out any of the methods described herein. The package in this example comprises an I2C interface 902 including a data contact 904 to communicate via an I2C bus of a host printer.

The package in this example comprises a memory comprising data representing print liquid characteristics, and the data is retrievable and updatable via the data contact 904. The package 900 is configured to, in response to a read request received from a host apparatus via a first I2C address (i.e. the read request is addressed using the first address), transmit data including said data representing print liquid characteristics over the bus and via the data contact 904. Different replaceable print apparatus components 802 may be associated with memories which may store different print liquid characteristics.

The package 900 is further configured such that, in response to a command indicative of a task and a first time period received via the first address, the package transmits data for the duration of the time period over the same bus and data contact in response to (and in some examples, only in response to) received commands which are addressed to at least one second address, different than the first address, and after the end of the time period, again transmit data over the same bus and data contact in response to (and in some examples, only in response to) received commands which are addressed to the first address.

In some examples, the at least one different address includes a default second address and a further or temporary second address wherein the package 900 is configured to, in response to a received command which is addressed to the default second address, reconfigure the address to be the temporary second address and/or to respond to (and in some examples, only in response to) subsequent commands sent to the temporary second address until the end of the time period. Such responses may be sent over the same bus and the single data contact 904.

The replaceable print apparatus component 802 may be provided as one of a plurality of print apparatus components, the memories of which store different print material characteristics. The package of each of the plurality of replaceable print apparatus components may be configured to, in response to a command indicative of the task and the first time period received via respective first addresses, transmit data responses to received commands which are addressed to the same respective default addresses.

In some examples, the package 900 is configured to transmit, in response to indicated received commands which are addressed to the first address outside the time period, data that is authenticated, for example, cryptographically authenticated, for example using a secret key and accompanied by a message authentication code. During the time period, however, data which is not authenticated may be transmitted in response to received commands which are addressed to the at least one different address.

Figure 10:
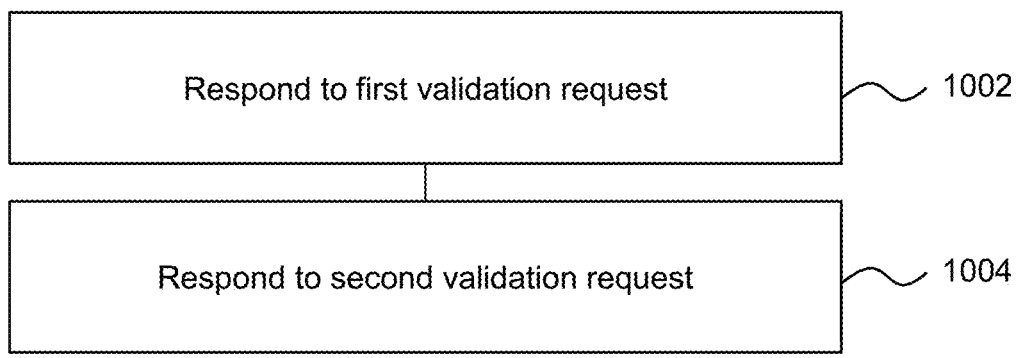
FIG. 10 is an example of a method of validating a print apparatus component.

FIG. 10 describes a method of validating a print apparatus component using logic circuitry associated therewith. In some examples, the logic circuitry may be a logic circuitry package 404*a-d*, 900 and/or processing apparatus 424 as described above.

For example, in validating a print apparatus component, it may be intended to verify that a print agent container originates from an authorized source, so as to ensure the quality thereof (for example, by performing an authentication thereof). In some examples, the validation process may include an integrity check to ensure that the replaceable print apparatus component and/or the logic circuitry associated therewith is functioning as expected. This may comprise requesting sensor information such that logic circuitry of a print apparatus component can check that this sensor data complies with expected parameters.

The method comprises, in block 1002, responding to a first validation request sent via an I2C bus to a first address associated with the logic circuitry with a first validation response. Block 1004 comprises responding to a second validation request sent via the I2C bus to a second address associated with the logic circuitry with a second validation response.

In some examples, the first validation response is a cryptographically authenticated response. For example, this may make use of a shared secret and/or use a cryptographic key. In some examples, the cryptographic response may comprise at least one 'signed' message, for example a message accompanied by a message authentication code, or may comprise an encrypted response. In some examples, the second validation response comprises an unencrypted response(s), or unsigned response(s). In some examples, most or all responses to validation requests sent to the first address are cryptographically signed using a key stored on the logic circuit, while no responses to validation requests sent to the second address are cryptographically signed. This may allow processing resources used to provide responses to commands sent to the second address to be reduced.

Figure 11:
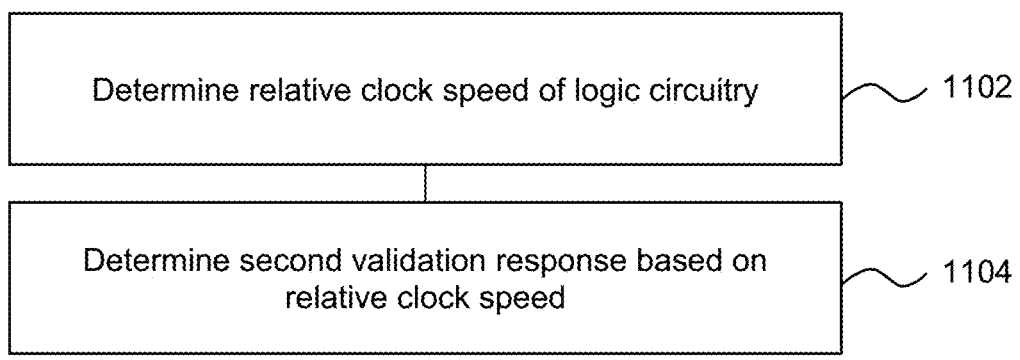
FIG. 11 is a further example of a method of validating a print apparatus component.

FIG. 11 describes one example of block 1004 in greater detail. In this example, the second validation request comprises a request for an indication of the clock speed of a timer of the logic circuitry (in some examples, a request for a clock speed of the second timer 404*b*, or more generally a timer associated with the second logic circuit). The method comprises, in block 1102, determining a clock speed of the logic circuitry relative to a frequency of another system clock or cycle signal measurable by the logic circuitry. Block 1104 comprises determining a second validation response based on the relative clock speed. This may, for example, allow a time period to be set by a host apparatus in the context of a timer provided with the logic circuitry. In some examples, the clock speed of a timer of the logic circuitry itself may be measured in order to determine the validation response. For example, the number of clock cycles of the timer within a predetermined number of other clock signals/measurable cycles may be determined, and, in some examples, an indication of the result may be provided as the validation response. In some examples, a clock speed may effectively be determined by comparing a known clock speed of a timer of the logic circuitry with the clock speed. In some examples, the validation response may comprise a selection of a value (e.g. a clock count) held in a memory indicating the clock speed of the logic circuitry relative to a system clock/measurable cycle. As has been noted above, in one example the response may be based on the clock speed of an internal timer of the second logic circuit, which may be a second timer in addition to a first timer of the first logic circuit.

To consider one example of such a method, the logic circuitry may comprise a number of registers. In one example, a register may record the number of outputs of a timer of a logic circuitry package (in some examples, a timer associated with a second logic circuit) over a set number of cycles detectable by the logic circuitry. For example, over 8 detectable cycles, there may be, say, 120 cycles recorded using the internal timer of the logic circuitry package. This may be recorded in one or more registers. In such example, the value "120" could be recorded on a register or memory, which may be read and verified by the print apparatus logic circuit, wherein verification may for example comprise comparing the value with an expected value. In one example, this relative clock speed value may be represented by the clock count that is mentioned in examples of this disclosure. In another example, the clock count can relate to an absolute clock speed. The clock speed can be measured and compared with a stored clock count. In this disclosure, the stored clock count may include any value representing the relative clock speed or clock count including a reference value or a range.

In some examples, a system clock may be set to take account of a speed of the timer. In some examples, a system clock may be driven by a ring oscillator of the second logic circuit as described above. The second logic circuit may comprise multiple timers such as both a SAR clock (for the analogue to digital converter) and a system clock.

Figure 12:
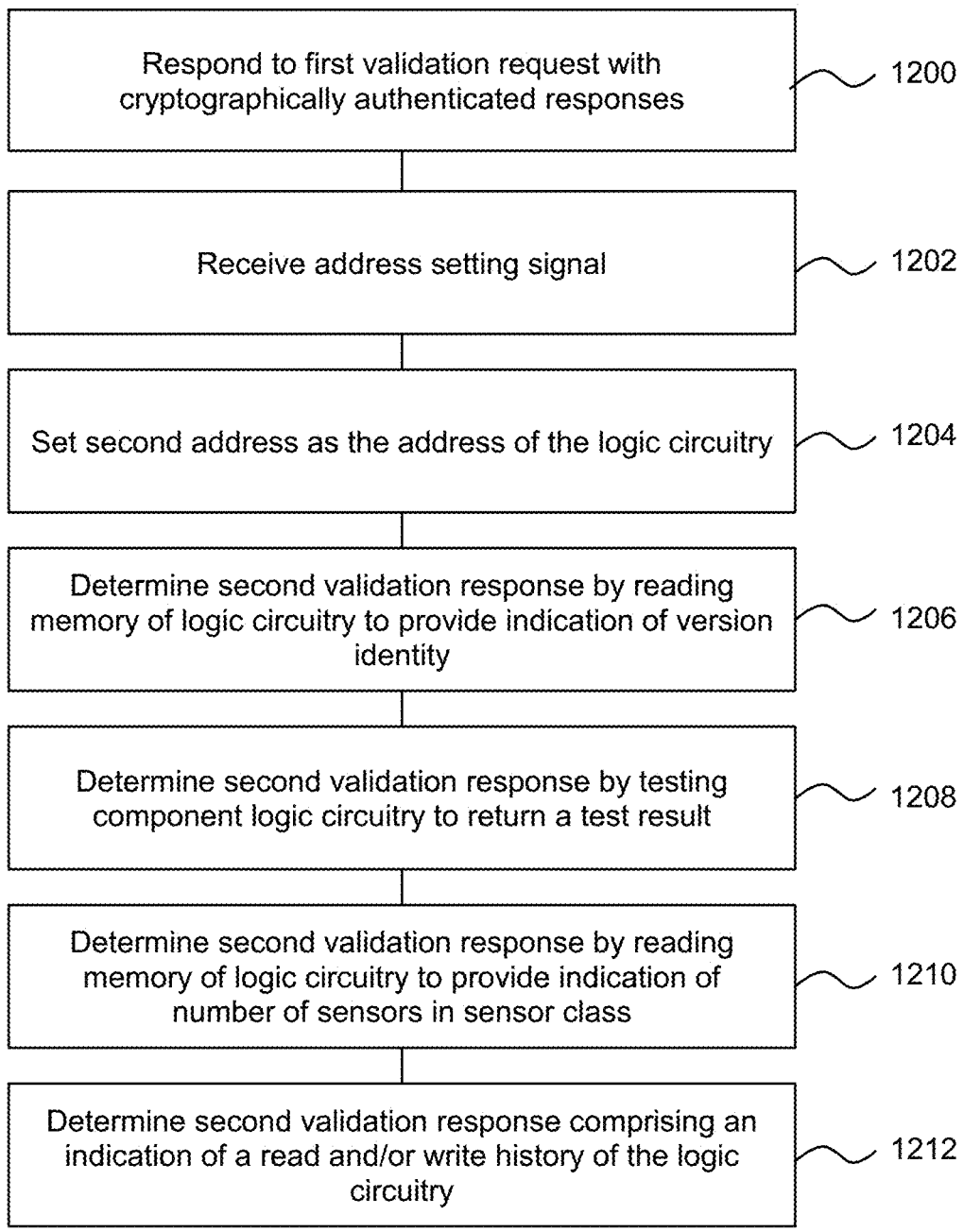
FIG. 12 shows another example of a method of validation.

FIG. 12 shows another example of a method of validation, which may be a method of validating a print apparatus component using logic circuitry associated therewith. In some examples, the logic circuitry may be a logic circuitry package 404*a-d*, 900 and/or processing apparatus 424 as described above.

In this example, the logic circuit package responds to a first validation request directed to its first address with cryptographically authenticated responses in block 1200. As part of the first validation any or any combination of a version identity (i.e. revision ID) of (at least part of) the package; a number of cells per class; a print material level; a clock count; a read/write history data and other identity and characteristics data related to the second address may be included. In some examples, identification data associated with a second logic circuit, such as the version identity, as described above may be stored in a first logic circuit. In some examples, the identification data may be stored in both the first and the second logic circuits. In some examples, after a second logic circuit has been enabled, as described above, the method comprises in block 1202, receiving an address setting signal, which is sent via the I2C bus to an initial second address associated with logic circuitry. In some examples, the address setting signal may be indicative of a temporary second address. For example host logic circuitry (e.g. logic circuitry of a print apparatus) may select and/or generate the temporary second address, and transmit this to the logic circuitry associated with the replaceable print apparatus component. In other examples, the temporary second address may be selected in some other way, for example based on data held in a memory of the logic circuitry. Block 1204 comprises setting the second address as the address of the logic circuitry. As noted above, in some examples, this may comprise replacing a default address with a temporary address which may be selected, in some examples, by a print apparatus.

In some examples, the temporary second address may be retained for the duration of a communication period, and then the address may revert to the initial address (which may therefore provide a default address). In some examples, the initial address is reinstated on the next occasion that the second logic circuit is enabled.

The method continues in block 1206 by determining the second validation response by reading a memory of logic circuitry to provide an indication of version identity. This may be an indication of the version of hardware, software and/or firmware used in the logic circuitry package, for example in a second logic circuit of the package. In some examples, this may be an indication of the version of at least one sensor which may be provided as part of the logic circuitry. The version identity (i.e. revision ID) of the second validation may match the version identity of the first validation.

For example, this may comprise providing one or more 'revision value', which may be the content of one or more registers. It may be the case that at least one, and in some examples, each, die and/or subcomponent of the logic circuitry is associated with a revision value which indicates the type or version of hardware, and may allow a master I2C circuit to provide more appropriate communications.

Assuming that the returned values meet predetermined criteria (for example, an expected number of revision values is returned and/or the revision value is recognised by a host print apparatus, or has a valid format or the like), the method continues in block 1208 by determining a further second validation response by testing at least one component of the logic circuitry to return a test result. While sensors may not be provided in association with all logic circuitry (and/or a test thereof may not be performed), in some examples, the second validation response may comprise an actual test of any provided sensors or cells involved in communications through the second address. For example, this may comprise a test to indicate that a cell and/or a resistor is responding as expected. For example, the test may include verifying the absolute or relative clock speed, for example by comparing the measured clock speed with a stored clock speed, as described above. In some examples an expected value for the clock speed may be determined based on the indication of version identity (e.g. the 'revision value'). For example, it may be determined that a particular version of hardware is expected to have a particular response value.

In block 1210 the method comprises determining a further second validation response by reading a memory of logic circuitry to provide an indication of the number of cells or sensors in at least one sensor class. In some examples, the returned number of this second validation should match a sensor count provided in the first validation. For example, this may provide an indication of the number of resistors in a fluid level sensor. In some examples, there may be a plurality of values provided relating, for example, to different sensor types. This validation feature may allow a print apparatus to configure parameters for later reading of the sensors. In addition, if this value is not an expected value, which may be determined by matching values provided in the first and second validations, it may result in the logic circuitry failing a validation test. In some examples the expected value may be determined based on the second validation response. For example, it may be determined that a particular version of hardware is expected to have a particular number of sensors.

In this example, a read and/or write status of at least part of the logic circuitry, (in some examples, the read/write history of a second logic circuit) is recorded in a memory thereof on an ongoing basis, for example between actions associated with each block of FIG. 12. In particular, in this example, a plurality of indications of a read/write status is stored in a memory, each being determined using a different predetermined algorithmic function. Such algorithmic functions (which may be secret algorithmic functions, or based on secret data, wherein the solution is also derivable based on a secret known by the print apparatus in which the replaceable print apparatus component is to be arranged) may be applied such that different read/write actions result in a different value being stored. The algorithmic function may include scrambling, e.g. signing the read/write history value, which may be executed by hardwiring or written instructions on the logic circuitry package. In some examples, the content of the read and/or write may be considered by the algorithm such that the same number of read/write operations may result in a different value being associated with the history if the content of the read/write operations differ. In some examples, the order of read/write operations may also impact the value stored. The algorithm could be stored or hardwired in the logic circuitry package, for example in the second logic circuit. In some examples, the read/write history status value can be used for data communication error checking. In some examples, the logic circuitry package is configured to update the read/write history after read/write events. For example, the second logic circuit may be configured, for example hardwired, to re-write the read/write history data portion after each respective read or write action on the second logic circuit, wherein the read/write history data portion may be re-written after or at each read or write cycle. The read/write history data portion may be updated after a read request from the print apparatus, a write request from the print apparatus, or both. For example, the updating may be based on an internal output buffer refresh, or it may be based on a received instruction of the print apparatus circuit. The second logic circuit may be hardwired to update the read/write history data portion based on actions of the second logic circuit. In an example, the logic circuitry package is configured to not update the read/write history when reconfiguring the second address to the temporary address. In an example, the logic circuitry package is configured to update the read/write history during the measured time period, after configuring the second address to the temporary address. In yet another example the print apparatus rewrites the read/write history data field.

In this example, therefore, the method further comprises storing a plurality of indications of the read/write history status of the logic circuitry and updating the stored indication with each read/write request of the logic circuitry.

In block 1212, the method comprises determining a further second validation response which comprises an indication of a read and/or write history of the logic circuitry. The response may be selected based on an indication provided in the request, such that an expected value, associated with a particular algorithmic function is selected and returned. The algorithmic function may be stored or hardwired in the logic circuitry package, for example the second logic circuit. The algorithmic functioning may include signing the read/write history data. Providing a number of different algorithmic functions may assist in increasing security of the validation process.

In one example, the logic circuitry comprises at least one register (e.g. read-only) that creates a value representing a signature, i.e. that allows for decoding and checking by a print apparatus that stores the data to decode the signature. A value indicative of the read/write history may be stored therein and may be updated when operations (reads/writes) occur within the logic circuitry, and therefore provides an indication of a read and/or write history of the logic circuitry. It may not be the case that all actions result in the register being updated and there may be at least one register access event that does not result in the value being updated. The order of the read/writes may have an effect on the values. As the host apparatus may keep its own history of the reads and writes it requests of the logic circuitry, it can verify the value against its own record to determine if the read/writes are being performed and/or if the function to determine the value is operating as expected.

In this example, while such methods may be thought of as pseudo-cryptographic methods, as they may be based on a shared secret, the second validation response may be provided without a digital signature or message authentication code or session key or session key identifier, nor may it qualify as cryptographically authenticated communication, whereas the first validation response may be provided with a digital signature, message authentication code or session key and/or session key identifier and may qualify as cryptographically authenticated communication. In one example, the different validations may be associated with different logic circuits that can be integrated in the package in a relatively cost-efficient way without compromising system integrity.

In some examples, the methods of any of FIGS. 10 to 12 may be carried out in relation to replaceable print apparatus components in which sensors are likely to contact printing fluids. Such contact may mean that the sensors are liable to suffer damage and therefore verifying that the sensors are acting as intended may be particularly beneficial. However, the methods may also be carried out in relation to other types of replaceable print apparatus components.

In some examples if any validation response is not as expected (or, in some examples, if a response and/or an acknowledgement of a request is not received), a print apparatus may determine that a replaceable print apparatus component has failed a check, and, in some examples, may reject the replaceable print apparatus component. In some examples, at least one operation of the print apparatus may be prevented or altered as a result of a replaceable print apparatus component failing a check.

In some examples, the validation responses may be provided in time slices, with each test being carried out in a serial manner.

Figure 13A:
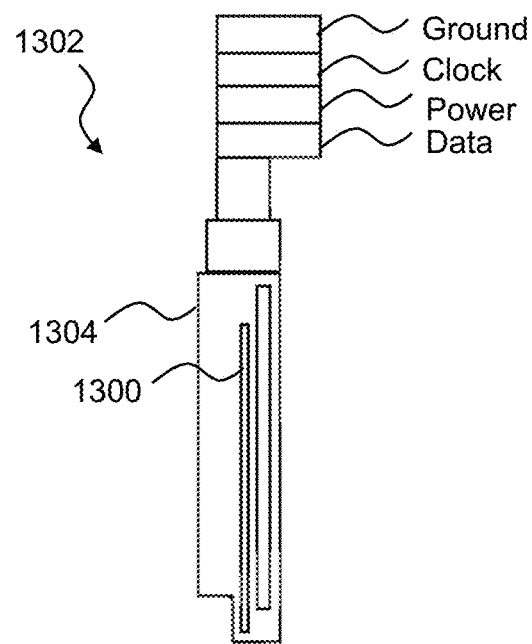
FIG. 13A shows an example arrangement of a fluid level sensor.

FIG. 13A shows an example of a possible practical arrangement of a second logic circuit embodied by a sensor assembly 1300 in association with a circuitry package 1302. The sensor assembly 1300 may comprise a thin film stack and include at least one sensor array such as a fluid level sensor array. The arrangement has a high length:width aspect ratio (e.g. as measured along a substrate surface), for example being around 0.2 mm in width, for example less than 1 mm, 0.5 mm or 0.3 mm, and around 20 mm in length, for example more than 10 mm, leading to length:width aspect ratios equal to or above approximately 20, 40, 60, 80 or 100:1. In an installed condition the length may be measured along the height. The logic circuit in this example may have a thickness of less than 1 mm, less than 0.5 mm or less than 0.3 mm, as measured between the bottom of the (e.g. silicon) substrate and the opposite outer surface. These dimensions mean that the individual cells or sensors are small. The sensor assembly 1300 may be provided on a relatively rigid carrier 1304, which in this example also carries Ground, Clock, Power and Data I2C bus contacts.

Figure 13B:
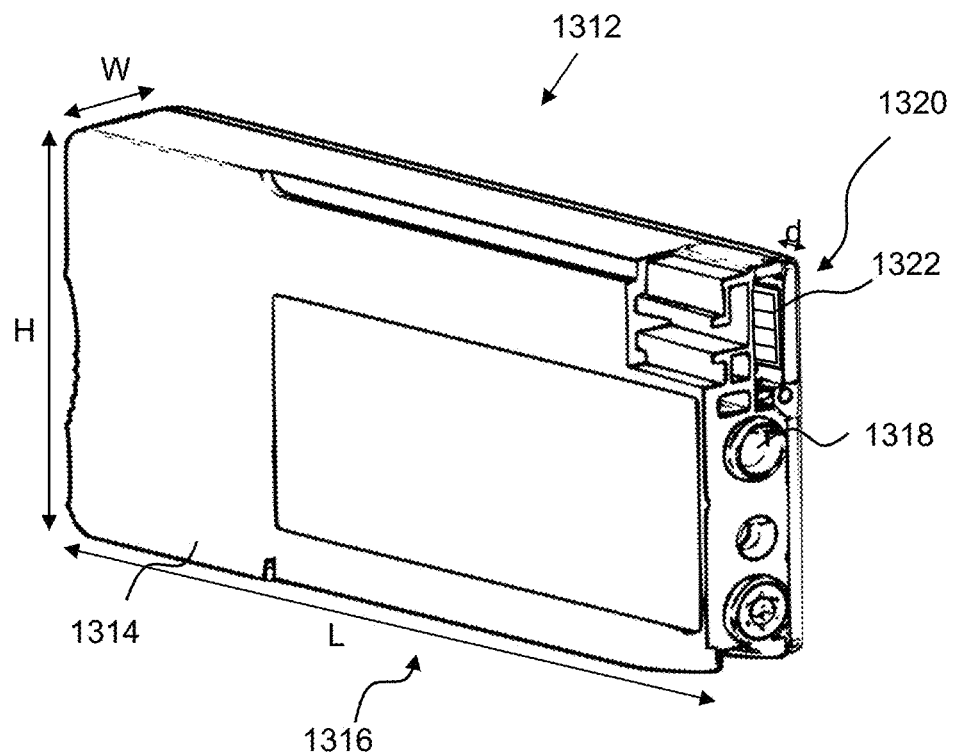
FIG. 13B shows an example of a perspective view of a print cartridge

FIG. 13B shows a perspective view of a print cartridge 1312. The print cartridge 1312 has a housing 1314 that has a width W less than its height H and that has a length L or depth that is greater than the height H. A print liquid output 1316 (in this example, a print agent outlet provided on the underside of the cartridge 1312), an air input 1318 and a recess 1320 are provided in a front face of the cartridge 1312. The recess 1320 extends across the top of the cartridge 1312 and I2C bus contacts (i.e. pads) 1322 of a logic circuitry package 1302 (for example, a logic circuitry package 400*a-d*, 900 as described above) are provided at a side of the recess 1320 against the inner wall of the side wall of the housing 1314 adjacent the top and front the housing 1314. In this example, the data contact is the lowest of the contacts 1322. In this example, the logic circuitry package 1302 is provided against the inner side of the side wall.

In some examples the logic circuitry package 1302 comprises a sensor assembly as shown in FIG. 13A.

It will be appreciated that placing logic circuitry within a print material cartridge may create challenges for the reliability of the cartridge due to the risks that electrical shorts or damage can occur to the logic circuitry during shipping and user handling, or over the life of the product.

A damaged sensor may provide inaccurate measurements, and result in inappropriate decisions by a print apparatus when evaluating the measurements. Therefore, a method as set out in relation to FIGS. 10 to 12 may be used to verify that communications with the logic circuitry based on a specific communication sequence provide expected results. This may validate the operational health of the logic circuitry.

In other examples, a replaceable print apparatus component includes a logic circuitry package of any of the examples described herein, wherein the component further comprises a volume of liquid. The component may have a height H that is greater than a width W and a length L that is greater than the height, the width extending between two sides. Interface pads of the package may be provided at the inner side of one of the sides facing a cut-out for a data interconnect to be inserted, the interface pads extending along a height direction near the top and front of the component, and the data pad being the bottom-most of the interface pads, the liquid and air interface of the component being provided at the front on the same vertical reference axis parallel to the height H direction wherein the vertical axis is parallel to and distanced from the axis that intersects the interface pads (I.e. the pads are partially inset from the edge by a distance d). The rest of the logic circuitry package may also be provided against the inner side.

In some examples, the print cartridge comprises a print material container comprising a validation circuitry package comprising a memory, a contact array for connecting with a I2C bus of a print apparatus, at least one timer, and circuitry to provide a first validation function, triggered by messages sent to a first address on an I2C bus; and a second validation function, triggered by messages sent to a second address on the I2C bus.

In pre-existing print apparatus components such as print cartridges, logic circuitry packages may consist of integrated circuits sometimes referred to as microcontrollers or secure microcontrollers. These integrated circuits are configured to store, communicate and update status and characteristics of corresponding print apparatus components, sometimes in a secure manner Said status may include a level of print material, for example updated by the print apparatus after each print job and based on drop count and/or page count. Basing the status on drop count or page count implies an indirect way of measuring a remaining print material level because it may be based on, e.g., global print statistics rather than the contents of the individual print apparatus component. Consequently, the status or characteristics of a print apparatus component, as stored and reflected by its associated logic circuitry package could be wrong or not reliable.

This disclosure addresses first example logic circuitry packages adapted to enable connecting further sense devices to a print apparatus component, or including those sense devices. This disclosure also addresses other examples of logic circuitry packages that are configured to be compatible with a print apparatus logic circuit that is designed to be compatible with (e.g. read, write and/or command) the first example logic circuitry packages.

As said, different examples of this disclosure facilitate different sub-devices in a circuit package of a replaceable print component to communicate with a printer controller, for example in addition to, or instead of, the afore mentioned microcontroller-based integrated circuits alone, which are typically not configured to directly measure certain components' status.

In one example, the logic circuit package allows for a relatively secure and reliable communication while controlling costs and/or manufacturing. Certain examples of this disclosures facilitate adding capabilities to (partly) existing communication protocols in printers, such as the existing I2C busses that communicate with integrated circuits on the print apparatus components.

In one example, this disclosure explores inclusion of, for example, lab-on-chip type, cell arrays (e.g. as part of "second logic circuits") in print apparatus component logic circuitry packages, which in one example may be implemented in conjunction with existing print apparatus interface buses, for example in an effort to control costs and reliability. As explained earlier, examples of second logic circuits include thin, silicon-based, sensor arrays. In one example these sensors do not use established or standard digital data communication protocols such as I2C. Rather they may rely on custom analogue signal communications. Some of the examples of this disclosure involve the integration of such memory arrays in logic circuitry packages of print apparatus components.

Figure 14:
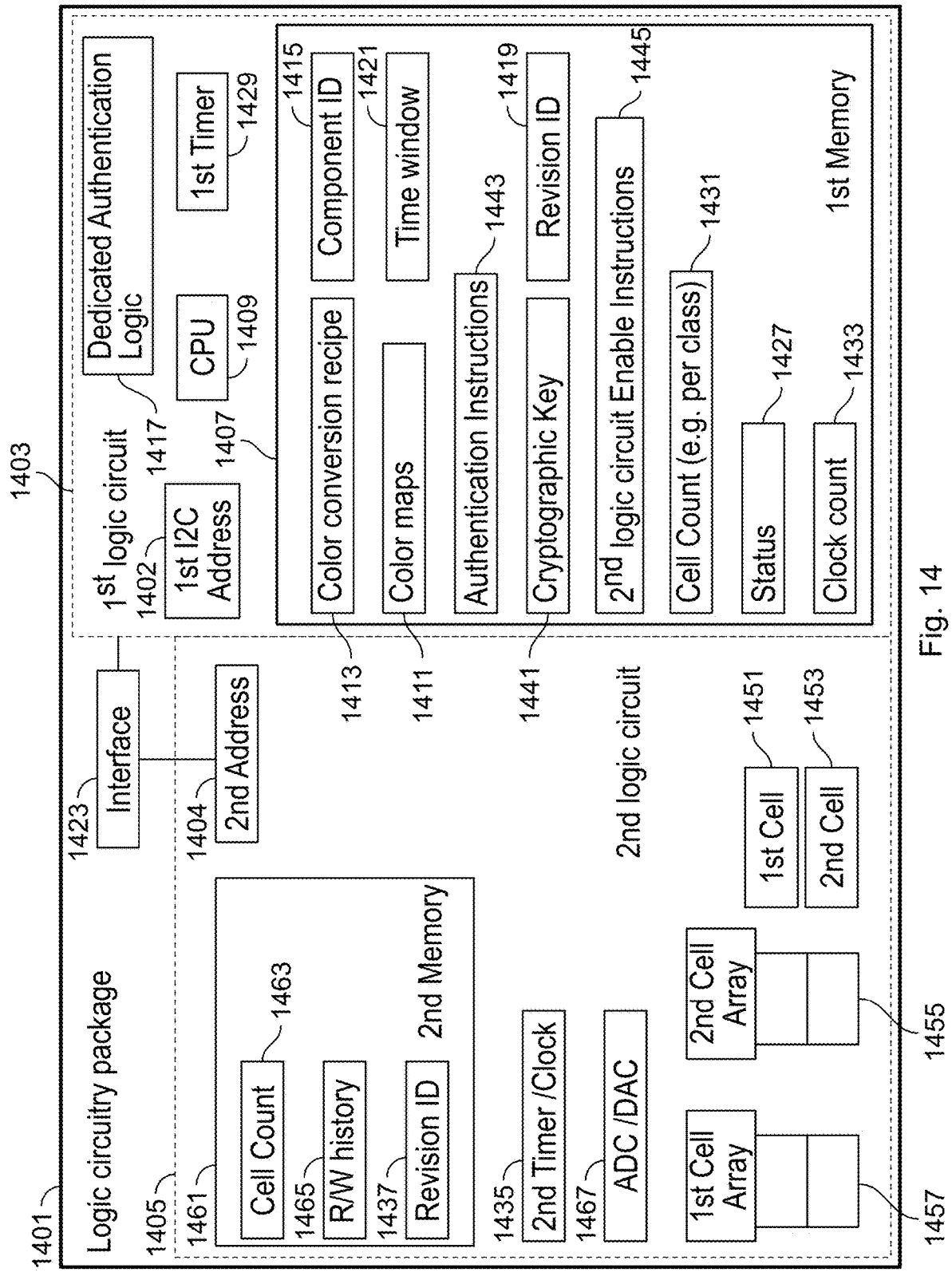
FIG. 14 shows an example of a logic circuitry package.

FIG. 14 represents different specific examples of a logic circuitry package including such sensor arrays.

FIG. 14 illustrates a logic circuitry package 1401 for a replaceable print component to interface with a print apparatus logic circuit through a single interface package and having a second logic circuit 1405 with cell or sensor arrays. The logic circuitry package 1401 may include a first logic circuit 1403 and a second logic circuit 1405, although the sub-features that will be described below could be provided in a single package without a clear distinction between first and second logic circuit 1403, 1405. In fact, the illustrated logic circuitry package 1401 may include some, not all, of the illustrated sub-components. The illustrated sub-components have been addressed in other examples of this disclosure. Some of the features are explained in relation to the first and second validations. For a better understanding of certain features of FIG. 14 reference is made to all the publications cited in this disclosure, all of which pertain to the present applicant.

The first logic circuit 1403 includes a first address (indicated by a block 1402), which may be a first I2C address, and which may be different than other packages of other components that are to be connected to the same host apparatus at the same time. The second logic circuit 1405 may include a second address (indicated by block 1404) which, at least before or at enabling the second logic circuit 1405, may be the same as other packages of other components that are to be connected to the same host apparatus at the same time. At or after enablement of the second logic circuit 1405 the second address may be reconfigured, for example to be different than other connected packages 1401.

The first logic circuit 1403 includes a memory 1407 and a CPU (central processing unit) 1409. The memory 1407 may include a signed and unsigned portion, for example depending on desired security of a particular data feature, as desired by an OEM and/or partly by available space of each signed or unsigned portion. The memory 1407 may store at least one of characteristics, status and identity data 1415, 1419/1437 associated with the replaceable print component. The characteristics may include colour, print material type, colour maps 1411, colour conversion recipes 1413, and other characteristics. The identity 1415 could include a product number, brand and/or any code to be associated with the identity of the replaceable print apparatus component, for example for association with a warranty of an OEM should that be necessary or for other reasons. In certain examples, the identity or identities 1419/1437, 1415 may intentionally be left blank, for example when a third party supplies other than the OEM the package 1401. The status may include data for association with a relative or absolute print material level 1427, for example based on at least one of page count, drop count and/or based on a status of cells 1451, 1453, 1457, 1455 of the second logic circuit 1403, 1405. The first logic circuit 1403 may further include a cryptographic key 1441 to cryptographically authenticate messages, which messages may include any of said status, characteristics and/or identity.

The logic circuitry package 1401 includes an interface 1423 to interconnect the package sub-components including the first and second logic circuit 1403, 1405 to the print apparatus interface bus, for example including three or four I2C compatible interconnect pads. The logic circuitry package 1401 may include separate, dedicated authentication logic 1417. The dedicated authentication logic may include its own dedicated processor separate from the CPU 1409, for example especially designed to perform a specific calculation cycle a high number of times within a short time window 1421. The time window 1421 may be stored in the memory 1407. The logic circuitry package 1401 may include a first timer 1429 to measure a timer period as indicated in a command, for example to execute a specific task such as enabling a second logic circuit. The first logic circuit 1403 may include, or be connected to, a signal path and/or switch to enable the second logic circuit 1405 and/or to determine a time from which the logic circuitry package 1401 is to respond to commands directed to the second, reconfigurable, address (indicated by a block 1404).

The memory 1407 may store characteristics related to the second logic circuit 1405. The memory 1407 may store a cell count 1431 for each of at least one class of cells 1451, 1453, 1457, 1455, to be associated with a number of cells of the respective class(es). The memory 1407 may store a clock count 1433 which may be associated with a relative or absolute clock speed of a second timer 1435. The memory 1407 may store a revision ID 1419 to be associated with a revision ID 1437 of the second logic circuit 1405.

Some of the previously mentioned data may be included as digitally signed data, such as, for example, at least one of the time window 1421, the revision ID 1419, the colour conversion recipe 1413, the colour maps 1411, the cell count 1433. In one example the cryptographic key 1441 is stored in separate, secure hardware memory which should be understood as being encompassed by the first memory 1407.

Furthermore, the memory 1407 may store at least one of instructions 1443 to cryptographically authenticate messages using the key 1441; instructions 1443 to provide an authenticated challenge response within the time window 1421; and instructions 1445 to enable/activate the second logic circuit 1405 based on a respective command including a timer period and/or a task, including measuring the time period for example with the first timer 1429; and other authentication or non-authentication instructions. The logic circuitry package 1401 may be configured such that communications in response to the commands directed to the first address can be cryptographically authenticated using the cryptographic key 1441, for example being accompanied by a message authentication code and/or session key identifier, while responses to commands directed to the second address may not be cryptographically authenticated using the key 1441, for example not being accompanied by a message authentication code and/or session key identifier.

The second logic circuit 1405 includes a number of cells 1451, 1453 or cell arrays 1455, 1457 of different classes, the numbers of which may correspond to the cell counts 1431, 1463. The illustrated example includes four different cell classes but there may be more or less classes of different cells. For example, of each class, the cells may have a similar resistance, size, material or other property. An array of cells may include at least 50 or at least 100 cells. The cells may be adapted to heat or to sense a certain property such as presence of print material adjacent the cell. The cells may include resistors with or without sensing or heating properties, or dummy cells to receive signals only without influencing a read or write action. Depending on the type of cells, at least one ADC and/or DAC 1467 may be used to convert signals between digital and analogue, for example to facilitate signal conversions via the interface 1423.

The second logic circuit 1405 may include a second timer 1435 which may determine an internal clock speed, which clock speed may correspond to the stored clock count 1433.

The second logic circuit 1405 may store a revision ID 1437, which may be associated with certain properties by the print apparatus. The print apparatus may compare the first and second revision ID stored on the respective first and second logic circuit 1403, 1405, as explained in relation to the first and second validation responses.

The second logic circuit 1405 may be configured to communicate, the at least one cell count 1463 pertaining to each respective class of cells, which may correspond to the cell count 1431 of the first logic circuit 1403. In another example the cells per class may be probed by the print apparatus logic circuit or the logic circuitry package when installed in the print apparatus. For example, a cell count of the second logic circuit 1405 may be determined by measuring a last sensor or last sensor property. The read or tested cell count may be compared to the cell count stored in the first logic circuit 1403.

The logic circuitry package 1401 may include a field or data portion 1465 storing a read/write history associated with read and write actions associated with the second address 1404, for example the temporary second address 1404. The logic circuitry package may be configured to update that field after each respective read/write session, using an algorithmic function that may be partly based on the contents of the read/write session and/or on other variables, which function may some form of bit scrambling.

The second logic circuit 1405 may include a second memory arrangement 1461 that stores at least one of these second logic circuit characteristics, such as the cell count 1463, RAY history 1465 and/or revision ID 1437.

As mentioned earlier in relation to a first and second validation, in one example, communications from the second logic circuit 1405 are not cryptographically authenticated using the same cryptographic key as communications from the first logic circuit 1403 and/or are not cryptographically authenticated at all. In one example the signal output of the second logic circuit 1405 may be hardwired to scramble its output signals which in turn may be decoded by the print apparatus logic circuit.

In certain examples, integrating relatively unexplored, sometimes relatively complex, sense devices to print apparatus components could lead to unanticipated problems in the field. For example, the manufacturer may not be able to predict exactly how the innovation may work out after several years on the shelves in different climate conditions and then in a connected state during and between different printing conditions. In addition, unanticipated cost and manufacturing issues could arise. Also there may be a desire to provide an alternative component to connect to the same print apparatus for other reasons. To alleviate any of these potential challenges or other challenges, certain print apparatus components such as print service cartridges may not be equipped with sensor arrays. Accordingly, this disclosure also encompasses other example logic circuitry packages that are compatible with a host print apparatus logic circuit that was originally adapted to communicate to the second logic circuits with sensors, which host print apparatus may in certain instances already be operational at many different customer locations around the globe prior to designing these other compatible packages. These other compatible packages are adapted to not rely on the same second logic circuits with sensors to communicate with the original host print apparatus logic circuit. In these examples, certain physical hardware components such as sensor devices may, at least partly, be replaced by different virtual or hardwired components or data representative of the different properties or states depending on the received printer command, which may allow the print apparatus to accept these logic circuitry packages as including original sensor arrays. In addition to being operable, these compatible packages may need to pass certain integrity checks such as the mentioned first and second validations.

Figure 15:
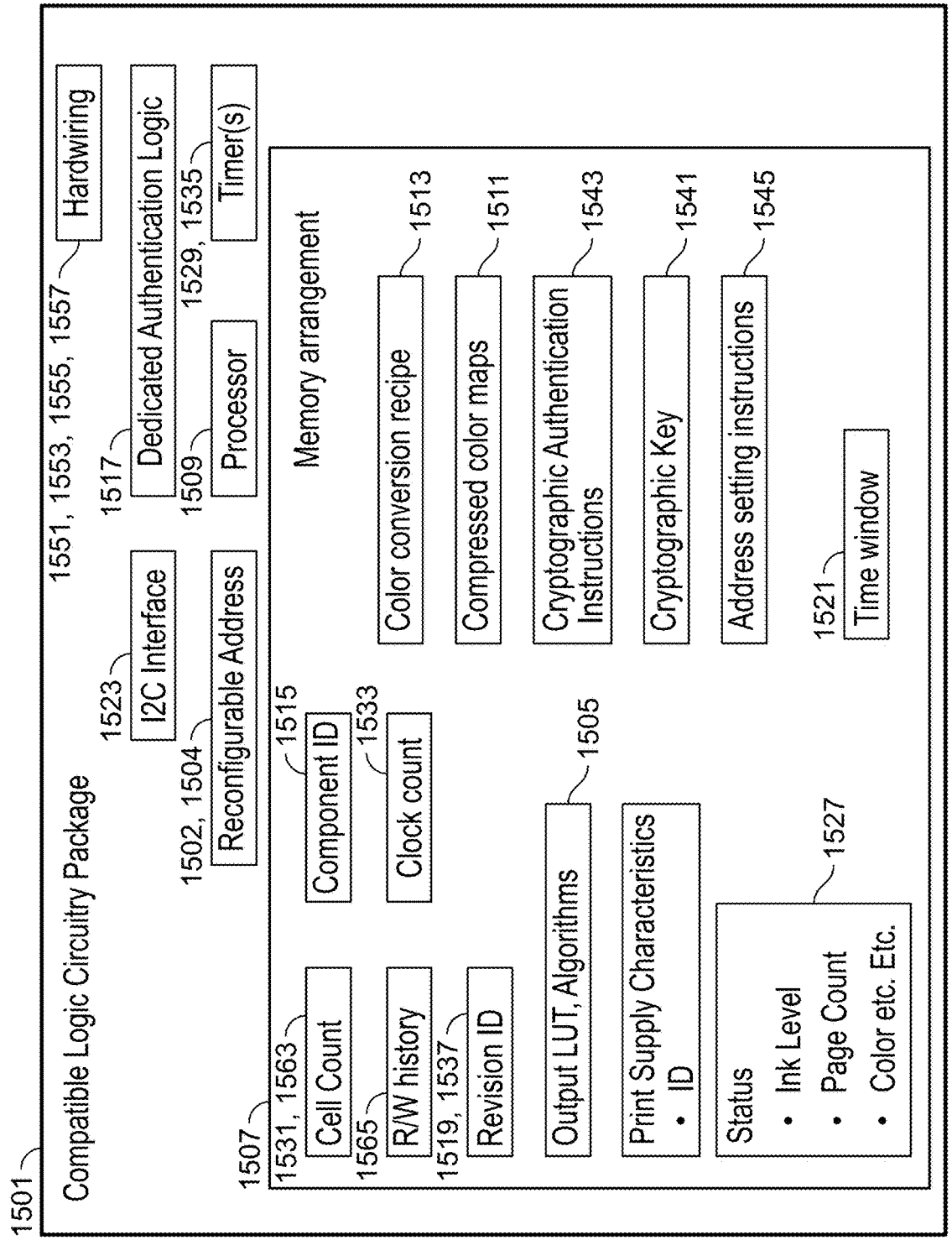
FIG. 15 shows a further example of a logic circuitry package.

In one example, these compatible packages can be relatively cheap or relatively easy to manufacture. In other examples, these compatible packages can be more reliable then the sensor-arrays logic circuitry package of this disclosure. In again other examples, these compatible packages provide for an alternative to sensor array-based second logic circuits. In again other examples, these compatible packages may facilitate testing or servicing the print apparatus or other components of the print apparatus. The compatible package may be designed to output similar responses to print apparatus logic circuit commands so that the print apparatus logic circuit accepts the responses, as if an original second logic circuit is installed. In certain examples, the compatible integrated circuits could be provided when the certain sensor-array based logic circuitry packages in the field fail to replace these failing integrated circuits; to save costs; because they are easier to manufacture; as an alternative; or for other reasons. FIG. 15 discloses an example of such other, compatible logic circuit package. Earlier mentioned examples also encompass such alternative package, such as for example FIG. 4B.

FIG. 15 illustrates a compatible logic circuitry package 1501 configured to have similar responses to respective print apparatus commands as the logic circuitry package 1401 of FIG. 14. The logic circuitry package 1501 includes an interface 1523 to connect to the print apparatus interface bus, for example including three or four I2C compatible interconnect pads. The first logic circuitry package 1501 includes a memory 1507 and a CPU (central processing unit) 1509. The package 1501 may store instructions 1545 to respond to corresponding commands directed to (i) a first address; and, at an enable command including a time period, (ii) an initial second address; and when receiving a reconfigured address, (iii) a reconfigured second address (as indicated by block 1502, 1504). The memory 1507 may store at least one of characteristics 1515, 1519, 1537, including identity data and a status 1527 associated with the replaceable print component.

This example package 1501 may include certain LUTs, algorithms 1505 and/or hardwiring 1551, 1553, 1555, 1557 configured to generate responses that the print apparatus logic circuit associated with these cells. In one example, the hardwiring of the logic circuitry package 1501 has similar properties as the cell arrays and cells of FIG. 14, to assist in generating compatible output signals or receiving input signals. In one example the hardwiring is to receive input signals and/or to mimic cells such as resistors and registers. In one example, the hardwiring may include a second timer or clock corresponding to a clock count 1533. In another example the second logic circuit of FIG. 14 may be replaced by a full virtual emulation, for example using said LUT and/or algorithm 1505, without additional hardwiring. The output LUT 1505 may be configured to associate certain received commands and signals with certain acceptable outputs, for example at least partly based on an updated status 1527. In addition to, or instead of, the output LUT 1505, algorithms may be provided to generate compatible outputs. Hence, the output LUTs, algorithms 1505, and the hardwiring 1551, 1553, 1555, 1557 may be configured to represent a sensor array 1451, 1453, 1455, 1457 or a complete second logic circuit 1405 (FIG. 14), which in this example of FIG. 15, is at least partly virtual and does not need to represent an actual status of the print component in the way the print apparatus would interpret this. Rather the LUT, algorithm 1505 and/or hardwiring 1551, 1553, 1555, 1557 may facilitate a working, compatible logic circuitry package 1501 to be able to print with the print apparatus.

The compatible package 1501 stores the revision ID 1519, 1537, for example in one field or in two fields, or is at least configured to provide it to the print apparatus based upon a corresponding read request. The revision ID 1519, 1537 is another ID that the print apparatus logic circuit may associate with the second logic circuit, which as explained in this example may not be present physically but may to some extent be represented virtually. Similarly, the package 1501 may store a cell count 1531, 1563, a clock count 1533 which may or may not be associated with a relative or absolute clock speed of the timer 1529, 1535. The logic circuitry package 1501 may be configured to store and/or output read/write history 1565 associated with commands to the reconfigured second address 1504. The revision ID, cell count, clock count and read/write history may be readably provided in response to read requests via the second address, for example the reconfigured second address, and in a further example may not be cryptographically authenticated using the cryptographic key 1541.

Certain features of this logic circuitry package 1501 may be similar to, or the same as, the first logic circuit 1403 of FIG. 14. For example, the characteristics may include colour, print material type, colour maps 1511, colour conversion recipes 1513, and other characteristics. The identity or identities 1515 could include a product number, brand and/or any code to be associated with the identity of the replaceable print apparatus component. The status 1527 may include data that the print apparatus associates with a print material level. The logic circuitry package 1501 may include a cryptographic key 1541 to cryptographically authenticate messages, which messages may include any of said status, characteristics and/or identity. The logic circuitry package 1501 may include separate, dedicated authentication logic 1517 and store a corresponding time window 1521. The logic circuitry package 1501 may include a first timer 1529, 1535 to measure a timer period as indicated in a respective command. In one example a single timer device 1529, 1535 could be used to represent the first and second timer.

Furthermore, the package 1501 may store at least one of instructions 1543 to cryptographically authenticate messages using the key 1541; instructions 1543 to provide an authenticated challenge response within the time window 1421; and instructions 1545 to set the address 1502, 1504 based on a respective command including a timer period and/or a task, including measuring the time period for example with the timer 1529, 1535; and other authentication or non-authentication instructions. The logic circuitry package 1401 may be configured such that communications in response to the commands directed to the first address are cryptographically authenticated using the cryptographic key 1541, for example being accompanied by a message authentication code and/or session key identifier, while responses to commands directed to the second address may not be cryptographically authenticated using the key 1541, for example not being accompanied by a message authentication code and/or session key identifier.

Some of the previously mentioned data portions may be stored as digitally signed data, such as, for example, at least one of the time window 1521, the revision ID 1519, 1537, the colour conversion recipe 1513, the colour maps 1511, the cell count 1533 and other data, to allow a printer to correspondingly decode/unsign the data.

In the examples of FIGS. 14 and 15 interface connection pads of the interface 1423, 1523 of the logic circuitry package 1401, 1501 may correspond to the interface contacts illustrated in FIGS. 13A and 13B. The example of FIG. 15 may be provided entirely or largely on the outside of the print apparatus component of FIG. 13B while the example of FIG. 14 may be provided partly or largely inside of the print apparatus component of FIG. 13B (e.g. against an inner wall of the print material reservoir), except for the interface connection pads.

Figure 16:
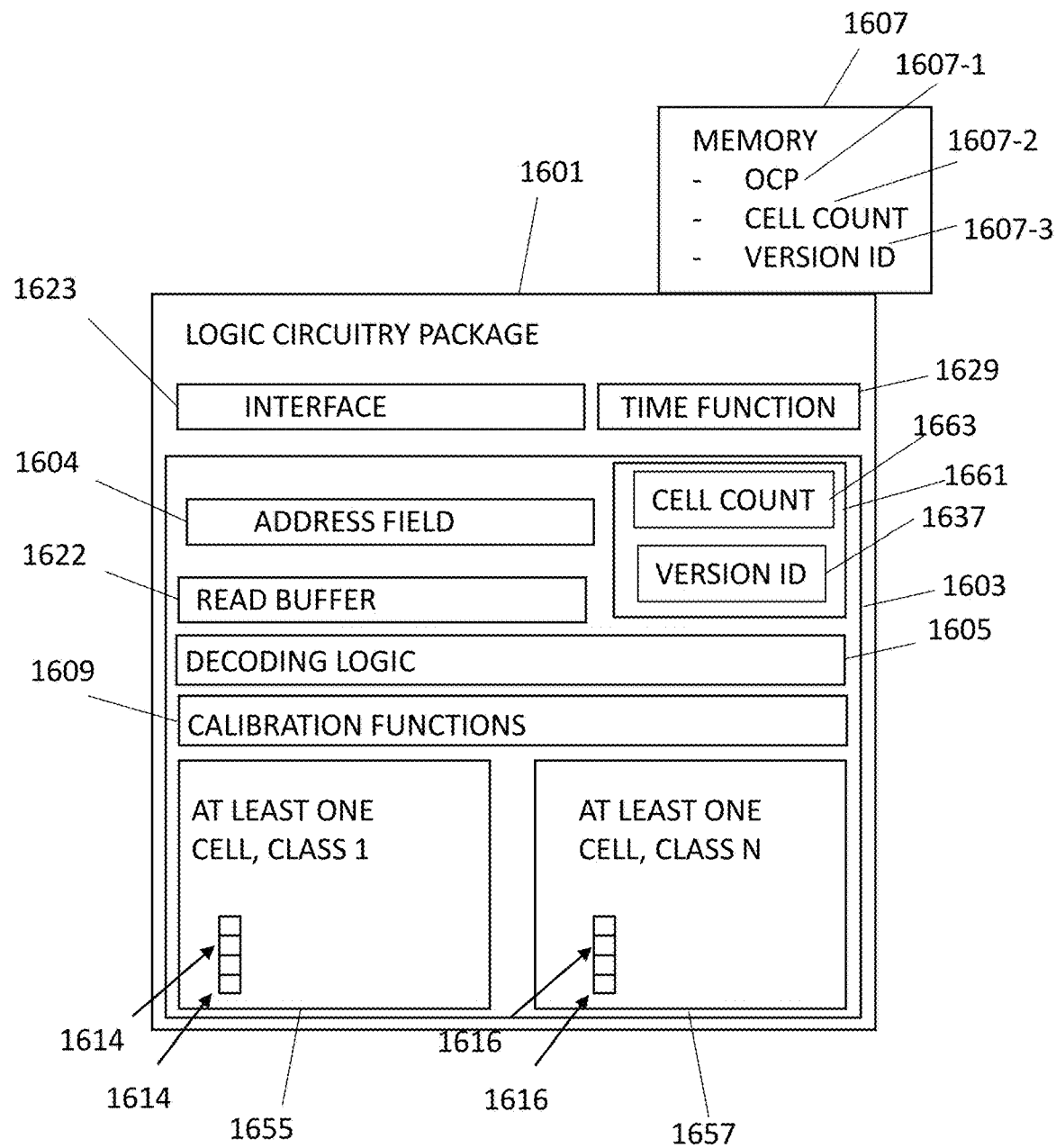
FIG. 16 shows another example of a logic circuitry package.

FIG. 16 illustrates a diagram of an example of a logic circuitry package 1601 for a replaceable print component in accordance with this disclosure. The logic circuitry package 1601 may be an intermediate product, configured to be part of a replaceable print component such as a 2D or 3D print cartridge including a reservoir for print material. The print material may be a print liquid (e.g., ink) or print powder (e.g., toner, 3D build powder) or any other agent to print in two- or three-dimensional print processes.

The logic circuitry package 1601 includes at least one logic circuit 1603, for example a plurality of interconnected logic circuits, physically integrated in on a single support structure or physically separated using different support structures. The package may include a moulded compound and/or the print material container as a support structure, whereby sub-circuits or (sensor) cells of the package may be physically electrically connected or wirelessly connected. Where there are different logic circuits, these may be interconnected, at least through the interface 1623 and/or through other wiring or wireless interfaces. In one example the logic circuitry package 1601 includes a first logic circuit that is a microcontroller or has the properties of a microcontroller. In a further example the package 1601 includes a logic circuit 1603 that responds to commands directed to a different address than a default I2C communication address of the first logic circuit. The logic circuit 1603 can be the second logic circuit described above and/or a sensor circuit. The first and second logic circuit addressed previously may be connected to the same interface 1623, and may be, but need not be, packaged together in this package 1601. In another example the logic circuitry package 1601 has only a single integrated logic circuit with integrated functions, for example in a single compact package.

The logic circuitry package 1601 may include a communication interface 1623 to communicate with a print apparatus logic circuit through an interface bus, such as an I2C serial communication bus, for example connecting power, data, clock and/or ground, as explained earlier (certain examples may use less contacts and harvest power from the clock or data signal). In other examples, the interface 1623 may facilitate digital communications that are not in accordance with an I2C communication protocol. In again other examples, the interface 1623 may facilitate analogue communications.

In accordance with earlier mentioned principles in this disclosure, the logic circuit 1603 may include an address field 1604. The address field 1604 facilitates that the logic circuit 1603 transmits command portions received from the print apparatus logic circuit and directed to the address of the address field 1604 to the different functions of the logic circuit 1603. The address field 1604 may have a default second address (e.g., after reset) and may be adapted to facilitate reconfiguration of its set address to any (e.g., random) new second address. The logic circuit 1603 may further include a time function 1629 such as a timer or delay circuit that may be monitored or may be set to expire at the end of a specified time period, so that after the time period the logic circuitry package 1601 again processes communications over the first address different than the address of the address field 1604.

The timer may comprise an integral timer, internal to the logic circuitry, for example comprising a Resistance-Capacitor (RC) circuit configured to act as a timer, logic gates configured with a counter, a crystal or a ring oscillator, a phase lock loop (also known as a phase-locked loop) or the like, or any timer which may logically form part of a logic circuitry package 1601. The timer may provide an internal clock signal which is provided even in the absence of a clock signal on the serial data bus. The timer may count and thus allow for determination of the duration of the timer period specified in the first command. In one example a delay circuit may be provided for the time function which may be at least partly the same as the timer, only that it can be set to expire in accordance with the specified time period, and hence, it does not require monitoring by a controller function of the logic circuitry package 1601. The delay circuit may include a plurality of selectable delay circuits, each expiring after a different duration. The delay circuit may include a plurality of delay line switches, each set to expire after a characteristic duration. An example of a delay line switch includes a transistor with a leaking floating gate, or an R-C circuit and a comparator, for example similar to aspects of the timer. In one example, the delay function is configured to, upon receipt of the first command, select the delay line switch that corresponds with the specified time period and enable it.

The package 1601 includes a read buffer 1622 to be read by the print apparatus logic circuit, for example, through the serial bus interface 1623. In one example, the logic circuit 1603 is to load a value to the buffer 1622 in response to a read request, which value has been generated based on certain previously set or communicated parameters. In other examples, the logic circuit 1603 may be configured to output analogue signals.

The package 1601 further includes decoding logic 1605 to identify calibration, class and/or sub-class parameters in an input command stream, which parameters condition the output of the logic circuit 1603. The package 1601 includes calibration logic including one or more calibration functions 1609 to calibrate the output based on the calibration parameters received from the print apparatus logic circuit. The calibration logic may be common calibration logic to calibrate inputs and/or outputs (calibrating an input may affect the output and may in this disclosure be comprised in calibrating the output) for a plurality of classes.

As will be explained below, each parameter may specify a function (e.g., to indicate which function to address like a certain calibration function, class selection function, or sub-class selection function) and a value (e.g., to set the ID or magnitude of the selected function, for example, to identify which sensor or cell to select). The decoding logic 1605 may be configured to identify these parameters and select or set a corresponding logic function (e.g., set a calibration function based on the calibration value; select a sensor based on the class ID; select a sensor cell based on the sub-class ID). The logic circuit 1603 may be configured to respond to each read request with an output (e.g., count value) based on the parameters that were last communicated by the print apparatus logic circuit, or, were for certain logic functions no parameters were communicated, based on certain default-parameters-after-reset. In this disclosure logic functions may include a variety of different calibration functions, class selection functions (e.g. sensor select functions) and sub-class select functions (e.g. sensor cell select functions), whereby respective logic functions may be set or selected in accordance with the received parameters. For example, a plurality of logic function may be selected/set based on a single command stream such as selecting a sensor based on a class parameter, selecting a cell of that sensor based on a sub-class parameter, and, applying certain calibration settings based on certain calibration parameters.

The logic circuit 1603 may include at least two cell classes, for example a first and second cell class, each associated with a cell array of nominally the same cells in the same array, yet nominally different between the arrays/classes. The logic circuit 1603 may include further cell classes, for example a third and fourth class, each of which is defined by not more than one cell that provides a respective single cell output. In different examples, at least two, three, four, five, six or more different cell classes may be provided, wherein each cell of each class is nominally different than each cell of other classes. For the purpose of illustration FIG. 16 shows only a limited amount of cell classes 1655, 1657 and cells 1614, 1616. In other examples there could be greater numbers of cell arrays and cells. Cell arrays 1655, 1657 including sensor cells may also be referred to as sensors, wherein cells of different classes have different sense functions.

In this description different sensor types may be denominated by class and cells of the same type may be denominated by sub-class. The example logic circuitry package 1601 includes different cell arrays 1655, 1657 of different classes. Each cell class may be associated with a particular type of cell 1614, 1616. For example, each cell may be an electrical component and each cell class may refer to an array of electrical components having the same electrical properties. The same properties may refer to the same nominal electrical properties, for example defined by material, physical design, etc. There may be marginal differences between cells of the same array having the same nominal properties due to tolerances or imperfections in fabrication and materials. The cells may have at least approximately the same electrical properties within certain manufacturing tolerances, for example including sensitivity, resistance, impedance, capacitance, conductivity, etc.

Each cell may each provide a respective output value or signal in response to being selected and when under charge, whereby the output or signal may be representative of a state of the cell, for example an electrical property state. Print apparatus commands may be received by a logic circuit 1603, and class and sub-class parameters may be identified, to facilitate selecting a respective sensor type and sensor cell, respectively, of the logic circuit 1603.

The logic circuitry packages 1601 may be provided with at least three or four different cell classes. One or two of those classes may include at least 10, 20, 40, 60, 80, 100, or 126 sub-classes, for example, cells of the same nominal characteristics yet associated with different IDs such as different cell numbers. Cells of sensor cell arrays may be selected by associated class and sub-class parameters using the decoding logic 1605, to facilitate reading each selected sensor cell by the print apparatus logic circuit. Furthermore, the logic circuitry package 1601 may include at least one individual single-cell sensor in which case class parameters may be sufficient to select the cell and sub-class parameters are redundant.

The logic circuit 1603 may be configured so that cells 1614, 1616 of different cell arrays 1655, 1657 are selected by the same parameter values, for example, after being selected by different class parameters. For example, cells of different classes use the same series of IDs, wherein the IDs can be embodied by binary numbers. This may facilitate sharing of circuitry such as certain decoding logic functions. For example, all or some of the cells of different arrays 1655, 1657 may be associated with the same cell numbers. For example, the first and further cells of the first cell array are denominated 1, 2, 3 . . . n and the first and further cells of the second cell array are also denominated 1, 2, 3 . . . n. These numbers may be encoded in binary fashion. In other words, a cell of a first class and a cell of a second class, which are nominally different, may be selected using the same sub-class parameters, but preceded by different cell class selections parameters in the command stream.

In other, alternative, virtual embodiments, classes and other parameters are associated with respective portions of a look-up table (LUT), in addition to, or instead of, the physical cells. In, again, other alternative examples algorithms may be used to output certain values based on identified class and other parameters, whereby the classes and/or sub-classes may be difficult to detect. The example of FIG. 16 illustrates different physical cell classes 1655, 1657 and different physical cell sub-classes 1614, 1616 whereas alternative, virtual logic functions are discussed elsewhere in this disclosure, such as with reference to FIGS. 25 and 26.

The physical cells may comprise electrical components including resistors, strain gauges, diodes, different types of sensors, but also "dummy"-cells, test cells or reference cells, for a variety of purposes. In one example the cells are sensor cells.

Calibration functions 1609 may include calibration logic such as one or a combination of offset circuits, gain amplifiers, different AD and DA converter circuits, heater arrays, or virtual (programmed) calibration functions. A virtual calibration function may use offset or amplifier functions similar to hardwired calibration logic circuits. Different calibration functions may be combined in a single calibration logic circuit.

The logic circuit package 1601 may include a memory 1607 to store certain characteristics of that logic circuit 1603. That memory 1607 may be part of the logic circuit 1603 or may be separate from the logic circuit 1603.

In one example, a second memory 1661 is part of the logic circuit and stores a cell count 1663 indicative of a number of cells associated with at least one class or with a plurality of classes with the same number of cells. In one example, the cell count 1663 is a last cell number (which may be the total number of cells minus one as the first cell may be represented by a 0). For example, the cell count corresponds to a maximum number of cells of one, two, three or more predetermined classes. For example, a logic circuit may have a certain number of temperature sensor cells 1616 and the same number of strain sensing cells 1614. In another example, a first memory 1607, associated with a first address, and the second memory 1661, associated with a second address, each store the cell counts 1607-2, 1663, respectively in a differently encoded fashion. In another example a value associated with a version/revision ID 1637 of the logic circuit 1603 is stored on the second memory 1661. In one example the second memory 1661 is embodied by a series memory fields such as registers, addressable by memory addresses.

The cell count and/or version/revision ID can be stored as part of digitally signed data. The count and ID associated with the first (1607-2, 1607-3) versus second address (1663, 1637) may match, that is, contain the same yet differently encoded value, in a way that is to be validated by the print apparatus. The data associated with the first versus the second (default or new) communications address, for examples stored in the first versus second memory, may be encoded differently, for example, signed and/or encrypted where it is associated with the first address versus not signed and/or not encrypted, respectively, where it is associated with the second address. While the example of FIG. 16 illustrates two separate memories 1607, 1661, in an alternative example, the logic circuit 1603 includes a single memory with the same data, and wherein the logic circuit 1603 may be configured to encode the data depending on whether the print apparatus command is directed to the first versus the second address.

The decoding logic 1605 is configured to identify, from a command stream received from the print apparatus, class parameters to select respective cell classes 1655, 1657 based on the parameters. The logic circuit 1603 is configured to respond with output values or signals representing the selected cell class. As explained, the cell class may be associated with a cell array 1655, 1657 or a single cell (e.g., see the examples of FIGS. 4E, 14, 22). Similarly, the decoding logic 1605 is further configured to identify, from the command stream, cell sub-class parameters, to select a cell 1614, 1616 of a previously selected cell array 1655, 1657.

The decoding logic 1605 may be configured to load the parameters specified in commands and select the corresponding sensors and cells, or set the corresponding calibration functions. For example, the decoding logic 1605 includes a memory field arrangement to store parameters for respective logic functions, the logic functions including the calibration function 1609 as well as the sensor classes 1655, 1657, and sensor cells 1614, 1616. Each memory field may be adapted to store a parameter for a connected logic function, for example to store a cell class number, a cell number, a calibration parameter, etc. The memory field arrangement may include shift registers. The decoding logic 1605 may further include multiplex logic to set the logic functions in accordance with the parameters stored in the memory fields, for example connecting these memory fields with the logic functions. The multiplex logic may include series of flip-flops, latches and/or switches. In one example, upon receiving commands specifying the second (default or new) communication address, the decoding logic 1605 loads the respective parameters and shifts the bit values to set or select the respective logic function.

In one example communicated parameters identify each function by a register address. The decoding logic 1605 may include 8-bit input registers whereby each register is associated with a particular function, such as said sensor selection, cell selection and (a particular type of) calibration, for example through said multiplex logic. Alternative examples that are discussed elsewhere in this disclosure may use virtual decoding logic functions, embodied by instructions to be executed by a processor, to identify the parameters in the command stream and set or select respective (virtual) logic functions to provide outputs that the print apparatus logic circuit may validate.

The logic circuit 1603 is configured to, when the sensor cells are charged, and a respective cell is selected, output a value representing a reading of the selected cell, whereby the output is calibrated in accordance with the (received or default) calibration parameters. A cell reading inside the logic circuit 1603 may comprises a voltage or other analogue reading, while an output after conversion may be a digital value such as an output count value. The logic circuit 1603 is configured to, in response to a read request, output a respective value or signal associated with the (last) selected cell, applying the last received calibration parameters. The output, be it digital or analogue, may represent a state of a selected cell, such as temperature, stress, resistance, voltage state, etc.

The "parameters" in the commands condition the output by the logic circuit 1603. The parameters may select a particular cell of a particular sensor in an array, or a particular calibration setting. Another parameter that conditions the output is the time period during which the package 1601 responds to commands directed to a second and/or new address different from the first address, although it may condition the output duration and input address rather than individual output count values.

"Identifying" a parameter in a command stream, such as a class, sub-class or calibration parameter, includes distinguishing the respective parameters from other bits in a bitstream (like other not-related commands, start bits, end bits, acknowledge bits, communication address bits, etc.), to be able to process and/or act upon these parameters to appropriately condition responses. This decoding ability (i.e. decoding function) may be hardwired or programmed or both. For example, by identifying a class or sub-class parameter, the decoding logic 1605 may use the associated class or sub-class for generating the output, either through physical electrical measurements and/or through a LUT or calculation, or in a hybrid fashion that combines physical cell readings with virtual data to generate a digital output.

In one example, at least one calibration function 1609 of the logic circuit 1603 is to condition the output based on the input calibration parameters. In this disclosure, it may be understood that conditioning an input (e.g. DA conversion, offsetting and/or amplifying an input to cells before conversion by the cells) also conditions the output. Hence any signal calibration between command and response may be considered as conditioning the output. Calibration parameters may be adjusted by the print apparatus logic circuit based on returned output values. After reading an output of the logic circuit 1603, based on certain previous calibration parameters, the print apparatus logic circuit may send new calibration parameters in response to which the logic circuit 1603 may output new outputs.

Certain operational calibration parameters may be used to set a cell output to a suitable value within an operational or readable output range to facilitate determining a suitable range of different states of a respective cell. Furthermore, certain operational calibration parameters may be determined for returning states of multiple cells within the suitable range. Operational calibration parameters for one class may be different than operational calibration parameters for another class. Different nominal electrical properties between different classes may result in different outputs between these classes, even where the applied charge and calibration parameters are the same. That said, it may be that specific operational calibration parameters can be made to work for one and the other class. Such specific calibration parameters could include a relatively low amplifier parameter. However, for low amplifier parameters a variation between outputs of different cells may be relatively small, for example too small to be able to correctly determine different cell states. In examples of this disclosure, certain more optimal operational calibration parameters tend to be different for different classes, and there may be different sets or ranges of operational calibration parameters between classes. Also, calibration parameters related to a heater function may be used to influence output of a temperature sensor cell array while such heater function may not suitably influence output of a strain sensing cell array.

The calibration functions 1609 may be integral to the logic circuit 1603. Calibration functions 1609 may include offset functions, amplifier functions, and conversion functions. These functions could be hardwired and defined by offset circuits, gain amplifiers and AD (Analogue to Digital) or DA (Digital to Analogue) conversion circuits, respectively, separately or in combination. For example, an offset and DA conversion may be combined in a single logic (e.g., VDAC) function, for example where the offset function is provided by the DA converter, that, besides converting, is also configured to offset (i.e. set) an input power or voltage or a reference voltage, with respect to a power and ground of the I2C interface 1623.

Further calibration functions 1609 may include heat cell (i.e., heater) selections, heat power settings, heat timing, for example, for association with a temperature sensor array 1657 to sense print material level. Alternative example calibration functions are embodied by programmed instructions, for example configured to offset or amplify certain input values on the basis of received calibration parameter values for example using a LUT or calculation.

In one example, each memory field of the decoding logic 1605 is associated with a predetermined calibration function 1609. The decoding logic 1605 identifies received calibration parameters to store parameter values in associated memory fields, for usage as input parameter for the selected calibration function 1609. In a non-operational, e.g., on-the-shelf and/or after-reset state, the calibration function 1609 may be pre-set to default values. The calibration function 1609 may be configured to switch to default values at or after each second/new address-enablement (for example, as previously explained with reference to blocks 504, 602, 1202/1204, 2000 of FIGS. 5, 6, 12, 20, respectively), between time periods. Default or previously written calibration values apply to each of the calibration functions until a command is provided with new calibration values which replace (e.g., overwrite) the previous calibration values.

In one example, the same calibration functions 1609 may commonly apply to a plurality of classes 1655, 1657. For example, the amplifier and/or offset functions are configured to calibrate outputs of cells of both first and second cell arrays, or of all cell classes. Hence, where certain calibration parameters are applied to cells of a first array, they can be repeated for a second array if no new calibration parameters have been set, at least during the same time period where the second/new address is enabled. However, in certain instances, a print apparatus logic circuit may choose to apply different calibration parameter values to different classes, for example to use more optimal operational calibration parameters for a respective class. Therefore, when the logic circuit 1603 receives a new class parameter to select a new class, previously used operational calibration parameters with which in-range output values were generated for a previous class, may now generate outputs outside of the range or at the ends of the range, i.e. not-operational calibration parameters, so that new (operational) calibration parameters are applied for the new class.

In a further example a heating element array or heater cell array may be provided, which in one example is considered one of the calibration functions 1609, for example part of the calibration logic. Such heater cell array may extend along a corresponding temperature sensor cell array (for example, see also FIG. 4B and international patent application publication WO2017/074342). Correspondingly, certain input heat parameters such as heater cell selection, heat time and heat power may be considered calibration parameters. Changing the heat parameters may in fact influence the state of the temperature sensor cells, different than certain other calibration parameters (offset, amplify) that only calibrate the output value without the directly influencing a cell state.

Figure 16A:
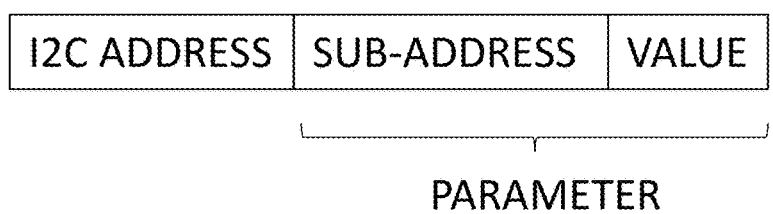
FIG. 16A shows an example of a command including a parameter.

As illustrated in FIG. 16A, each command may be defined by a series of data frames including a parameter, wherein the command is configured for processing by the logic circuit 1603 of various examples of this disclosure. The command of FIG. 16A illustrates three data frames. One data frame has encoded therein the I2C communication address, another data frame has encoded therein parameter function (here embodied by a sub-address such as a memory or register address) and another data frame has encoded therein the parameter value, whereby the function and value define the parameter. Acknowledge bits may be provided between data frames, for example for the logic circuit to identify the different data frames.

Each parameter may specify one or more functions and one or more corresponding values. In this example, the parameter function is defined by a sub-address (called "sub-address" to distinguish from the second and/or reconfigurable address of the logic circuit) such as a memory field address, for example a register address, for example to select an 8-bit memory field or register for writing the parameter value. The parameter function determines which logic function (class, sub-class, calibration) to address. The data frame of the function may consist of 8 bits. The data frame of the parameter value may consist of 8 bits, to write to the memory field. The sub-address of the parameter is called function in this disclosure because the sub-address determines the memory field and, in turn, the memory field selects a respective logic function (e.g., calibration function, sensor class selection function, sensor cell sub-class selection function) to be set to its stored parameter value. To illustrate this, a class parameter can include a class selection register address and a value to select the class that is identified by that value. Similarly, a sub-class selection parameter can include a sub-class selection register address and a sub-class number, for example to select the cell associated with the number.

For example, a first command to the logic circuit specifies a new I2C communications address, a first calibration parameter function, and a calibration parameter value; a second command specifies a new I2C communications address, a second calibration parameter function, and a calibration parameter value; a third command specifies the new I2C communications address, a class parameter function, and a class parameter value; and a fourth command specifies the new I2C communications address, a sub-class parameter function, and a sub-class parameter value. This facilitates the logic circuit to select the appropriate class and sub-class and appropriately set the selected calibration functions. Note that the sequence of these commands may vary. In one example, any sequence may be applied because the corresponding logic functions will only be activated in response to a certain calibration parameter (e.g., offset and/or DA conversion) and/or a read request.

In one example, the parameter value data frame may include a set of used (or: to-be-used) bits and a set of not-used (or: not-to-be-used) bits, whereby the set of used bits define the parameter value. The set of used bits may include the least significant bit. The not-used bits in the same data frame are not used by the respective logic function and may include the most significant bit. For example a class can be selected based on bit-combinations of only three first bits including the least significant bit, ignoring five remainder bits in the data frame including the most significant bit. A sub-class can be selected based on bit-combinations of only seven bits including the least significant bit, ignoring the most significant bit in the data frame.

A memory field of a single address may drive several logic functions. Correspondingly, different bits of the parameter value data frame may drive different logic functions. In such example the parameter function and parameter value of a single command transaction may actually encompass several parameter functions and several parameter values, respectively.

Certain bits typically included in the command, such as start bits, stop bits, acknowledge bits and/or other bits, are omitted from FIG. 16A. The command structure may follow an I2C communication protocol. A single complete transaction or command may include an I2C address (e.g. the second default or new address) and the parameter.

The logic circuit 1603 may be adapted to identify each of these fields (I2C address, register address, value) and respond (or not) accordingly. For example, a stream of different commands, wherein each command includes a separate parameter, may be illustrated by a repetitive sequence of the command illustrated in FIG. 16A. Each command, also called transaction, may include a start bit, an I2C address, a register address, a value, and a stop bit. Also, other (not named) bits may be included such as acknowledge bits and certain not-used bits.

Figure 17:
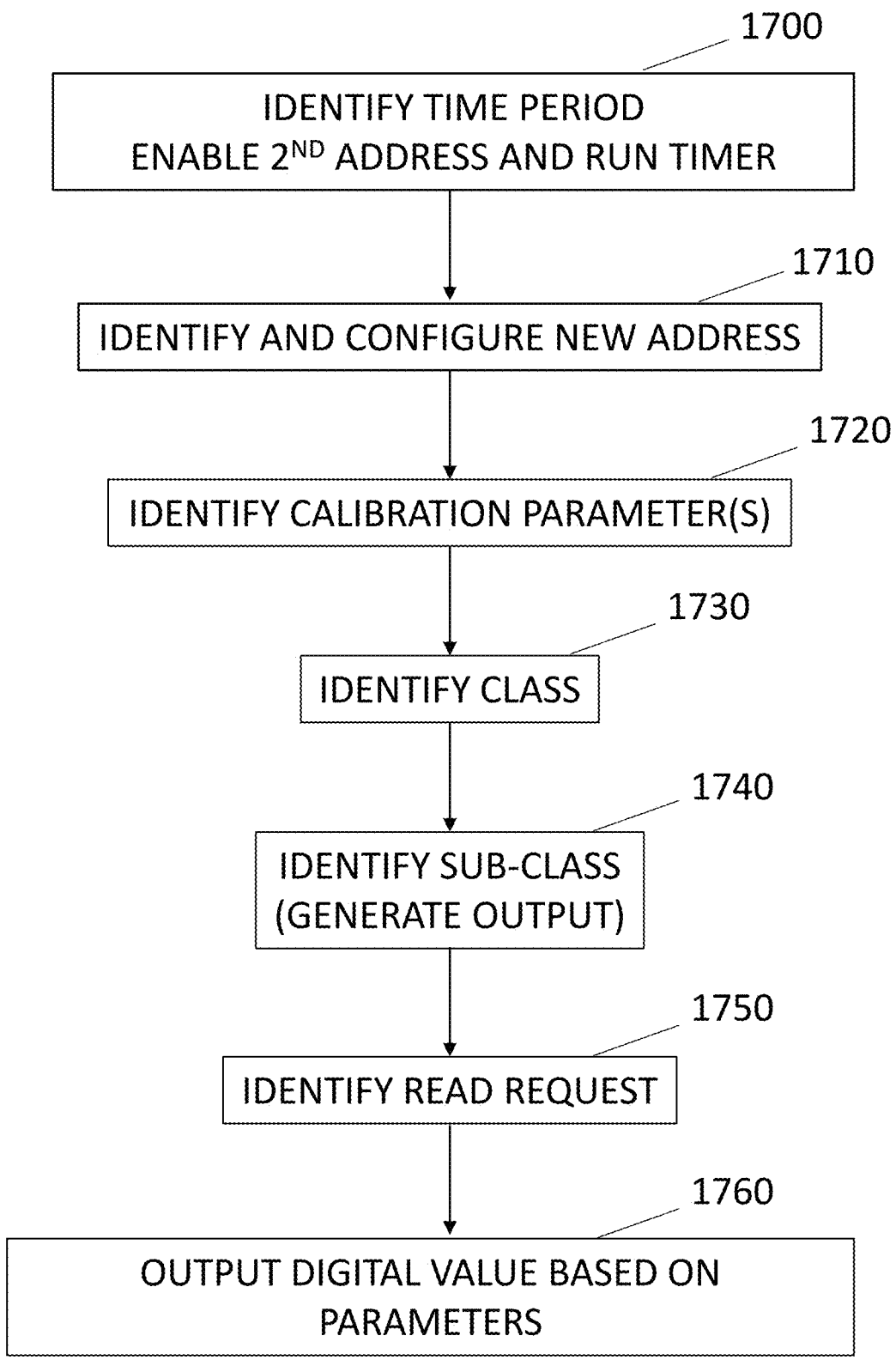
FIG. 17 shows an example of a flow chart of a process for a logic circuitry package to generate an appropriate output.

FIG. 17 illustrates a process for a logic circuitry package 1601 to generate outputs after identifying parameters in a command stream. As will be explained, the parameters may include a time period, a communications address, calibration parameters, class selections and sub-class selections.

In one example, the logic circuitry package 1601 is configured to identify a time period of a command sent over a first communications address, and correspondingly, enable a second address and run the time function, per block 1700. The logic circuitry package 1601 is configured to identify and configure a new (e.g., temporary) address, per block 1710, for example from a command sent over the second address.

The logic circuit 1603 may respond to commands to the second and/or new address for the rest of the duration of the time period. The logic circuit 1603 is adapted to determine the end of the time period by running the time function 1629.

For the logic circuitry package 1601 to process commands for the rest of the duration, further commands include the new address. However, in certain examples, a default second address may be enabled without configuring a new address, for example where there is only a single replaceable component (e.g. a black colour print material for a monochrome print system).

The logic circuitry package 1601 may be configured to identify calibration parameters (block 1720), class parameters (block 1730), and sub-class parameters (block 1740) from a command stream, and to generate a value or signal based on these parameters. The logic circuitry package 1601 may be configured to set or select the respective logic functions based on the parameters.

An example logic circuit, comprising a physical sensor assembly including different sensor cell arrays, is configured so that a command including the sub-class parameter automatically generates an output applying all previously selected parameters. In one example, the output may be a digital or analogue signal that is not yet uploaded as a digital value to the output buffer 1622 until a read request is received per block 1750.

The logic circuitry package 1601 may be configured to identify a read request (block 1750) in the command stream, and output the value corresponding to the previously identified parameters (block 1760). The output value may be loaded to the read buffer 1622, for example as an 8-bit count value representing a natural number between 0-255.

In certain examples, upon receiving a class parameter, and until a new class parameter including a different class is received, the class parameter value is stored, and hence the class is considered to be selected by the logic circuit. For example, a command stream may cycle through a series of alternations of individual sub-class parameter communications and read requests, whereby the logic circuit 1603 is configured to, after each parameter and read request, applying the same previously and last sent calibration and class parameters. The logic circuit will, in response to each read request (block 1750), output values (block 1760) based on the class, sub-class and calibration parameters. Different sub-class parameters may be repeated between read requests while calibration and class settings may remain unaltered, to cycle through cells of a single cell array 1655 or 1657.

In certain examples, outputs may be generated (block 1740) without receiving a read request, i.e., without loading the value in the buffer 1622, for example for measurement purposes or to "clear" cells and/or registers or for other reasons. In other examples, the result is always loaded into the buffer 1622, not triggered by a separate read request.

In one embodiment of a physical sensor assembly including different sensor cell arrays, the output value may digitally represent an analogue state of a respective selected sensor cell. In again other examples, analogue outputs may be generated. For example, intermediate products may generate analogue outputs. In another, alternative, embodiment the count value may be generated digitally using look-up tables or algorithms, based on the parameters. In either the physical or alternative embodiment, the logic circuit is configured to condition its output based on received parameters.

Figure 17A:
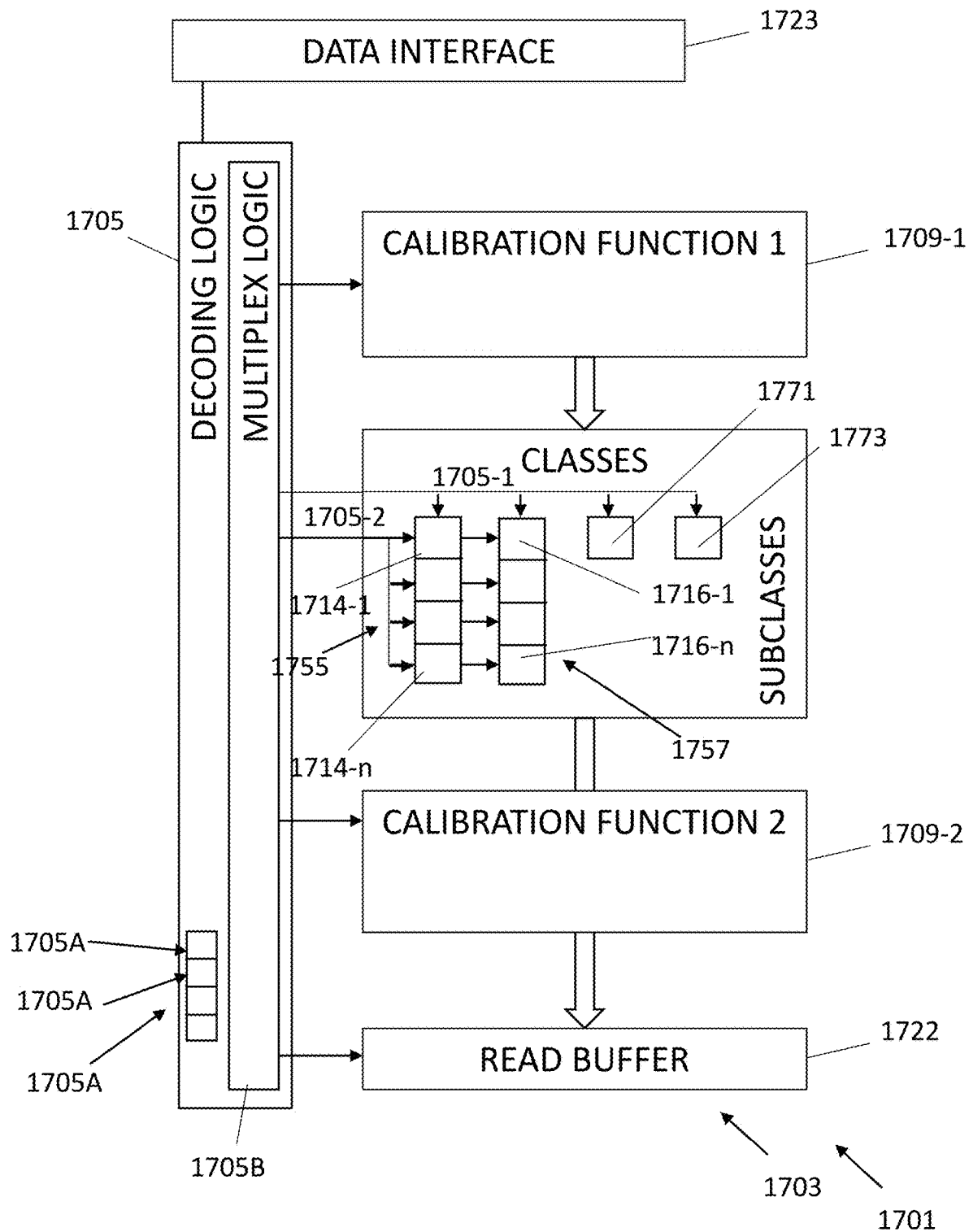
FIG. 17A shows yet another example of a logic circuitry package.

FIG. 17A illustrates another diagram of an example logic circuit 1703 (which in certain examples may be called sensor circuit 1703), similar to the logic circuit 1603 of FIG. 16. The logic circuit 1703 includes a plurality of logic functions that are to be set or selected based on the input parameters, for providing the requested output. The logic functions include first and second calibration logic functions 1709-1, 1709-2, class and sub-class selection functions 1705-1, 1705-2. The logic circuit 1703 further includes a data or communications interface 1723, and a read buffer 1722. Commands to the logic circuit 1703 are received through the data interface 1723.

For example, the decoding logic 1705 includes a memory field array 1705A, such as a register array, and multiplex logic 1705B. Each memory field 1705A is associated with an address, to be addressable by the parameter functions (e.g., sub-addresses per FIG. 16A), and to store the corresponding parameter value. The memory fields 1705A may be configured to store 8 bits. The memory fields 1705A may be 8-bit registers. Each memory field address is associated with at least one corresponding logic function through circuitry of the multiplex logic 1705B.

The decoding logic 1705 identifies the parameters and loads the parameter values in the selected memory fields 1705A, which values are used to select or set a sensor array 1705-1, sensor cell 1705-2, and/or calibration function 1709. The multiplex logic 1705B is configured to apply the received parameter values to select a sensor of a particular class, as indicated by routing 1705-1, and to select a particular cell within the selected sensor class, as indicated by routing 1705-2. Each memory field 1705A is tied to a particular function such as sensor classes 1755, sensor cells or a calibration function 1709-1, 1709-2. The multiplexing logic 1705B is routed between these memory fields 1705A and the respective sensors of different classes, different cells, calibration functions, etc. to select the sensors and cells based on the stored value, and select and set the calibration function based on the stored value.

The multiplex logic 1705B may include at least one of multiplexers, switches, and/or latches. In a more specific example, the multiplex logic 1705B may include series of MOS-based switches. The multiplex logic 1705B may be connected to memory fields 1705A and corresponding logic functions 1705-1, 1705-2, 1709-1, 1709-2. The multiplex logic 1705B may set or select a respective logic function

1705-1, 1705-2, 1709-1, 1709-2 in accordance with the value stored in the corresponding memory fields 1705A. The multiplex logic may ensure that an output based on a corresponding cell state is returned.

The calibration logic functions 1709-1, 1709-2 may include at least one and/or any combination of a gain amplifier, offset circuit, AD converter and DA converter, each of which may be settable based on a respective received calibration parameter, whereby the calibration parameter function determines which of the calibration logic functions 1709-1, 1709-2 to address and the calibration parameter value sets the magnitude or strength of the respective calibration logic function 1709-1, 1709-2, through the decoding logic 1705 as explained above.

For example, the decoding logic 1705 may select a sensor class 1755 based on a first parameter function and a first parameter value and a different sensor class 1757 based on again, the first parameter function and a different, second parameter value. With the first or second class selected, the decoding logic 1705 may select a sensor cell 1714-1 or 1716-1 based on a second parameter function and a first parameter value, and a different sensor cell 1714-n, 1716-n based on the same second parameter function and a different ($n^{th}$) parameter value. With regards to single cell sensor classes 1771, 1773, the decoding logic 1705 may select a third and fourth sensor class 1771, 1773 based on the first parameter function and a third and fourth parameter value, respectively, without selecting a sub-class.

Further to the class and sub-class selection functions, the decoding logic 1705 may be configured to identify a first or second class parameter associated with a first or second class 1755, 1757. The decoding logic 1705 may be configured to, upon identifying the first or second class parameter, select a respective first or second class 1755, 1757. The decoding logic 1705 may be configured to, subsequently, identify a series of sub-class parameters (e.g., associated with respective cells 1714 or 1716, respectively) and read requests while the respective first or second class 1755, 1757 is selected. The decoding logic 1705 may be configured to, in response to each read request, output a count value for each corresponding selected subclass 1714, 1716. The decoding logic may further be configured to identify a third or fourth class parameter associated with a third or fourth class 1771, 1773, respectively. In this example the third and fourth class comprise single cells. The decoding logic 1705 may be configured to, upon identifying the third or fourth class parameter and a subsequent read request, output a respective count value, for example without a subsequent sub-class selection. For example, the decoding logic 1705 is configured so that any sub-class parameter received between receiving the third or fourth class parameter and read request (i.e. while the third or fourth class is selected) does not affect the output count value. The third and fourth class concern single cells so that class selections are sufficient and further sub-class selections can be ignored, which is illustrated in FIG. 17A by the fact that the routings 1705-2 do not connect to the single cells 1771, 1773.

The decoding logic 1705 may be configured to identify class and sub-class parameter values in respective data frames based on a bit set including the least significant bit (LSB), while values of at least one other bit in the same data frame including the most significant bit (MSB) do not affect the output count value or pertain to a different logic function. For example, if there are five cell classes to choose from (e.g., first to fourth cell classes and a heater cell class), then the parameter value may be represented by only three bits to select either of these five cell classes. Similarly, if there are only 126 cells then 7 bits may provide for sufficient different unique values. Correspondingly, the decoding logic 1705 may be configured to identify a sub-class parameter value based on more bits, in the "used" bit set including the least significant bit, than the class parameter value, because there are more sub-classes than classes. Remainder "not-used" bits may not be used by either of the memory fields 1705A (e.g., not written or not writable) or by the multiplex logic 1705B (e.g., no effect on the respective logic function). In other words, the decoding logic 1705 is configured to not use these remainder bits. In other examples, remainder bits (e.g., including the MSB) not used for a logic function such as a class or sub-class selection may be used differently than the bits including the LSB, for example to select and/or set another logic function, so that at least two logic functions can be set and/or selected by a single memory field 1705A and by a single command or register address. In certain more specific examples, the decoding logic 1705 is configured to identify a class parameter value based on not more than the LSBS and two following bits (2:0) in an eight bit data frame so that the three bits including the LSB affect the output count value, while other bits in the data frame including the MSB do not affect the output count value. The decoding logic 1705 may also be configured to identify a sub-class parameter value based on not more than the LSB and six following bits (6:0) in an eight bit data frame so that seven bits including the LSB affect the output count value, while the most significant bit in the data frame does not affect the output count value.

Calibration parameters may be applied to inhibit clipping of outputs and improve count value distribution in a predetermined output range for each sensor class 1755, 1757, 1771, 1773. The decoding logic 1705 may select a first calibration function 1709-1 based on a third calibration parameter function and set an (e.g., offset- and/or DA conversion-) value of that function 1709-1 based on the corresponding parameter value. The decoding logic 1705 may select a second calibration parameter function 1709-2 based on a fourth parameter function and set an (e.g., amplifier) value of that function 1709-2 based on the corresponding parameter value. Note that calibration parameters may be set before or after class and sub-class selections. In one example, an offset function and DA conversion is applied after other parameters have been received as a last parameter communication before the read request and response.

Further calibration parameters include heater conditions including heater cell selection(s), heat time and heat strength/power. In one example, adjacent heater cells are selected automatically when selecting second class sensor cells 1716-1 to 1716-n, for example, by the multiplex logic 1705B. The selected heaters will be driven in accordance with the calibration parameters.

Output count values generated by the logic circuit 1703 may be within a predefined range, for example as determined by a characteristic of the output buffer 1722. The output buffer 1722 may be configured to present a fixed, natural number of bits or bytes, such as a single byte, or two or more bytes, for reading by the print apparatus logic circuit. For example, the lowest output count value may be a binary representation of 0 and the highest output count value is a binary representation of a maximum number that can be represented by a natural number of bytes, and subtracting 1. For example one byte may be associated with a range of 256 separate output count values from the lowest output count value of 0 to the highest output count value of 255; two bytes may be associated with a range of 65536 separate output count values from the lowest output count value of 0 to the highest output count value of 65535; etc. For example, in a single byte, the lowest count value may be all zeros such as 00000000 and the highest count value may be all is such as 11111111.

The logic circuit 1703 is configured to, in response to the read requests, return count values based on the state of the selected cell (e.g. depending on temperature, wet/dry state, pressure, etc.) and the calibration parameters. Certain calibration logic functions 1709-1, 1709-2 are configured to calibrate the logic circuit 1703 so as to output different output count values for the same (e.g. analogue) cell state for different received operational calibration parameters. Other calibration logic functions such as heating may directly influence cell state.

In one example the count values represent an analogue state of the respective cells, before an analogue-to-digital conversion by respective calibration functions. Hence, in certain examples, calibration parameters are varied by the logic circuit until the output count value is in a suitable range. For example, where we have one byte of count values (e.g., 0-255), an output count value of a certain cell can be calibrated to be at a minimum distance from a lowest or highest value (e.g., between 10 or 245) to detect further increasing or decreasing, respectively, of the value corresponding to a changing cell state while avoiding that a value is clipped at the lowest or highest value of, in this example 0 or 255. Accordingly, the calibration functions 1709-1, 1709-2 may be configured to, at least one of, convert, stimulate (e.g., heat), amplify, and offset the cell output and/or input to facilitate readability of the logic circuit output.

In certain examples, only a set of certain operational calibration parameters may be suitable to provide non-clipped cell responses. Operational calibration parameters may vary throughout the lifetime of the logic circuitry package. Operational calibration parameters may be different for each class. In particular operational parameter values for the same calibration parameter functions may be different between classes. Some overlap may exist, that is, there may be some calibration parameters that provide for non-clipped outputs for different classes, although these may be not preferable and susceptible to further calibration.

In one example, calibration functions 1709-1, 1709-2 are configured to change an output count value based on an offset parameter by an amount that is a function of the amplifier parameter. In an example, an amplifier (e.g. gain or strength) parameter value may be provided that is within a range of 1 to 64. An amplifier parameter of n has the effect of the amplifier circuit multiplying a measured value by n. The offset parameter may comprise a value between 0 and 255, or a subrange thereof, for example between 50 and 100. It may be noted that an example calibration function 1709-1, 1709-2 is configured so that, each step in the offset parameter will change the output count by an amount that is a function of the gain parameter. Therefore, at high amplifier parameter settings, a small change in offset parameter value may move the output count value considerable (for example by hundreds of counts up or down) whereas at lower amplifier values, a larger range of offset parameter values must be used to have the same effect. The offsetting as well as amplification of signals may be applied to an analogue input value (e.g. voltage, power), an analogue output value (e.g., voltage before conversion), a digital input value (e.g., a parameter value), or a digital output value (e.g., a count value). In certain examples an operational amplifier parameter value of at least 4 or at least 8 is to be used for a first or second class to facilitate determining different cell states.

In one example, the logic circuit 1703 is configured to facilitate determining operational calibration parameters "in-situ", for example during customer installation or printing. In another example, at least some of the calibration parameters may be set during manufacturing, and, for example, stored in the logic circuitry package 1701 (e.g. per OCP 1607-1 in memory 1607 in FIG. 16). Once a set of operational calibration parameters for a certain cell class is known, the logic circuit 1703 returns output count values that are between, and/or distanced from, the lowest and highest output count value. After calibrating in-situ, the operational calibration parameters may be temporarily stored on the print apparatus logic circuit, for usage at a subsequent cell array read cycle, as will be explained with reference to FIG. 20. Operational calibration parameters may be determined and stored, based on calibrating a single cell of each class whereby these same operational calibration parameters may subsequently be used for other cells of the same class. Different cell classes can be associated with different operational calibration parameters while cells of the same class can be associated with the same operational calibration parameters, as determined in a calibration cycle, again with reference to FIG. 20.

Figure 18:
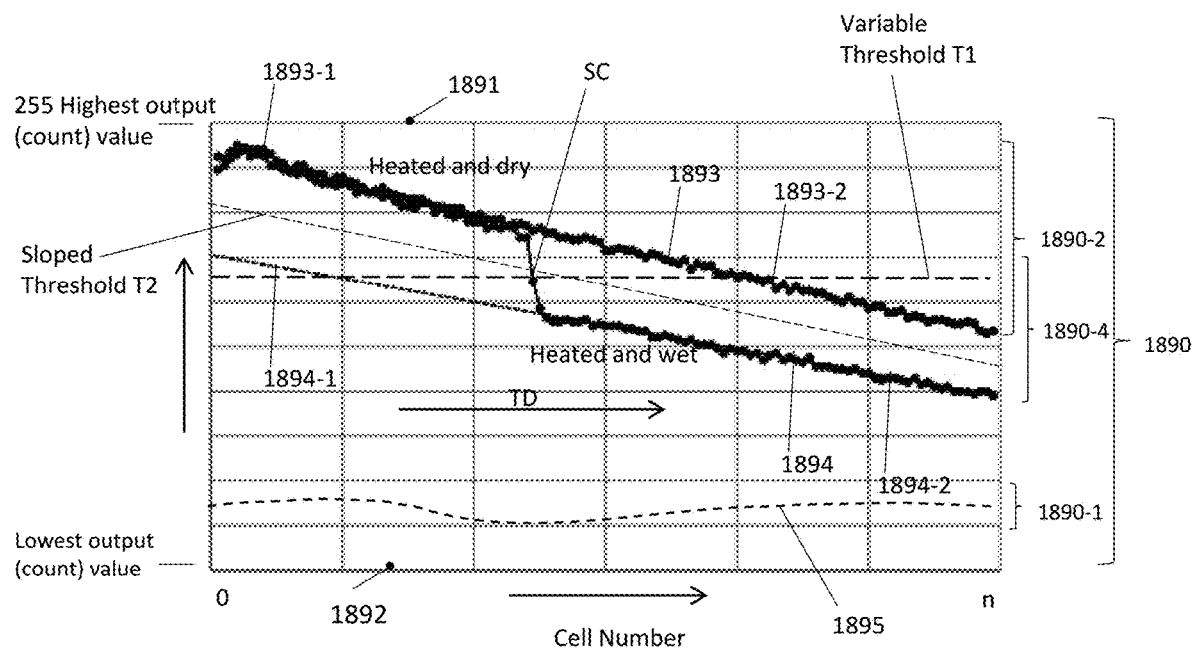
FIG. 18 shows an example of a graph plotting cells of a second class along a horizontal axis and respective output count values on a vertical axis.

FIG. 18 illustrates an example diagram with output count values on a vertical axis and cell numbers (or IDs) on a horizontal axis. The diagram reflects a thermal response of an example thermal sensor cell array, for example to determine a print material level, such as a print liquid level, such as an ink level (e.g. cell array 1657 of FIG. 16, 1757 of FIG. 17A, or print material level sensor 410 of FIG. 4B, or, international patent application publication No. WO2017/074342).

At installation the printer may send a command including calibration parameters, a cell class selection and a cell sub-class selection, and subsequently, a read request. In response, the logic circuit may identify the calibration parameters and the respective sensor cell to be selected and output the count value corresponding to the state of that selected cell. The calibration parameters may comprise heat parameters (e.g. heater cell identification number, heat time, power), offset parameters, gain amplifier parameters and/or D/A or A/D conversion parameters. The logic circuit may, upon instructions, select the respective temperature sensor cell, and calibrate the output of that cell. Other calibration parameters may include heating the heaters during a certain time and adjusting a voltage input (e.g. approximately 3.3 V,), for example as harvested from a power contact pad of the interface, which may calibrate the cell state.

In the illustrated example, in response to a read request, an output count value of a cell increases in correspondence with an increasing temperature, implying a lower count in unheated condition (1890-1, 1895) and higher in heated condition (1890-2, 1890-4, 1893, 1894). As will be explained, first output count values of sensor cells, when heated by heaters and doped in liquid, per line 1894 and range 1890-4, are lower than second output count values corresponding to the same cells being heated but not doped in liquid, per line 1893 and range 1890-2. Hence, an absence or presence of liquid at a respective cell can be sensed. The temperature sensor output may correspond to an output reading at a given point in time after or during a heat event for the corresponding heater cell, which in some examples may be calibrated using the calibration logic. In one example, the temperature sensor cell is only calibrated and read in conjunction with heating of the corresponding heater cells, corresponding to lines 1893 and 1894 and ranges 1890-2 and 1890-4. In another example, the sensor cells may also be read when not heated, per fictional line 1895 and range 1890-1.

Liquid over a temperature sensor cell may have a cooling effect. Hence, a temperature and/or a temperature decay of a wet sensor cell may be electrically measured and compared to measurements of a dry sensor cell. For example, the temperature sensor cells comprise sense resistors which value is read just after applying a voltage over a nearby heater resistor for a given time. For example, after activating a heater for a short period (e.g., for 40-70 microseconds), a proximate temperature sensor cell is read, for example at about 0 to 50 microseconds after the heating stopped, whereby the temperature sensor cells in liquid (per line 1894) may be cooler than temperature sensor cells no covered by the liquid (per line 1893), which is reflected by a measurable analogue electrical state of that cell. Then, the measured analogue state is converted to a digital the count value. In one example, cooler cells have a lower resistance than warmer cells, which, after AD conversion, results in a reduction in output count value.

The logic circuit may be configured to output a step change SC in a series of count value outputs, when only a part of the sensor cells are doped in liquid. The step change SC in output count values for a cell array may correspond to certain cells being doped in liquid and other cells not being doped. For example, the logic circuit is configured to, for a certain print liquid level of a partly depleted print liquid reservoir, in response to identifying the second class parameters and series of subsequent different sub-class parameters (which in this example are associated with the temperature sensor cell array), output second count values 1893-1, associated with a sub-set of the sub-class selections, on one side of a step change SC in the outputs, and first count values 1894-2 that are all at least a step change SC lower than the second count values, the first count values associated with the rest of the series sub-class selections, on another side of the step change SC in the outputs. The first count values 1894-2 are associated with wet cells and the second count values 1893-1 are associated with dry cells whereby the step change SC may represent an approximate liquid level.

For example, to later detect that step change SC, first, the sensor cell output needs to be calibrated, for example in the factory or after print apparatus component installation. At a first calibration or read cycle, the reservoir 1812A may be full or for example at least approximately half full associated with a situation where all sensor cells 1816 are covered by liquid. Hence, at installation and/or after calibration, all cells 1816 may return readings corresponding to heated wet cells per full line 1894, resulting in relatively smoothly varying outputs count values, for example where differences between subsequent count values are less than 5, less than 2 or less than 1, for certain operational calibration parameters. For example, a step change SC is associated with a jump of at least 10 counts, at least for certain operational calibration parameters. For example, the operational calibration parameters may be such that the output count value of heated and wet cells are in a predetermined count value sub-range 1890-4 at a distance from the lowest and highest count value, for example at least 10 counts distance. For example, the "middle" sub-range 1890-4 may be at least approximately 50, at least approximately 60, at least approximately 80 or at least approximately 100 count units distance from the lowest count value of the range, and at some count units distance from the highest count value of the range, for example at least 50 counts from the highest count value, for example between 60 and 200 counts. In other examples the cells could be calibrated when dry per higher sub-range 1890-2 or when not heated per lower sub-range 1890-1.

If the cells of the sensor cell array are arranged vertically in the liquid reservoir 1812A then the step change SC may be associated, by the print apparatus, with the liquid level, after depletion of at least part of the liquid whereby certain higher cells are dry and certain lower cells are wet. The step change SC may be detected by the print apparatus in which the sensor is installed by reading the respective cell states for each cell or for a sub-set of cells. In the above examples a print material level is determined by relating the detected step change SC with the associated sub-class(es).

In addition to, or instead of the step change SC, a variable threshold T1, or sloped threshold T2 (both indicated in FIG. 18), may be applied to determine which cells are dry and which are wet. The sloped threshold T2 may correspond to the slope of the different cell readings of the array which may be subject to parasitic resistance. In certain examples, the variable threshold T1 may be applied depending on what the expected print material level is, and/or what cells are expected to be dry versus wet. For either threshold T1, T2, first lower count values are below and second higher count values are above the threshold T1, T2.

Figure 18A:
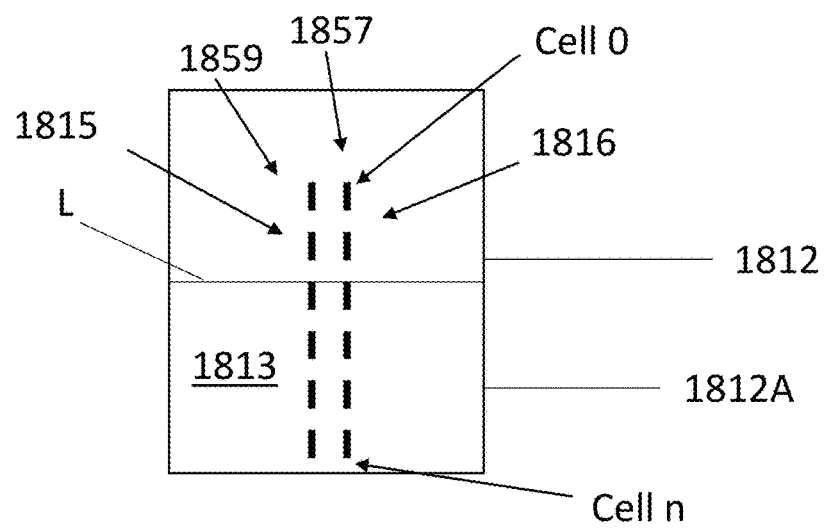
FIG. 18A illustrates an example of a replaceable print component with a second sensor cell array.

FIG. 18A diagrammatically illustrates an example of a replaceable print component 1812 with print material 1813, and a sensor cell array 1857 having sensor cells 1816. Heater cells 1815 of heater array 1859 may be arranged alongside the sensor cells 1816, which may be considered part of the sensor or part of the calibration logic. At installation, the print apparatus component 1812 is filled to a point above the temperature sensor cell array 1857 so that the cell array 1857 is completely covered by the print material 1813. In such state, all temperature cells 1816 of the array 1857 return first, relatively low count values, corresponding to line 1894, i.e., both sub-lines 1894-1 and 1894-2, of FIG. 18. Then, after some exhaustion of print material 1813 (which is illustrated in FIG. 18A), when the print material level L drops to a point below the highest cell 0 of the array 1857, a higher sub-set of cells (including highest cell 0) outputs second, higher count values because they are not covered by the print material, and hence, not cooled, corresponding to sub-line 1893-1, while a lower sub-set of cells (including lowest cell n) may output first, lower count values, corresponding to sub-line 1894-2. Correspondingly, the logic circuit 1601 is configured to output second count values above a threshold T, per line 1893-1, and first count values below the threshold T, per line 1894-2. The logic circuit may output intermediate count values, in the step change SC, relatively close to said threshold T1, T2, associated with certain cells that are positioned near the liquid surface, which count values are between the first and second count values.

When the print material 1813 has substantially exhausted, i.e., the print material level has dropped below the lowest cell n, all cells 1816 may return second, relatively high count values corresponding to the full line 1893, including both 1893-1 and 1893-2. In one example the slope of the lines 1893, 1894, representing a steady decrease of output count values of subsequent cells down the cell array 1857, may be caused by parasitic resistance. A sloped threshold T2 to determine the difference between first (e.g. lower) and second (e.g. higher) count values may extend between the first and second line 1894, 1893, respectively, and also have such slope. In other examples, the sensor circuit is configured to, for the partially filled reservoir where a print material level extends somewhere at the sensor cell array 1857, generate the step change SC so the print material level may be determined without using thresholds T1 or T2.

For example, the temperature sensor cell array 1857 may include over 20, over 40, over 60, over 80, over 100 or over 120 cells (in one example, 126 cells). The cells may comprise thin film elements on a thin film substrate, as part of thin film circuitry. In one example, the temperature sensor cells comprise resistors. In one example, each temperature sensing resistor has a serpentine shape, for example to increase its length over a small area.

At a first usage of a filled replaceable print apparatus component (e.g., first customer installation), a temperature sensor cell response in heated and wet condition may be determined for calibration, because all cells may be covered by print liquid. Since it is known that the output of a dry sensor cell is higher (per line 1893), the calibrated output count value for the wet cells (per line 1894) should be at a certain minimum distance from the highest output count value 1891 of the output count value range 1890 to allow for margin for later outputs of the dry cells per line 1893. For example, the output count value for wet and heated cells may be set to be in the first sub-range 1890-4, whereby narrower sub-ranges can be applied by selecting certain cells. For example, one or more calibration parameters are adjusted until the output count value of at least one of the wet cells is within said sub-range 1890-4, for example having at least 50 or 100 counts distance from the highest output count value, for example between about 60 and 200 counts.

The calibration logic may set any of the heating power, heating time, sense time, offset function, amplifier function and/or AD and DA conversion functions so that the output count values are within the operational range 1890-4, at a sufficient distance from highest output count values 1891 to allow for margin for dry and heated readings, and/or at a sufficient distance from lowest output count values 1892 to allow for margin for (wet or dry) unheated readings. The calibration parameters may be adjusted until the logic circuit returns an output count value 1894, first, within the wider count value range 1890 at a distance from the highest and lowest output count values 1891, 1892, respectively, (e.g. to avoid clipping) and, second, in a narrower sub-range 1890-4, for example having at least 50 or 100 counts from the highest output count value (e.g. at least 10% or at least 20% of the range distance from the ends of the range) if the output count value range is between 0 and 255, for example between 60 and 200 counts. In this example the output count value range is set so that there is margin in the count value range for a lower output count value range 1890-1 for unheated cells, for example below the 60 or 100 counts, while still being able to determine the difference between dry and wet cells.

The lower output count value range 1890-1 corresponds to unheated cells and could also be used for calibration purposes or other purposes. The lower output count value range could be below an approximately middle of the output count value range (e.g., below 128), or, for example, below 100 or below 60 counts.

After setting the operational calibration parameters, the print material level may be derived by detecting a step change SC in the output count values of the series of cells 1816 of the array 1857, or by verifying the count values with respect to one or more thresholds T1, T2. For example, the logic circuit is configured to, in response to identifying a second class parameter associated with the print material (i.e. temperature) sensor class, and subsequently, a series of varying sub-class parameters and read request, where the series is received at various points in time, output (a) first count values (e.g., 1894-1 on line 1894), associated with the sub-class parameters, and, (b) at a later point in time when more print liquid in a replaceable print component has been extracted, second count values (e.g., 1893-1 on line 1893), higher than the first count values, associated with the same sub-class parameters. The latter second and first count values 1893 versus 1894 may each be output in different read cycles in separate times durations of second address enablement. The logic circuit may be configured to, for a certain print liquid level of a partly depleted print liquid reservoir 1812A (e.g., a level L extends at some point along the sensor cell array 1857), in response to identifying the second class parameter and a series of subsequent different sub-class parameters, output second count values 1893-1, higher than a certain threshold T1 or T2, associated with a sub-set of the sub-classes, and first count values 1894-2, lower than said threshold T1 or T2, associated with the rest of the sub-classes. The latter second and first count values 1893-1, 1894-2 may be output in a single read cycle for example in a single time duration of the second address enablement. The latter second and first count values 1893-1, 1894-2 may be separated by a step change SC, in a diagram plotting on one axis the sub-class numbers and another axis the output count values (per FIG. 18). The first count values are all at least a step change lower than the second count values. At least one third count value may be provided in the step change SC.

For example, in response to receiving the second class parameter associated with the print material sensor class, and operational calibration parameters for that class, and subsequently, a series of sub-class selections and respective read requests, the logic circuitry package may output, during depletion of the associated liquid reservoir, (i) at a first point in time, first relatively low count values for the all sub-class selections of the series (e.g., line 1894 including 1894-1 and 1894-2), (ii) at a second point in time after depletion, second relatively high count values for a sub-set of the series of sub-class selections (e.g., line 1893-1) and first relatively low count values for remaining sub-class selections of the series (e.g., line 1894-2), and, (iii) at a third point in time after more depletion (e.g., complete or near exhaustion), second relatively high count values for all sub-class selections of the series (e.g., line 1893 including 1893-1 and 1893-2). The respective first, second and third condition (as indicated by roman numerals i, ii and iii, respectively) are associated with a measure of depletion of print liquid 1813 during the lifetime of a replaceable print component 1812. The sub-class IDs corresponding to the step change SC can be determined which in turn allows for determining the print material level. In use, the respective transitions between said first, second and third condition (i, ii, iii) are accompanied by a change in a count field in a memory of the package (e.g. memory 432 of FIG. 4E, status field 1427 of FIG. 14, status field 1527 of FIG. 15), which count field is associated with a print material level by a print apparatus and may be regularly updated by the print apparatus between or during print jobs, for example based on printed drop count or printed pages count.

In certain examples the sensor circuit 1857, 1859 may extend from near a gravitational bottom upwards, at least in a normal operational orientation, but not reach the complete height of the reservoir 1812A. Hence, the logic circuit is configured to generate first, relatively low count values 1894 during a substantial part of the lifetime, per roman i above. In certain alternative embodiments the logic circuit may return only first count values, per line 1894 and sub-range

1890-4, in response to the second class parameters and sub-sequent sub-class parameters and certain operational calibration parameters, at least until a value in the print material level field (1427 of FIG. 14, 1527 of FIG. 15, 2527 of FIG. 25) reaches a value that the print apparatus logic circuit associated with a level that is above the second sensor cells 1857.

For certain operational calibration parameters, differences in output count values due to parasitic resistance may be, on average, approximately 1 or 2 counts or less, while for these same operational calibration parameters the step change SC between subsequent sub-class numbers associated with a position near the print material level may be more than 2 counts for example more than 4 counts or for example more than 6 or more than 10 counts. As will be explained later, FIG. 19 may relate to strain sensing cells. For FIG. 19 a parasitic resistance may be illustrated in some decrement in output count values for a low pressure, e.g. around or lower than zero gauge pressure, for example for the first subclasses, but generally (mechanical) strains to the cells of FIGS. 19 and 19A may have more effect on the output count values, even at low pressures, than the parasitic resistance, at least for a large portion of the cells of the cell array of FIGS. 19 and 19A. For the cell class of FIG. 19, different count values may be generated for respective sub-classes, for certain operational calibration parameters, for example as a result of different strains and/or different positions along a reservoir wall. For both examples, of FIGS. 18 and 19, the cell arrays are configured to, in a series of command-responses, vary in-range count values based on different sub-class parameter values, for example relatively smoothly. These varying count values based on different sub-class parameters associated with the same class may be based on the same operational calibration parameters and class parameter.

Figure 19:
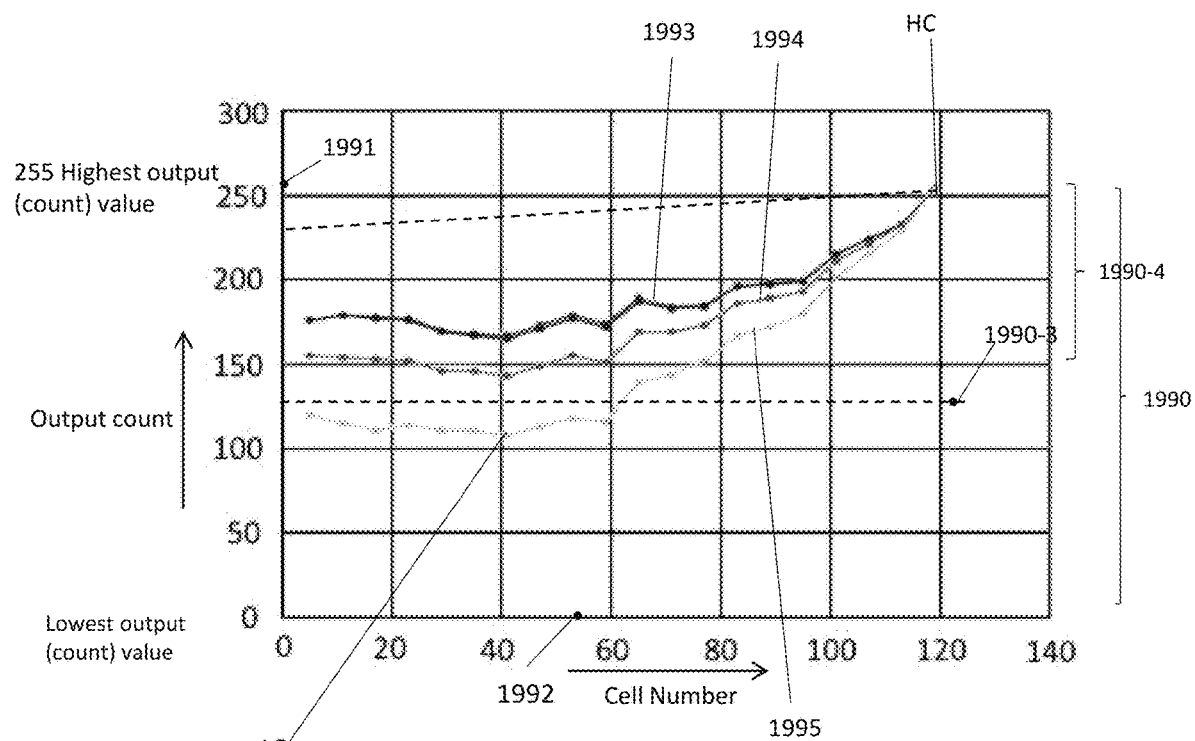
FIG. 19 shows an example of a graph plotting cells of a first class along a horizontal axis and respective output count values on a vertical axis.

FIG. 19 illustrates another example diagram with output count values on a vertical axis and cell numbers (or IDs) on a horizontal axis. In both FIGS. 18 and 19 cell numbers increase along the horizontal axis which may correspond to a lower position towards a bottom of a print material reservoir when the logic circuitry package with the cell array(s) is mounted to the reservoir. The readings of FIG. 19 are based on different nominal cell characteristics and different operational calibration parameters than FIG. 18.

The diagram of FIG. 19 corresponds to an example sensor to detect an effect of a pneumatic stimulus or pressurization applied by the print apparatus to the print apparatus component. In one example, the pneumatic stimulus and/or pressurization is applied by an external pump of the print apparatus that applies pressurized air through an air input (1318 of FIG. 13B) of the component. Other example components that are not specifically illustrated in this disclosure may have collapsible print material reservoirs, such as bag-in-box supplies, associated with relatively large reservoir volumes for example of at least approximately 0.1, 0.2, 0.5 or at least approximately 1 litre, whereby similar types of sensors may be applied. In such component, the sensor may not be adapted for a pneumatic stimulus. Rather, the sensor may detect certain pressures and wall deflections in the reservoir. In one example, the sensor 1955 (FIG. 19A) to detect a pneumatic stimulus may detect such stimulus through wall deflection detection. Hence for some of the mentioned collapsible ("bag") reservoirs, similar sensors 1955 could be used, and similar features and principles described in relation to the logic circuit may apply, as the skilled person will understand.

The pneumatic stimuli (or "events") for the example components of FIGS. 19, 13, 21 and 23 may include a supply pressurization, hyperventilation and/or push-priming whereby air is blown into a replaceable print apparatus component, for example to pressurize the component and push print material out through its output (e.g., 2119, 2219 of FIGS. 21 and 23, respectively). Certain pneumatic events may include (i) a start-up prime, when a print apparatus is started for the first time; (ii) a print apparatus component change prime which may occur when a replaceable print apparatus component has just been installed; and (iii) a printhead recovery "squish" prime to push liquid through the printhead; whereby in some examples each prime (i, ii, iii) can be associated with a different pressure. In one example, a prime event is associated with a series of repetitive subsequent air pressure pulses by the print apparatus, in some examples each pulse being of the same force, whereby with each pulse a pressure in the reservoir accumulates. In another example, repetitive pulses are associated with, for each pulse, a pressure increase and subsequent decrease in the print material reservoir without accumulating the pressure in the reservoir based on the subsequent pulses.

In this disclosure a pneumatic stimulus or pressurization includes at least a single prime pulse, up to a complete series of pulses and/or longer continuous pressurization, for example, induced by pressurized air through air interfaces of the print apparatus components. While each prime or hyperinflation pulse may be very short, e.g., around one or two seconds, a complete prime cycle, from the print apparatus' perspective, can take longer, for example between 10-60 seconds. From the print apparatus' perspective, such prime cycle could include certain set up routines, including calculations, a series of hyperinflation pulses as addressed already above, and further associated service routines such as spitting and wiping. The sensor of this disclosure may detect a pneumatic stimulus in less than a second, for example based on a single pulse, and/or may function during a complete prime cycle. For example in a print platform where the operational reservoir pressure is below 0 kPA gauge pressure, a single pulse could increase pressure above 0 Gauge kPA, for example depending on the chosen prime settings, to a point above 7, 14, 20 or 23 kPa, whereby the extent of time that the component is externally pressurized above 0 kPa may be between 0.5 and 3 seconds, for example less than approximately 3 seconds, including a ramp-up and a ramp-down of the pressure as it builds and dies out in the reservoir.

Figure 19A:
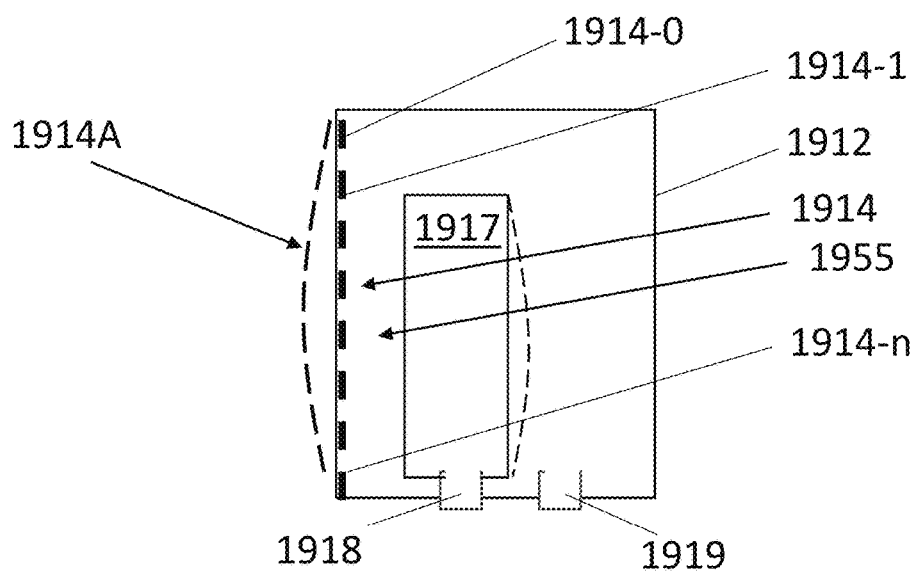
FIG. 19A illustrates an example of a replaceable print component with a first sensor cell array.

In any event, a pneumatic stimulus (or series of stimuli) applied to the replaceable print apparatus component may be associated with a pressure event. As will be explained in various examples, the sensor 1955, 2155, 2255, 2555 can be used to detect and/or verify and/or control prime pressures, print material leakage and/or air leakage, or for other purposes such as print apparatus compatibility. The diagram of FIG. 19 reflects a response of a logic circuitry package including a pneumatic sensor cell array 1955 (FIG. 19A). Throughout the rest of this disclosure, the sensor 1955 to detect the pneumatic stimulus may also be referred to as first sensor and/or may be associated with a first class and first class parameter.

An example sensor 1955 to detect a pneumatic stimulus can be disposed along, and/or on the same substrate as, the temperature sensor array 1857. As illustrated in FIG. 19A, in use, the cell array 1955 can be mounted to the replaceable print apparatus component including a reservoir 1912, for example a wall that defines a side of the reservoir 1912. In this example, the cell array 1955 includes strain sensing cells (e.g., strain gauges) 1914-0, 1914-1 . . . 1914-*n*, arranged over the surface of a print material reservoir 1912, for example mounted to an inside of a wall of the reservoir 1912. For example, the cell array 1955 may include over 10, over 20, over 40, over 60, over 80, over 100 or over 120 cells; in one example, 126 cells. The strain sensing cells 1914 may comprise piezo-resistive cells (for example, thin film elements), the resistance of which may change when strain is applied. An example of an earlier publication disclosing the implementation of strain gauges in a printhead die is international patent application publication No. WO2018/199891A.

In one example, the print material reservoir 1912 comprises an air interface 1918, through which pressurized air may be introduced, in addition to a print material outlet 1919, per FIG. 19A. The air interface 1918 may be an air input for example comprising a socket with elastomer seal. When the print material reservoir 1912 is pressurized through the air interface 1918, the surface of the wall to which the cells are mounted deforms, for example bulges outwards, and the strain sensor cells 1914 may be placed under strain, illustrated in FIG. 19A by line 1914A. In one example, an increasing resistance as a result of the increasing strain, may decrease a voltage output of the cells 1914A. In other examples, the sensor circuit could be placed so that a cell resistance could decrease as a result of the pressurization and/or deformation, and a returned voltage could increase. The analogue output (e.g., voltage) may be converted to a digital output, which digital output may vary in accordance with the analogue output.

FIG. 19 illustrates a series of output count values, in this example, again, within a range of 256 counts from 0 to 255, based on readings of a sub-set of strain sensing cells 1914-0 to 1914-n of the first sensor cell array 1955 after AD conversion. In FIG. 19 renders output count values of a selected sub-set of cells 1914, like sensor cell #5, 11, 16, 23, etc. FIG. 19 illustrates different output count values associated with each selected sensor cell 1914 when a relatively low (1993) and a relatively high (1994 or 1995) pressure is applied to the reservoir 1912, whereby the difference in output count value for each cell may be associated with certain pressure difference. In this diagram, lower count values are associated with higher pressures. It can be derived that differently numbered, yet nominally the same, cells 1914 of the array 1955 return different signals based on the same pressure, which may be related to certain constraints of the wall portion along which the respective cell extends and/or to a location with respect to an internal pressure structure of the reservoir 1912. The selected pressures and cells of FIG. 19 are for illustrative purposes. It will be appreciated that similar principles may apply when different (numbers of) sensor cells and different pressures are used.

Line 1993 represents outputs of cells 1914 when a pressure in the reservoir 1912 is approximately at or slightly below atmospheric pressure (for example between 0 and −3 kPA gauge pressure). A negative gauge pressure is also referred to as a backpressure. Such negative gauge pressure or backpressure may prevent drooling of print liquid out of a print liquid outlet 1919. The backpressure should be negative enough to prevent drooling but not too negative to not resist too much against print material extraction by the print apparatus. The backpressure in the reservoir 1912 may be facilitated by a pressure structure 1917 such as a variable volume (e.g., expandable/collapsible) air chamber in the reservoir 1912. Certain variable volume chambers may resist again expansion, like, for example, a spring biased (e.g., flaccid) bag; an elastic balloon; a moulded air chamber having at least one biased (e.g., spring biased or elastic) flexible wall; or by other example pressure structures. FIG. 19A diagrammatically illustrates an expansion of such variable volume chamber with an added, convex dotted line along pressure structure 1917. In the field, such pressure structure may sometimes be referred to as regulator. Further channels, valves and springs may, but need not be, applied for further internal liquid and air pressure control.

The pressure structure 1917 may be connected to the air interface 1918, so that the approximately 0 or negative pressure may be uplifted by a pneumatic stimulus as will be further explained below. As said, in one example, the pneumatic stimulus is caused by pressurizing the air interface 1918, which may result in a higher positive reservoir pressure that stimulates print material flowing out through the print material output 1919. Examples of pressure structures are described in earlier publications including US patent publication Nos. 7862138, 8919935, 9056479, 8998393.

The atmospheric or below atmospheric pressure in the reservoir is indicated by line 1993, whereby it is shown that different cells 1914 along the array 1955 may output different count values, which may be caused by different strains over each respective cell, in turn caused by the different constraints of respective wall portions over which the respective cells extend. In one example the sensor cells are mounted to a reservoir wall of plastics, of about 1-2 mm wall thickness. A wall may be locally thinned for better strain sensing. For example, a lowest or nearly lowest cell (e.g. No. 125) may extend relatively close to a bottom of the reservoir 1912 and a respective wall portion may deflect only for a small amount or almost nothing, in response to the pneumatic stimulus. Even in a state where no external pressure is applied to the reservoir 1912 or air interface 1318, different cells 1914 may experience different strains which explains the different output values.

When the replaceable print apparatus component is not pneumatically stimulated, per line 1993, the cell readings may be in a relatively high sub-range, near a highest count value 1991, for example in a sub-range 1990-4 approximately between a middle 1990-3 and a highest count value 1991, for example with each cell outputting a count value between 128 and 250, for certain operational calibration parameters that may be determined at customer installation or manufacturing stage.

FIG. 19 further illustrates a series of (e.g., test) readings of cells corresponding to approximately 0 inches of water column (approximately 0 kPA) of gauge pressure (or slightly below such as between 0 and −3 kPa gauge pressure), along line 1993, 100 inches of water column (approximately 25 kPA) of gauge pressure, along line 1994, and 150 inches of water column (approximately 37 kPA) of gauge pressure, along line 1995, which lines illustrate that in this example the output count values of the cells decrease in response to an increasing pressure inside the reservoir 1912. In one example, confirming that the output is below a certain threshold can be associated with a functioning pressure structure and/or the absence of liquid leakage of the liquid reservoir 1912 or absence of air leakage of the pressure structure 1917.

In a further example, if a read cycle (1720-1760) is repetitively applied to the same cell 1914, the output count value would move downwards in the diagram during a pressure build-up, and then back upwards after the pressure peak. The same cell 1914 of the array 1955 may generate varying signals in time based on a single pneumatic stimulus, for example returning decreasing count values during a hyper-ventilation pulse, and after the pulse increasing count values again towards the higher sub-range 1990-4.

In certain examples, the gauge pressure applied to the reservoir 1912 by the print apparatus may be at least approximately 7 kPA, at least approximately 14 kPA or at least approximately 20 kPA, for example approximately 23 kPA at a peak of air pressure as applied by a print apparatus pump to the air interface 1918 as measured inside the reservoir 1912. The print apparatus may send the read request at a point in time near an expected pressure peak, for example during the pump instruction by the print apparatus. Hence, the sensor cell array 1955 may be configured to respond to a pressure change of at least approximately 7 kPA, at least approximately 14 kPA or at least approximately 20 kPa. The logic circuitry package is configured to respond with different count values when there is a normal operating gauge pressure inside the reservoir of, for example, between approximately −3 and approximately 0 kPa as compared to when the gauge pressure in the reservoir is higher than 7 kPA, higher than 14 kPA or higher than 20 kPA. In one example, such difference in count values is illustrated, for example, at least approximately, by the difference in lines 1993 and 1994.

In some examples, where output count values may vary in the earlier mentioned range of 0 to 255, calibration may occur to a pre-selected sensor cell 1914, for example a lowest cell 1914-0, so as to provide an output count of at least approximately 150, at least approximately 200, or at least approximately 225, and below 245, for example in the absence of a pneumatic pulse. This gives some margin for deviations above the highest count and even more margin for the lower counts associated with other cells and pneumatic stimuli, while inhibiting signal clipping at 0 and 255.

In some examples, the calibration may be carried out on a single cell to aim for a target count value of above approximately 150, or above approximately 200, for example between 150 and 245. In one example, a sensor cell which is expected to be under the least strain (or at least under a relatively low strain) during pressurization may be selected for calibration, such as a lowest cell 1914-0, for example during a time when no effect of a pneumatic stimulus is expected, whereby the sensor cell may be expected to output a highest count value HC. In these examples, the target highest count value HC may set above 200, for example between 225 and 245, and an offset parameter may be adjusted until this value is achieved. Other sensor cells may be expected to render lower count values during the pneumatic stimulus, whereby in one example the difference between the cell with the highest count value HC and other cells may be calibrated using the amplifier parameter. The calibration parameters that can be associated with the output count values that fall within the output range 1990, or within higher subrange 1990-4, may be determined to be operational calibration parameters, and may be stored in a print apparatus logic circuit at the end of a calibration cycle and then used for subsequent read cycles. In certain examples one or more calibration parameters 1607-2 may be used that are pre-stored in the memory 1607. In other examples, wall thicknesses and strains between reservoirs and first sensors 1955 of the same nominal properties may vary unpredictably so that calibration is to occur at customer installation.

In some examples, a reading may take place during a pneumatic event, for example associated with an internal pressure of the reservoir 1912 of at least approximately 7 kPa. In such examples, it may be expected that an output count value of a chosen cell is in a range which is below a threshold value (for example, below approximately 180, or below 150, or below 100). In one example, the sensor cell 1914 which is expected to be under a relatively high amount of strain may be selected for reading, for example a sensor 1914 outputting a relatively low count put count value such as the lowest count value LC. In some examples, if, after calibration, a pneumatic stimulus is applied, and an expected behaviour for one or more chosen sensors is/are not detected (e.g. there are no readings below the threshold), this may indicate that the pressurization event is not functioning properly, for example, because of a leakage in the reservoir or air chamber.

In one example, the logic circuit with the sensor cell array 1955 is configured to detect a potential leakage of the reservoir 1912, for example during a prime cycle. For example, the effect of the pneumatic stimulus may be associated with a relatively high internal reservoir pressure above atmospheric pressure, or above 7 kPA, above 14 kPA, above 20 kPA or above 23 kPA gauge pressure, for example at a point in time just after the pump stopped pressure build-up. If a returned count value is above an expected threshold, say above 200 counts, then there may be a leakage of liquid or air in the reservoir 1912 that caused the pressure to be under that threshold.

In one example, the sensor cell array 1955 is mounted to a wall of the reservoir 1912, for example in the same package as the temperature sensor cell array 1857. Accordingly, the sensor cell array 1955 can be provided in the inside of the reservoir 1912, against an inner wall of the reservoir 1912, for example near a front and up to a bottom of the reservoir 1912, at least, in an operational orientation of the reservoir 1912. In another example, the first sensor cell array 1955 can be mounted to the exterior of the reservoir 1912 where it can still sense wall deflection and correspondingly, the pneumatic stimulus and/or its pressure characteristics. In a further example, the sensor cell array 1955 has an elongate shape wherein the length is at least five times, ten times or twenty times greater than a width and/or thickness. The array 1955 may include cells 1914 that are nominally the same having at least 20, 30, 40, 50, 80, 100, 120 cells, for example 126 cells. The sensor cell array 1955 can be part of a thin film stack that connects to the interface of the logic circuitry package, for example through shared decoding logic and output buffer of both sensors 1955, 1857. As illustrated in FIG. 19, the sensor cell array 1955 may be configured to output a plurality of different signals associated with the same pneumatic/pressure event.

In one example scenario, at installation, the printer apparatus may send a command stream to a logic circuitry package to select cells of the first sensor cell array 1955, the command stream including calibration parameters, a class parameter including a first sensor class selection, and sub-class parameter(s) including sub-class selections associated with the cells 1814. In response, the logic circuit may identify the parameters, and select the pneumatic sensor cell array, and the respective pneumatic sensor cell(s) 1914, and output, for example in a read field of the logic circuit 1603 in response to a read request, the count value corresponding to the state of the cell(s), for example where the count values may be similar to the points on line 1994 of FIG. 19.

When a sensor cell is consulted for the first time at installation, for example during a prime or hyperinflation event, the logic circuit 1903 may output a clipped, too high or too low count value 1991, 1992. In repetitive calibration cycles, the calibration parameters may be adjusted until count values are returned that are within the output count value range 1990 or sub-range 1990-4 and at a distance from the too high and too low count value 1991, 1992.

There may be more than two, three, four or five cell classes, for example including the second print material level sensor 1857 and the first sensor 1955. Some of these cell classes, also referred to as third and fourth class in this disclosure, may be associated with a single cell instead of an array of multiple cells. These single cells may be calibrated at design, manufacture and/or at first print apparatus "in-situ" usage by a customer. Since single values may be returned for these cells, there may be less parasitic resistance. For example, for single cells a desired output count value sub-range may be set approximately around a middle count value (e.g., approximately 127), for example between 55 and 200. Hence, an example logic circuit of this disclosure may be configured to, in a substantially filled, not-externally-pressurized/stimulated state, under a constant room temperature (e.g. around 20 degrees Celsius), and after calibration, (i) in response to a first class selection, return count values between 150 and 245 counts, (ii) in response to a second class selection, return count values between 60 and 200 counts, and (iii) in response to a third class selection, return count values between approximately 55 and 200. The first and second class selection may be followed by a suitable sub-class selection and the third class selection need not be followed by a sub-class selection since it includes only a single sub-class. All responses of the logic circuit may be in reply to read requests.

In one example, certain operational calibration parameters can be determined at manufacture and stored on the memory 1607 while other operational calibration parameters are to be determined at customer usage, for example a first off-the-shelf customer usage. The calibration parameters that are used in a first calibration cycle, for example for further optimization, can be retrieved either from the logic circuitry package's memory 1607 of from a memory of the print apparatus. In one example, the memory 1607 of the logic circuitry package 1601 is read by the print apparatus by sending a request to the first address, and then the same calibration parameters are send as part of a command to the logic circuit via the second or new communication address, for conditioning the output count values.

For example, at least one of a heat, offset, gain/amplifier, AD and DA parameter may be stored on the memory 1607 for a certain class. For example, a plurality of operational calibration parameters ("OCP") 1607-1 or a plurality of sets of operational calibration parameters may be stored on the memory 1607 of the package 1601, 1701 wherein each operational calibration parameter or set thereof is to be associated with a respective cell class. For example, the logic circuitry package 1601 is configured to, using the stored at least one operational calibration parameter 1607-1, output count values between the lowest and highest output count value of the output count value range. Note that the print apparatus logic circuit may use the stored operational calibration parameters 1607-1 to start a further calibration cycle to determine better calibration parameters for usage during reading, for example calibration parameters that generate count values within a smaller sub-range at a certain distance from the highest or lowest output count values of the output range. In a further example the memory 1607 may store calibration parameters just to decrease a number of calibration cycles.

Figure 20:
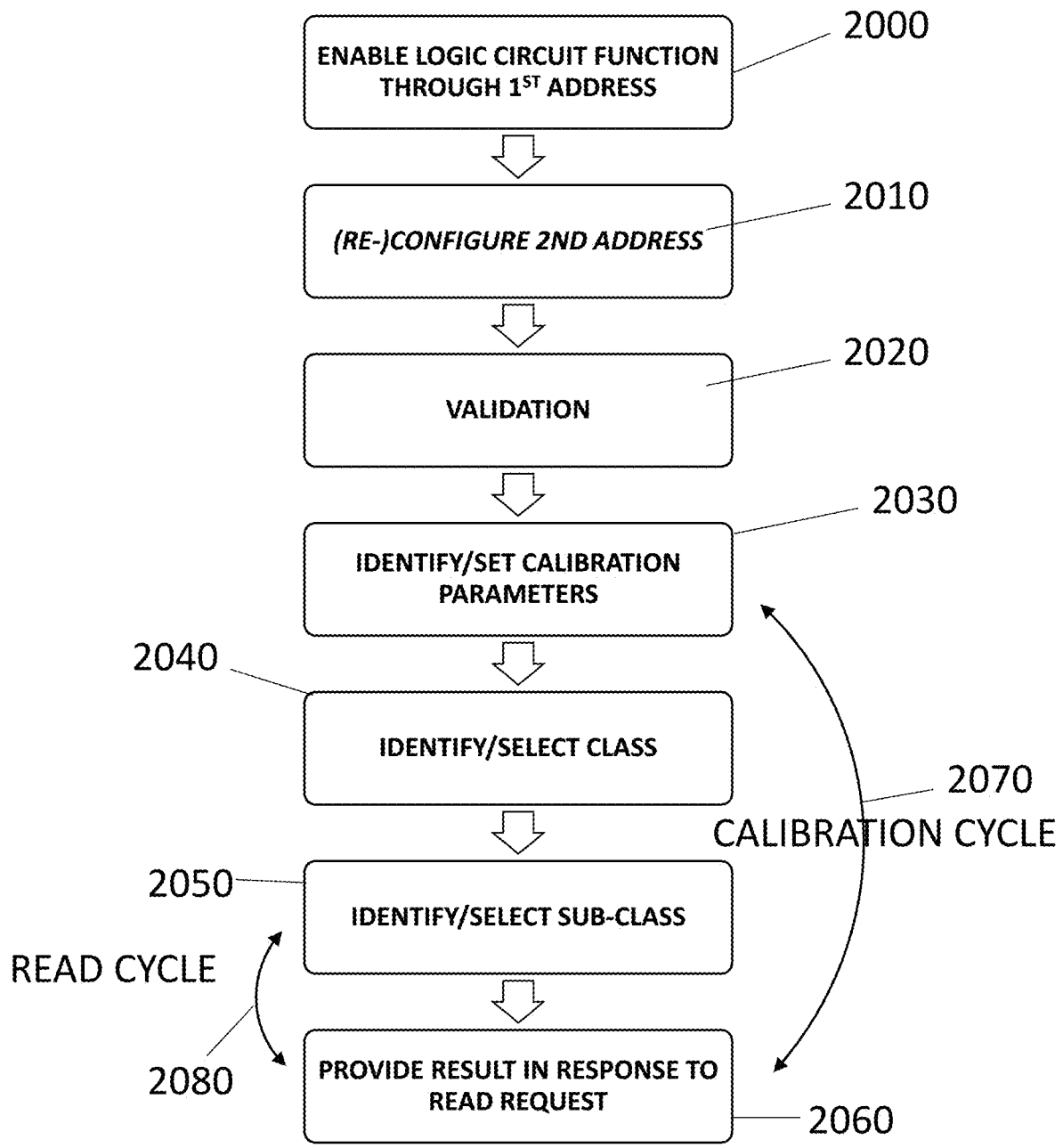
FIG. 20 shows a flow chart of an example of a method of outputting count values in response to printer commands that contain calibration, class and/or sub-class parameters.

FIG. 20 illustrates an example of a method of outputting count values in response to printer commands that contain calibration, class and/or sub-class parameters. Part of this method may overlap with FIG. 17. The method may include enabling logic circuit functions in response to a command sent to a first address of the logic circuitry package 1601, 1701 (block 2000). In one example the functions include enabling (i.e. responding to communications directed to) a second address for a certain duration based on a time period specified in the command. Upon receiving the command, a time function is started so that the logic circuit can again respond to communications to the first address after expiry of the duration associated with the specified time period, as determined by the time function. The time function may include a timer or a delay circuit as explained in other sections of this disclosure, which may be monitored or may expire to determine the end of the duration. In the example of FIG. 20, several calibration cycles (2030-2070) and/or read cycles (2050, 2060, 2080) may be ran before expiry of the duration, for example more than hundred cell readings. Each single cell reading may be considered a read cycle.

The method may include, upon receiving a command with a new address, configuring that new address (block 2010), for example in the address field 1604, whereby the new address may be received via the default second address. As explained in various sections above, the default second address may be the same for different logic circuitry packages associated with different print material types and connectable to the same print apparatus, whereby the new address may be configured in the same address field (e.g. 1604 of FIG. 16) of the logic circuit as the default second address, which new address may be randomly generated by the print apparatus logic circuit. This capability of the logic circuit may be referred to as a new second address-setting function. The new second address-setting function may facilitate providing a different address to each separate logic circuitry package associated with a separate component connected to the same print apparatus. After configuring the new address, the logic circuitry package 1601 is to respond to communications directed to the new address for the rest of the duration. The duration may be approximately as long as the time period. Where the time period is different for different "enable"-commands specifying the time period (per block 2000), the respective durations may be different as well. In certain examples, in cases where such different time periods have marginal differences with respect to each other, the same duration may be applied for these marginally different communicated time periods.

In certain examples reconfiguring the second address to a new address can be omitted. For example, if only one second logic circuit is enabled, setting a new address is not necessary and using the default second address is sufficient. Using the default second address may also be sufficient if a print system includes only a single (e.g. monochrome) replaceable to be connected to the print apparatus. In again other examples the logic circuitry package facilitates reconfiguring its second communication address to a new address multiple times in the same duration associated with the same time period. The logic circuitry package may be reconfigured with as many different second addresses as possible by different 7 or 10 bit-combinations.

The method may further include the logic circuitry package 1601 determining a validation response (block 2020), for example by providing one or more of a cell count (1463, 1563, 1663), a version ID (1437, 1537, 1637), a R/W history value (1465, 1565), in response to a printer command via the (e.g., reconfigured) second address, and as stored on the (e.g., second) logic circuit 1603. The same, yet differently encoded, data may be provided as part of signed data in response to commands sent to the first address, before or after the time period, so that the version ID and cell count can be validated by comparing the differently encoded data values associated with the second and first address, respectively.

After the aforementioned enabling (block 2000), address re-configuring (block 2010) and validation (block 2020), calibration (2030-2070) and/or read cycles (2050, 2060, 2080) may be executed. As will be explained, a calibration cycle 2070 may be applied to a single cell of an array, or a limited number of cells, while a read cycle may be applied to all or a sub-set of cells in an array. For example, more cells will be addressed during a read cycle than during a calibration cycle, whereby at least one calibration cycle, for example at least one calibration cycle per class, may be executed before the read cycles. In certain examples, if at least one calibration cycle is executed in a first enablement time period (block 2000), then the therein obtained calibration parameters can be re-used in later time periods without needing to re-run calibration cycles in those later time periods.

In one example, the commands associated with blocks 2030-2050 involve respective command/responses between the print apparatus logic circuit and the component logic circuit, wherein separate commands may specify a calibration parameter (block 2030), a class parameter (block 2040), a sub-class parameter (block 2050) and/or a read request (block 2060).

The method may include, in response to a command including calibration parameters, identifying and setting the calibration parameters by the logic circuit 1603 (block 2030). For example, the logic circuit may first identify a calibration parameter from the command, and then select its calibration logic function in correspondence with the calibration parameter function, and set its calibration logic function in correspondence with the calibration parameter value. For example, a first calibration parameter is encoded to indicate an amplifier function and an amplify amount value whereby the logic circuit is configured to identify the function and amount and apply it to is corresponding amplifier gain circuit. Similarly, other calibration functions may be driven, such as the offset circuit, DA/AD conversion circuitry and/or the heater array, whereby certain calibration functions may be driven in combination.

For example, where applicable, previously set calibration parameter values may be overwritten. At the start of a session 2000-2060, default (i.e., default after reset) calibration parameters may apply. Later during the same session, new calibration parameter values may be written to the respective memory fields (1705A). Within the time period, default or previously written calibration parameter values continue to apply until they are overwritten, even where certain calibration parameters were used for a different class. Where different classes are to be read, it may be advantageous to write, each time before a first read of a certain class of cells, class-specific operational calibration parameters to the logic circuit.

The method may include identifying and selecting a class (block 2040) based on a command specifying a class parameter. The logic circuit may select a sensor amongst different sensor classes based on the class parameter.

The method may include identifying and selecting a sub-class (block 2050) based on a command specifying the sub-class parameter. In one example, the logic circuit selects a cell based on the sub-class parameter, for example a cell of a previously selected sensor class. The sub-class parameter value may include a number representing a cell ID.

In one example, the logic circuit is configured to retain a sensor class selection until it is overwritten, so that subsequent to a class-selection, multiple sub-class selections may follow to select cells of the same sensor class without needing to select, each time, the same class again before selecting each different sub-class. In one example, the logic circuit may have a default sensor class that it will turn to after reset. The default sensor class may be a print material level (e.g. temperature) sensor class or second sensor class. Where a default class is pre-selected after enablement, a class selection may be skipped, and respectively sub-classes may be selected directly. Similarly a default sub-class may be a first sub-class, for example cell number zero.

Example logic circuits include at least one sensor class of only one sensor cell. One single cell sensor may be defined by a diode. Another single cell sensor may be defined by a resistor wire. The diode may be associated with a third class and the resistor wire with a fourth class. Each of the third and fourth class are associated with a single sub-class. The third class may be configured to function as an absolute temperature sensor of the sensor circuit, and the fourth class may be configured to function as a sensor circuit-crack detecting sensor. In one example, since there is only one cell associated with the third and fourth class, the logic circuit is configured to return responses based on said third and fourth class without receiving an intermediate sub-class selection command.

Each cell of a single sensor class may have a unique ID for that class. A series of cells may be identified by binary encoded number such as 0, 1, 2, 3 . . . n. Cells of a first class and cells of a second class may apply the same series of IDs 0, 1, 2, 3 . . . n. Hence communicated sub-class parameters may be the same for different classes.

The method may further include receiving and identifying a read request and outputting a value based on the last selected calibration parameters, a last selected class and a last selected sub-class (block 2060). Said outputting may include loading a read buffer 1622, to be read by the print apparatus via the second address. In certain examples, steps 2030-2060 may be executed without following up with a read request, for example for testing purposes during manufacturing and/or to be able to set or reset cells, for example to "clear" a scan chain of registers, switches, and cells.

As explained earlier, the logic circuit 1603 may need calibration to output results in a useful count value range. After a first calibration cycle 2030-2060, wherein the cyclical nature is indicated by an arrow 2070, a first returned count value may be clipped to a lowest or highest value of a count value range. The clipped count values may be associated with non-operational calibration parameters. Because some margin is needed for output count values to increase and decrease for proper interpretation, the highest or lowest output count value may be considered to be outside of an operational range and further calibration cycles may be executed.

A second or later calibration cycle 2030-2070 for the same sensor and sensor cell includes again receiving a new command including (new) calibration parameters and a new read request. In most instances, the same class and sub-class selection continue to apply until they are overwritten, so that blocks 2040 and 2050 may be skipped for each calibration cycle 2030-2070.

The print apparatus logic circuit may, each time, input different calibration parameters and monitor the returned output count value of the logic circuit per block 2060. The logic circuit is configured so that, after each command, newly provided calibration parameter values replace the previously used calibration parameter values. The logic circuit is configured to condition the output based on the newly (i.e., last) provided calibration parameter values. The print apparatus logic circuit may, each time, strategically write new calibration parameters based on the previously returned count values, first to obtain in-range count values, and second to converge to a desired count value sub-range within the wider range.

At some point, the returned count values are in the desired count value range, e.g., between the highest and lowest count value and at a distance from the highest and lowest count value, such as at least one count distance from the highest and lowest count value, for example within a narrow sub-range (e.g., 1890-2, 1890-4, 1890-1, 1990-4 of FIG. 18 or 19). In one example, the print apparatus and/or the package memory 1607 may store a specific sub-class ID of each class to use for calibration. The sub-class to be used for calibration may be based on the most appropriate cell for the respective array, for example best positioned for the test. After determining and storing a set of operational calibration parameters for a certain class, (i) the at least one cell of the class may be read using these operational calibration parameters, or (ii) the operational calibration parameters may be stored by the print apparatus to be used during one or more later read cycles; and another set of operational calibration parameters may be determined for another class in the same fashion (blocks 2030-2070).

The operational calibration parameters may be stored for at least as long as the duration of the time period, or for multiple time periods, or for the lifetime of the component. The operational calibration parameters may be stored in the host print apparatus logic circuit, or a memory the print apparatus component logic circuitry package, whereby the latter could be as default parameters-after-reset in the logic circuit or under a digital signature in a first memory associated with the first communication address. One or more operational calibration parameters are determined for each class. The calibration cycles 2030-2070 may be executed at manufacture and/or during customer usage, where the latter may be during, between, before or after print jobs. As will be further clarified below, calibration cycles 2070 may be based on a single, pre-selected cell of each cell-array while the read cycle, illustrated by an arrow 2080 may cycle through multiple cells of each array.

Before starting a read cycle (2050, 2060, 2080) for cells of a cell array, previously determined (e.g., operational) calibration parameters are set and the class is selected, per blocks 2030 and 2040, respectively. In a read cycle, the logic circuit 1603 may receive series of sub-class parameters (e.g., including sub-class IDs) and read requests. In response to each read request (block 2050) the count value pertaining to the last sub-class parameter is pushed to the read buffer 1622, whereby each count value may represent a state of the cell selected by the sub-class parameter. The command stream and the responses may be provided for all cells, or a sub-set of cells. The returned count values may vary between cells, for example because of parasitic resistance in a second cell array, and because of different strains (with or without pressure) in a first cell array. Between reading cycles for different sensor cell arrays a new class selection command may be dispatched to switch sensor. In some examples, calibration cycles 2070 are ran for a new class when switching from a previous class to a new class before beginning the read cycle 2080 for the new class.

In another example read cycle the logic circuit 1603 may generate a chain of read-outs, associated with a plurality of cells, in response to a single command and/or a special read request. The logic circuit 1603 may be configured to cycle through all or a sub-set of cells of the selected sensor class and return each respective cell read result in response to that single request.

In this example read cycle 2080, the command stream received by the logic circuit 1603 may include each time an individual sub-class selection and read request, whereby the logic circuit 1603 returns an individual count value corresponding to that sub-class in response to each read request. The last instructed calibration and class parameters continue to apply so that the read cycles only select a new sub-class (e.g. cell ID) for each cycle. Accordingly, arrow 2080 illustrates that the calibration and class selection need not be repeated for the read cycle through the cells of a cell array. When a new sensor class is to be read, new calibration and class parameters may be set, and a new read cycle may commence. For the third and the fourth class, associated with single cell sensors, a single calibration may be sufficient, which may also provide for the read result. Also, a class selection may be sufficient for the third and fourth class.

The print apparatus logic circuit may (i) instruct the logic circuit 1603 to run a series of calibration cycles for different classes, (ii) after completing each cycle store the obtained operational calibration parameters for each class, and (iii) then run read cycles 2080 for all classes without calibration in between. For example, a calibration cycle is executed for a first sensor, for which the determined operational calibration parameters are stored in a memory, then a calibration cycle is executed for a second sensor, for which the determined operational calibration parameters are separately stored in the memory, after which a read cycle is executed for cells of the first sensor, using the operational calibration parameters stored for the first sensor, and then a read cycle is executed for cells of the second sensor, using the operational calibration parameters stored for the second sensor. In another example, a calibration cycle is executed for a cell of a first sensor and then a read cycle is executed for a plurality of cells of that first sensor, after which a calibration cycle is executed for a cell of a second sensor and then a read cycle is executed for a plurality of cells of that second sensor.

FIG. 21 illustrates a diagrammatic example of a replaceable print component 2112 and sensor circuit or sensor circuit package 2101, which is another example of a logic circuitry package of this disclosure. The sensor circuit package 2101 includes at least one sensor 2155, configured to detect the effect of a pneumatic event and/or a pressurization, and an interface 2123 to communicate with a print apparatus logic circuit. A pneumatic event, or pneumatic stimulus may include air being supplied by a print apparatus air interface to an air interface 2118 of the component 2112.

The sensor circuit package 2101 may include integrated circuitry 2102 such as a first logic circuit 1403, 402*a*, 402*b*, 402*c*, 402*d* and/or second logic circuit 1405, 406*a*, 406*b*, 1603, 1703. In the example of FIG. 21, the sensor circuit package 2101 is mounted to a print apparatus component 2112. In one example, the sensor circuit package 2101 is mounted to an exterior of the component 2112 or is mountable and dismountable without needing to open or disassemble the print component reservoir 2112A. The sensor 2155 may include a single sensor cell or a sensor cell array of a plurality of cells. The sensor 2155 may be connected to the integrated circuit 2102 through a wired or wireless connection. The integrated circuit 2102 may in itself include both hardwired routings and-or wireless connections.

In different examples, the sensor 2155 may include an array of strain sensing cells (e.g. strain gauges) such as described with reference to FIGS. 19 and 19A, or one or more sensors other than strain sensing cells, that are adapted to detect an effect of a pneumatic event such as through air pressure changes, liquid pressure changes, material strains/stresses, moving parts of the component such as the walls, pressure structure 2117, etc. Multiple examples of first sensors 2155 will be further addressed below.

Typically, a pneumatic event, initiated by the print apparatus, results in air displacement through the air interface 2118 and an increase in pressure in the print apparatus component reservoir 2112A, for example using a suitable pressure structure 2117 such as an internal pressure chamber or bag connected to said interface 2118 through an air channel.

In certain examples, the sensor 2155 may be configured to detect any change in pressure of at least approximately 7, at least approximately 14, at least approximately 20 kPa, or at least approximately 23 kPa. For example, the change may reflect a difference between a normal operating pressure of just below 0 kPA gauge pressure, for example between 0 and −3 kPa gauge pressure, and a pressurized state inside the reservoir 2112A of at least approximately 7, at least approximately 14, at least approximately 20 kPA or at least approximately 23 kPa.

In an alternative embodiment, the first sensor 2155 can be configured to detect the pneumatic stimulus applied by the print apparatus but may not be suitable to detect pressure differences in the reservoir 2112A, which may be sufficient to provide for a valid output to the print apparatus. For example, sensors 2155 may detect air movement or liquid movement associated with pneumatic stimuli, for example adjacent the respective air or liquid interface 2118, 2119, respectively, but without detecting an effect of an internal pressurization or a level of pressurization inside the reservoir 2112A. In certain examples a clearance is provided instead of an air interface 2118, to clear a print apparatus air pen, whereby the first sensor 2155 is positioned to detect the pneumatic stimuli provided by the print apparatus air pen. In such example the first sensor 2155 may be mounted to an exterior of the component 2112 or directly to the IC 2102.

Examples of sensor circuits 2101 may detect pneumatic stimuli and confirm the occurrence thereof, for example for validation by the print apparatus logic circuit, without being able to detect that a pressure is above a certain threshold during the pneumatic stimulus. The effect of an air pulse may include a rapidly increasing pressure during the pulse and, for example, a slowly decreasing pressure in the reservoir 2112A after the pulse has completed. In certain examples, the effect of the pneumatic event may still be detectable until the pressure has decreased to a lower point for example even until slightly above 0 kPA but not necessarily above 7 kPA gauge pressure, which may be detected by the first sensor 2155 to provide a valid output.

The air interface 2118 may include an air input to which an air output, such as an air pen of the print apparatus, may connect, to pressurize the reservoir 2112A. The reservoir 2112A may include a pressure structure 2117 connected to the air interface 2118. The reservoir 2112A may include an air channel. For example, the pressure structure may include a partly flexible air chamber connected to an air socket through the air channel. In use, air in the air interface 2118, air channel and air chamber may be isolated from liquid in the reservoir 2112A. The air chamber can be collapsible/expandable to increase pressure in the reservoir 2112A by blowing air through the air interface 2118. For example, the pressure structure 2117 may be adapted to pressurize the reservoir when pressurized air is supplied to the air interface 2118. When no external pressure is applied, in a normal operation, the pressure structure 2117 may be adapted to provide for a backpressure. In other examples the air interface 2118 may connect directly to the reservoir 2112A, without using a separate air chamber, so that air being blown into the reservoir 2112A may directly pressurize the reservoir 2112A.

As explained in earlier sections of this disclosure, a prime event may pressurize the reservoir 2112A and the sensor 2155 may sense the pneumatic event directly such as by sensing moving air or reservoir pressure, or indirectly through a strain or deflection of certain replaceable component parts such as a reservoir wall or pressure structure.

Different configurations of first sensors 2155 may be suitable to detect the effect of the pneumatic stimulus. In different examples, the pneumatic sensor 2155 may be a pressure sensor; a strain gauge; a strain gauge supported by a wall of the reservoir; a strain gauge supported by a reservoir; a metal slug (e.g., with return spring) inside of an inductor; a manometer, for example using a conductive liquid and electrical contacts that are wetted when air pressure is applied, for example located at the air interface 2118; a manometer with (e.g., optical) sensors to measure the location of the air to liquid interface; an accelerometer; a diaphragm or slug connected to a reed (or other) switch which can detect displacement of the diaphragm; a mechanically actuated switch actuated by air displacement, or another suitable sensing cell. Furthermore, the output from said sensor(s) could be conditioned by a logic device algorithmically or through use of a Look Up Table (LUT) prior to be returned to a host. Hence, in different examples, a pressure or air blow event is not directly measured but the print apparatus infers the event from signals received from the sensor. For example, the effect of the pneumatic event may include an increased stress of walls of the reservoir 2112A, displaced air in or around the air interface 2118 and the pressure structure 2117, temporarily increased print material output flow, etc. For example, the sensor may be placed in the reservoir; against an internal or external side of a wall of the component; at, in or near the air input port; at the print material output port; or at any suitable location of the component. For example, when a component is pressurized, a wall of that component may expand, and the pressurization may be sensed at multiple locations including on the outside or at the print material output 2119. Some of these example sensors may be suitable to detect that an internal reservoir pressure is above a certain threshold to thereby be able to control a prime operation or to detect a reservoir or pressure chamber leakage.

Figure 24:
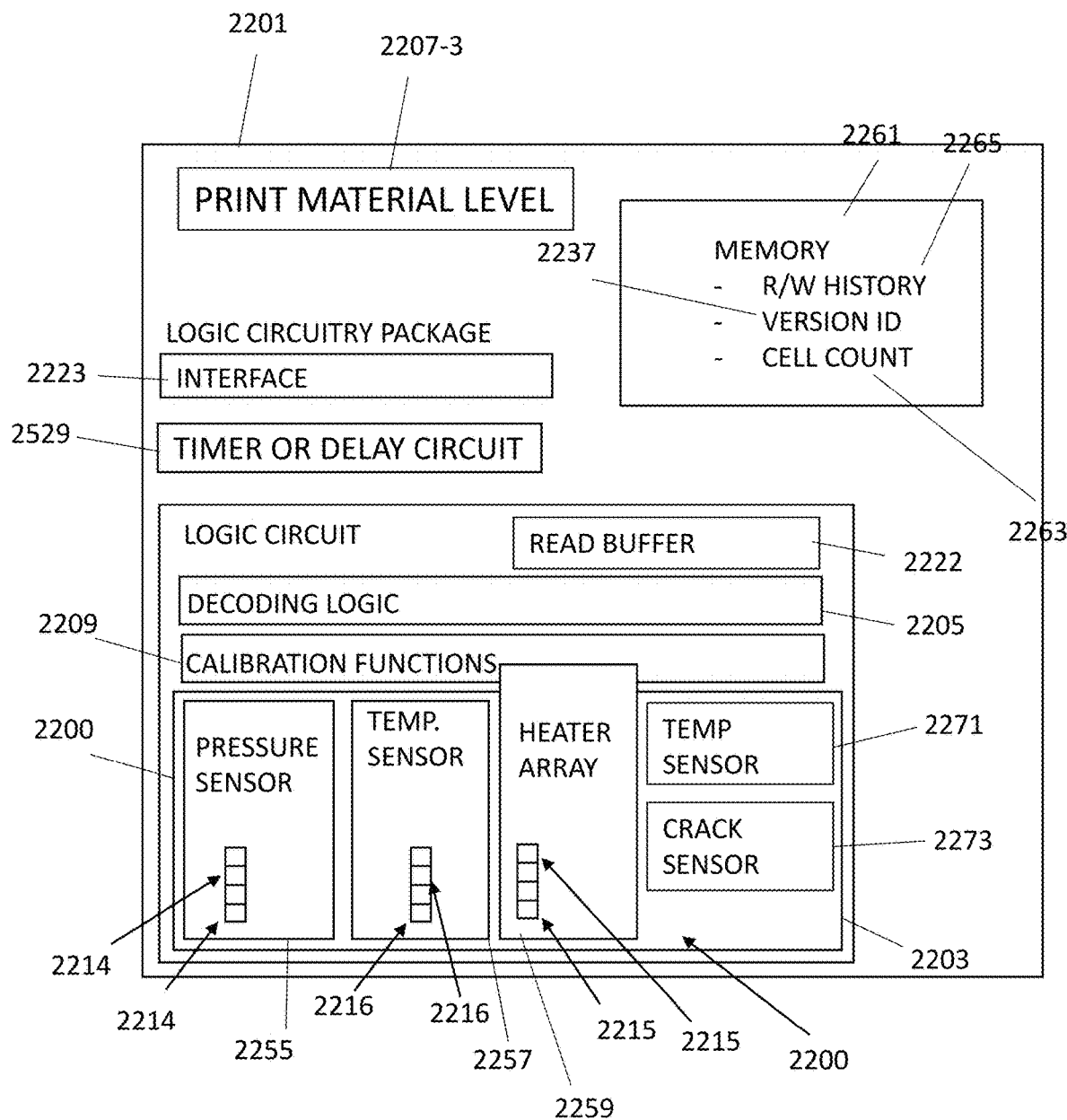
FIG. 24 shows another example of a logic circuitry package.

FIG. 22 and FIG. 23 illustrate a portion of an example replaceable print component 2212 and the replaceable print component 2212, respectively. The logic circuitry package 2201 of FIG. 22 may have similar characteristics as the logic circuitry package 1302 of FIG. 13A. The replaceable print component 2212 may have similar characteristics as the replaceable print component 1312 of FIG. 13B. FIG. 24 illustrates a circuit diagram of yet another example logic circuitry package 2201. In one example the logic circuitry package 2201 of FIGS. 22-24 may include similar aspects as the package 1401 of FIG. 14 and the package 1601 of FIG. 16 and the logic circuit 1703 of FIG. 17A.

The logic circuitry package 2201 includes a sensor circuit 2203, herein referred to as sensor circuit 2203. The sensor circuit 2203 may include decoding logic 2205 to identify parameters in incoming command streams. The decoding logic 2205 may be hardwired for example in the form of multiplexing circuitry including one or more of shift registers, flip-flops and latches, and/or (over-writable) memory arrays. The sensor circuit 2203 may include different calibration logic functions, to calibrate an output based on the calibration parameters, including at least two of, and/or any combination of, an offset circuit, an amplifier gain, a DA converter and an AD converter. The logic circuit may include a read buffer 2222 and an interface 2223 to communicate with a print apparatus logic circuit.

The logic circuitry package 2201 includes a first sensor 2255 to detect an effect of a pneumatic stimulus (and/or pressurization) applied by the print apparatus to the print apparatus component 2212. The component 2212 includes a print liquid outlet 2219 and an air input 2218. The air input 2118 may include a port or socket to receive pressurized air of an air pen of the print apparatus. The air input 2218 is pneumatically connected to the inside of the component 2212, for example through an air chamber and a collapsible/expandable air chamber that are part of a pressure structure. The sensor circuit 2203 may be mounted to a wall of the print apparatus component 2212, in this example an inner surface of the reservoir wall or shell 2225.

The sensor circuit 2203 may be defined by thin film circuitry. The first sensor 2255 may be part of a thin film stack that connects to the interface 2223. In one example the sensor circuit is the thin film stack. The sensor circuit 2203 may be the second logic circuit as described in previous examples. The sensor 2255 may comprise an array of nominally the same sensor cells 2214, for example strain gauges.

The sensor circuit 2203 may also comprise a print material level sensor 2257 that is part of the same thin film stack. The amount of addressable temperature sensor cells 2216 may be the same as the amount of addressable pressure sensor cells 2214. The print material level sensor may comprise a temperature cell array 2257 (in this disclosure the print material level sensor and the temperature cell array may sometimes be denominated by the same reference number). The print material level sensor 2257 may have an elongate shape and extend along, and/or parallel to, a side and/or front of the reservoir, inside the reservoir, for example vertically in installed condition. In one example the state of a selected cell may depend on a temperature of the cell, as also discussed in WO2017/074342, WO2017/184147, and WO2018/022038.

The temperature sensor cell array 2257 may extend along a heater array 2259. The heater array 2259 includes a series of nominally the same heater cells 2215, which may again have the same number of cells 2215, for example resistor cells. In one example, the temperature sensor cells 2216, pressure sensor cells 2214 and heater cells 2215 have nominally different characteristics, while within each separate cell array 2255, 2257, 2259 the cells have the same nominal characteristics. In one example, the cell arrays 2255, 2257, 2259 are provided on the same substrate, for example a silicon substrate, of the thin film stack. The sensor circuit 2203 may be mounted to a rigid carrier material such as a compound or metal, or, in some instances, may be directly mounted to the cartridge wall.

Calibration functions 2209 may include separate or gain amplifier and offset functions, as well as digital to analogue converters and analogue to digital converters, whereby in certain examples different calibration functions may be combined in a single calibration function. The calibration functions 2209 may comprise common calibration logic functions that are configured to calibrate the plurality of different sensor classes and cells based on the input parameter value, for example, one sensor class at a time. In one example, the resistor or heater array 2259 is considered one of the calibration functions 2209 of the calibration logic. The decoding logic 2205 may be configured to address cells of the heater array 2259 based on the class and/or sub-class parameters for the temperature sensor cell array 2257, whereby previously set heat time and strength parameters may apply. Accordingly, a sensor circuit 2203 may comprise two cell arrays 2257, 2259 of nominally different cells 2216, 2215, wherein the decoding logic 2205 is configured to address the pairs of cells of these different cell arrays by the same class and sub-class parameters. In other examples, the decoding logic 2205 is adapted to address the different cells 2216, 2215 of different classes individually/separately. In other examples, the decoding logic 2205 may facilitate addressing the heaters 2215 and temperature sensor cells 2216 both individually and in pairs. In one example where the heaters and temperature sensor cells are addressed in pairs, the heat parameters (such as power or time) could be set to zero so that there is no effect of the addressed heaters.

A heat strength and heat time of each heater is determined by received heater specific calibration parameters, which the decoding logic 2205 is configured to identify and on the basis of which the heaters will operate. A heater strength (e.g., power or gain) calibration function determines a charge applied to each selected heater 2215 based on the input heat power parameter value. A heater time or clock function determines a heat time based on input heat time parameter value. The heater power determines the temperature of the heater 2215, and to some extent the heat time may determine temperature as well. In other examples, instead of a heater array, other cell arrays for calibration could be used to stimulate an adjacent sensor cell array, which adjacent sensor cell array may or may not be a temperature sensor cell array 2257.

In the illustrated example, the sensor circuit and/or sensors 2255, 2257 have an elongate shape wherein the length is at least five times, ten times or twenty times greater than a width and/or thickness. For example, the sensor circuit has a greatest dimension along a vertical direction, e.g. parallel to a front face 2251 in an assembled state of the component, so that in use it extends at least partly inside the print material reservoir in contact with the liquid and so that a liquid level drops along the circuit 2203 as the reservoir empties and liquid level can be determined based on cooling characteristics of each cell 2216.

As illustrated in FIG. 24, the sensor circuit 2203 may include at least three different cell arrays 2255, 2257, 2259 and/or at least two single cells 2271, 2273, each of a different class with different nominal properties, representing at least five cell classes or at least four sensor (cell) classes. A sensor assembly 2200 of the at least four sensor classes and including the calibration functions 2209 and cell arrays 2259, may be part of the elongate, thin film. Using a single sensor assembly 2200 of different sensors 2255, 2257, 2271, 2273 inside the reservoir may facilitate using a print material level sensor in the same assembly 2200.

In one example, the sensor circuit 2203 comprises sensor classes other than the print material sensor class and pressure sensor class. For example, the sensor circuit 2203 may include at least one diode 2271, and a resistor routing 2273, both nominally different than the first two classes. A third sensor class may be the diode. A fourth sensor class may be the resistor routing. The resistor routing 2273 may function as a crack sensor to sense cracks or deformations in the thin film stack. The diode 2271 may function as an absolute temperature sensor to detect a temperature of the thin film stack. Diodes may have intrinsically less variation than metal resistors in their temperature response, and hence, may be used to determine an absolute temperature. Each of the resistor and diode may consist of single cells.

The decoding logic 2205 is connected to each of the cells and is configured to identify class and, where applicable, sub-class parameters, and select each of the sensor classes and, where applicable, cells, for example using a register-multiplexing circuitry arrangement as also discussed in FIG. 17A. The decoding logic 2205 may be configured to associate one of a plurality of classes with a single resistor circuit 2273, that is part of the thin film circuitry including the sensor assembly 2200 and configured to detect cracks in the thin film circuitry. The decoding logic circuit 2205 is configured to associate another one of the plurality of classes with a diode 2271, which diode is configured to detect an absolute temperature characteristic, for example of (a portion of) the sensor circuit 2203, for example of the sensor assembly 2200 and/or thin film circuitry. Hence, this example of a sensor circuit 2203 includes at least four different cell classes such as a sensor 2255 to detect a pneumatic stimulus, a print material sensor 2257, an absolute temperature sensor 2271 and a crack resistor 2273.

A pneumatic event applied to the component 2212 may be associated with prime events and pressures as described in earlier examples of this disclosure (e.g., see FIGS. 19, 19A and 21). The first sensor 2255 may be adapted to detect a peak gauge pressure of at least approximately 7 kPa, at least approximately 10 kPa, at least approximately 14 kPA, at least approximately 20 kPa, or at least approximately 23 kPA, for example approximately 23.7 kPA. For example, a start-up prime, a print apparatus component change prime, and a printhead channel prime may each be associated with different pressures, whereby the first sensor 2255 may have sufficient resolution to detect these different pressures.

The nominally different sensor cell arrays 2255, 2257 of the sensor assembly 2200 may include at least 10, 20, 30, 50, 80, 100, 200 cells 2216, for example approximately 126 sensor cells. The number of cells of these sensor classes may correspond to a stored cell count 2263 (which may be represented by the last cell number (e.g., 125) whereby the number of cells is actually the stored cell count+1). The cell count 2263 may be stored on a memory 2261 that is part of the sensor circuit 2203, which in this example may be read by a read request to the second address.

The sensor circuit 2203 is configured to receive, for example via a second I2C address, a command stream and identify from the command stream, (i) calibration parameters (ii) a class selection parameter to select a cell or cell array 2255, 2257, 2259, 2271, 2273, (iii) at least one sub-class selection parameter to select cells 2214, 2216 of the selected array 2255, 2257, and (iv) a read request, whereby the sensor circuit 2203 is configured to, in response to the read request, load a count value into the read buffer 2222, based on the state of the selected cell and using the calibration parameters.

The sensor circuit 2203 may be configured to decrease a count value in response to the pneumatic event, using certain operational calibration parameters. In response to receiving operational calibration parameters (e.g., 1710), a class selection (e.g., 1720) for the sensor 2255 to detect the pneumatic stimulus, a sub-class selection (e.g., 1730) for a cell of the array, and a read request (e.g., 1740), during or just after a pneumatic stimulus, the logic circuit outputs a count value that is lower than a count value that is output when that same command sequence (e.g., 1710-1740) is communicated when no pneumatic stimulus is (or has recently been) applied.

The sensor circuit 2203 may be configured to, in response to receiving a class selection parameter associated with a print material level, and each time receiving the same series of sub-class selections, output increasingly more second, "higher" count values and decreasingly less first, "lower" count values as a result of a declining print material level over the lifetime of the replaceable print apparatus component, in correspondence with FIGS. 18 and 18A. In this example the sensor assembly 2200 extends approximately up to a middle of the height of the reservoir 2212A so that a good amount of depletion occurs before any higher count values are returned.

As can be seen from FIG. 22, the sensor assembly 2200 may extend along a height of the reservoir 2212A. In this example an at least partially filled replaceable component including a logic circuitry package 2201 may be configured to start returning second, higher count values not before the component is already approximately half-depleted, say where less than approximately 50% of the reservoir volume is occupied by liquid, because it may be towards the end of life of the component when the liquid starts uncovering the print material sensor array 2257. The start of these second count values may depend on the height of the sensor array 2257 versus the height of the reservoir 2212A.

Per FIG. 24, the logic circuitry package 2201 may include a memory 2261 storing a version ID 2237 associated with the sensor circuit 2203, a R/W history 2265 based on previous and/or last reads/writes to the sensor circuit 2203, and a cell count 2263 related to a last cell or a number of cells of one or more cell classes, amongst others.

In one example, data 2207-3 indicative of a print material fill amount may be stored on another memory field of the package 2201, for example, in a field that can be updated by a print apparatus logic circuit via the first memory address. This data field 2207-3 may be updated based on a drop count and/or page count as determined by the print apparatus logic circuit, for example before and/or after each print job. This field 2207-3 may correspond to the earlier mentioned "status"-fields (e.g. 1427 or 1527 of FIG. 14 or 15). In one example a print apparatus first establishes a print material level based on the print material fill amount field 2207-3, as updated by the print apparatus, and starts reading the print material level sensor 2257 only after it assumes that sufficient depletion has occurred, for example at a predetermined print material level in the field 2207-3, at which level it is expected that the print material level sensor 2257 may start to be uncovered, whereby the print material level field 2207-3 may be corrected once the sensor circuit 2203 starts returning said second, higher count values based on the print material level sensor readings because the sensor readings may be assumed to be more accurate than drop or page count.

The logic circuitry package 2201 may extend at least partly inside the reservoir 2212A whereby at least an interface 2223 to the print apparatus logic circuit may extend outside of the reservoir to connect to the print apparatus serial bus, as can be seen from FIGS. 22 and 23. In certain examples also a first logic circuit such as a microprocessor or microcontroller may be mounted to the exterior. In any event, routings 2224 extend between the exterior interface 2223, and (part of) the sensor circuit 2203 that extends in the interior of the reservoir 2212. In one example, the routings 2224 may extend adjacent a top and front 2251 of the reservoir 2212A of the replaceable print component 2212, for example in a cut-out where the interface 2223 extends, adjacent the interface. The connecting routing 2224 may extend against the inner side wall to which also the interface 2223 is mounted. Said routing 2224 may extend between edges of opposite shells 2225, 2225A of the component 2212 that define the reservoir's liquid volume.

Seals or other measures may be provided to inhibit leakage of print liquid at the points where the routing extends through the wall, for example, along opposite edges of opposite shells that define the liquid volume. Accordingly, in certain instances, there may be an increased risk of leakage as compared to having no circuitry extending through the wall, in particular during time lapses of increased pressure such as during prime events. The first sensor 2255 may facilitate detecting a potential leakage of the print cartridge 2212, because such leakage could result in a gauge pressure in the reservoir that is lower than a certain threshold during a prime operation, which can be detected. Correspondingly, a sensor circuit 2203 could return a higher count value than expected during (or just after) a prime or hyperinflation event, which, for example could be associated with leakage. As an illustrative example, a gauge pressure of a leaking reservoir 2212A may be below 14 kPA at a certain point in time during or just after an external pneumatic pressure event where normally it should reach a peak above the 23 kPA.

Figure 25:
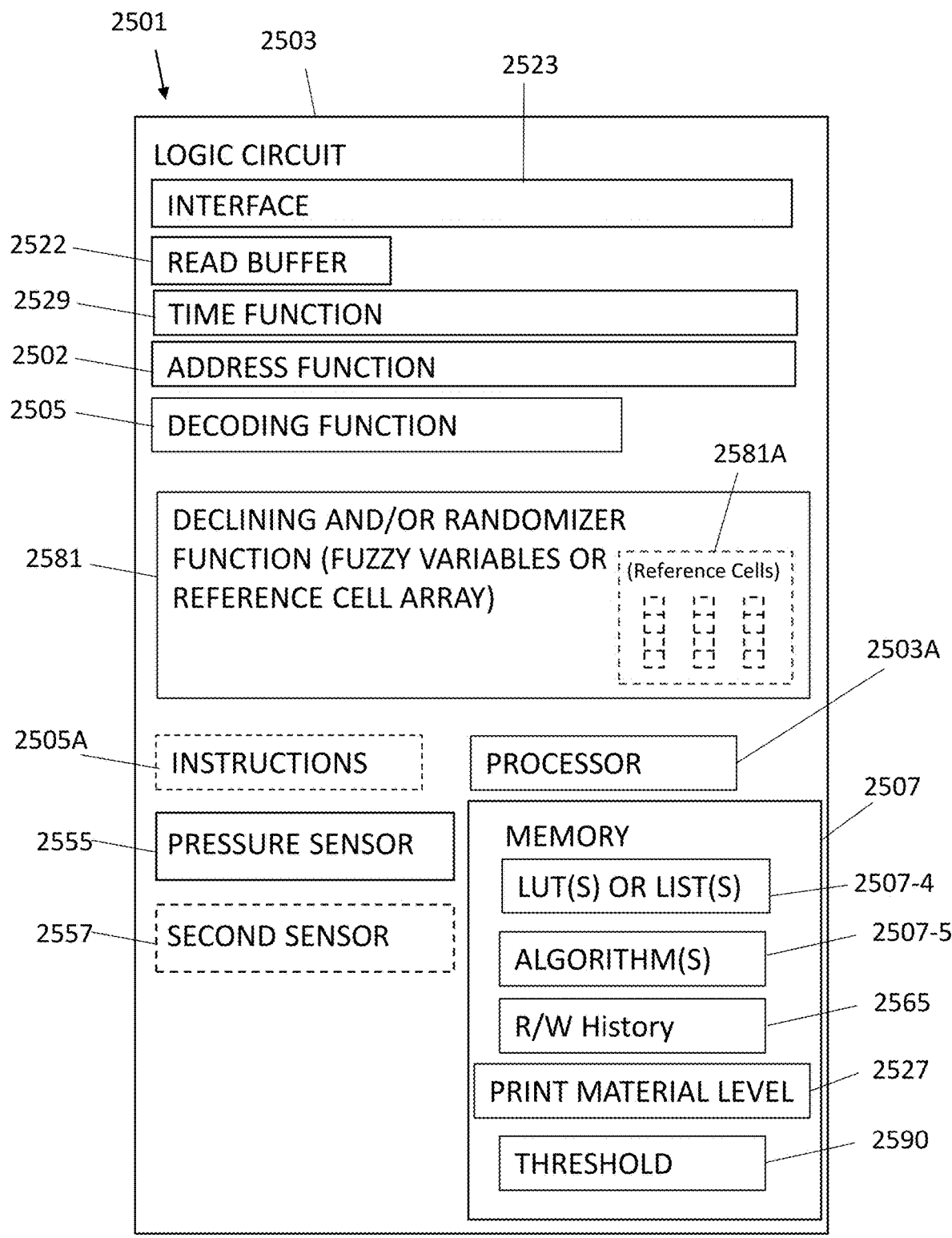
FIG. 25 shows yet another example of a logic circuitry package.
Figure 26:
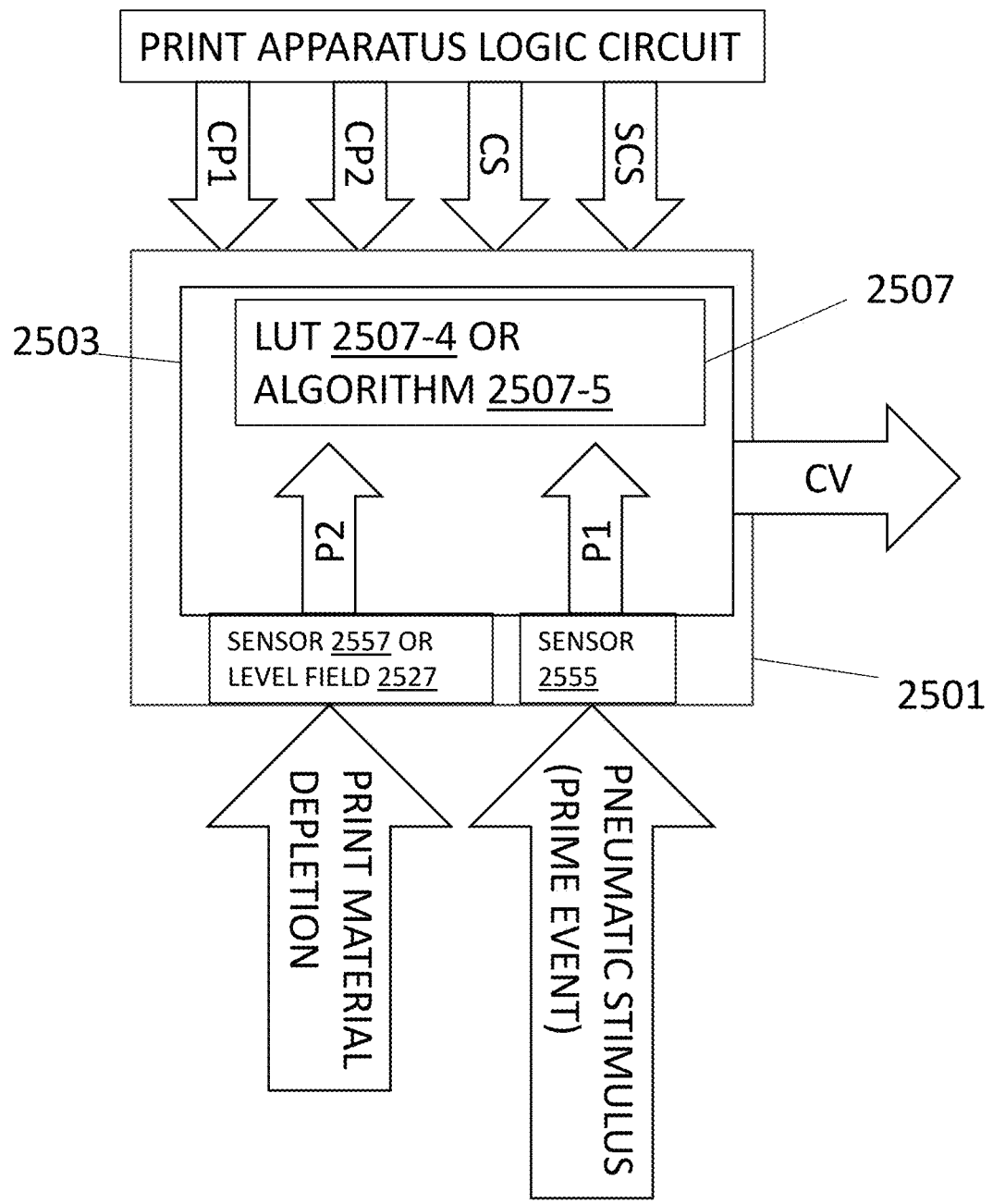
FIG. 26 shows example aspects of the logic circuitry package of FIG. 25.

FIGS. 25 and 26 illustrate alternative embodiments of a logic circuitry package 2501 and logic circuit 2503, with aspects similar to package 1501 of FIG. 15. The logic circuit 2503 may comprise or be part of integrated circuitry such as an application specific integrated circuit, processing circuitry, a microprocessor or microcontroller, etc. The logic circuit may include a single integrated logic circuit or multiple interconnected logic circuits adapted to apply logic functions based on received parameters, to provide a certain output to be validated by a print apparatus logic circuit, wherein the output is not necessarily the result of a measured analogue sensor or cell state, nor is it necessarily related to an actual print liquid level or reservoir pressure. As explained with reference to FIG. 15, the alternative embodiment may provide for a relatively cheap or simply alternative solution, for different purposes, that is suitable to output responses that are validated by the print apparatus logic circuit.

The logic circuit 2503 of FIG. 25 could be devised to include a single integrated circuit that executes certain functions (at least partially) virtually. For example, the logic circuit 2503 may not be equipped with, or connected to, physical sensors. In one example, the logic circuit 2503 only includes a first sensor 2555 to detect effects of a pneumatic stimulus and/or to detect a pressurization. In other examples, different sensors having different functions are provided. The logic circuit 2503 may include integrated circuitry and connections to such sensors. The logic circuit 2503 may include wired or wireless connections to sensors or between different elements of integrated circuitry.

The logic circuit 2503 may include sets of instructions 2505A and a processor 2503A to execute the instructions. The decoding function 2505, address function 2505-1, and/or time function 2529 may be embodied by a set of instructions 2505A, for execution by the processor 2503A. In certain "hybrid" examples of the logic circuit 2503, some of these functions may comprise dedicated hardware logic. In again other examples, logic circuits may be devised that have both (i) virtual or digital functions, as discussed with reference to FIG. 15, 25 or 26, and (ii) hardwired logic corresponding to other examples of this disclosure.

A logic circuit 2503 that replaces certain hardwired logic functions with virtual logic functions may be relatively cost efficient as compared to, for example, logic circuitry packages (e.g., 1302 of FIG. 13A, 400d of FIG. 4E, or 2201 FIGS. 22 and 24) that include secure microcontrollers as first logic circuits and, as second logic circuits, thin film packages with a plurality of sensor cell arrays. For example, the logic circuit 2503 of FIG. 25 or 26 may provide for a back-up solution in case of field failures of those more expensive circuitries including thin film sensor assemblies. Another example logic circuit 2503 of FIG. 25 is relatively easy to manufacture. Another example logic circuit 2503 of FIG. 25 may be used with service cartridges that supply service liquids, to service print liquid channels of a print apparatus. Another example logic circuit 2503 of FIG. 25 may provide for an alternative logic circuit as compared to logic circuitries including thin film sensor assemblies.

The logic circuit 2503 includes an interface 2523 to communicate with the print apparatus logic circuit, for example over a serial bus as explained earlier. The interface 2523 may include four contacts to establish digital I2C communications. The logic circuit 2503 may include a read buffer 2522 to output read values for transmission through the serial bus.

The logic circuit 2503 may load a count value into the read buffer 2522 in response to each read request. The read buffer 2522 may be configured to output count values in the output count value range (e.g., a natural number of bytes such as 1 byte. 1 byte corresponds to 0-255.).

The logic circuit 2503 may be configured to receive communications from the print apparatus logic circuit directed to a default first I2C address, at least after a first power up. The default first I2C address is the address that may distinguish the replaceable print component from other components installed in the same print apparatus.

A communication address setting function, or in short, address function 2502, of the logic circuit 2503 may be configured to process an enable command specifying a time parameter (i.e., time period), directed to the first, default I2C communications address of the logic circuitry package, and in response to the command, enable the processing of communications directed to a different I2C communications address for a duration based on the time parameter. For example, the different I2C communications address is different than the first address, and different than any of the other first addresses of the other components connected to the serial bus. For example, the different address is the second I2C address, and later, the reconfigured/new address as provided by the print apparatus logic circuit.

The address function 2502 of the logic circuit 2503 is configured to identify the enable command specifying the time parameter. The address function 2502 provides that the logic circuit 2503 responds to, or acts upon, subsequent commands directed to a second default address in response to the enable command. "Acting upon" may include the logic circuit 2503 enabling, running, setting, selecting, storing, etc., in response to commands directed to the second address, and in certain instances, responding directly to the print apparatus logic circuit.

The default second address may the same for multiple logic circuits 2501 associated with different print material types connected or connectable to the same print apparatus serial bus. The address function 2502 is configured to identify a new address specified in a subsequent command directed to the second default address and to configure the new address as the I2C communication address for the rest of the duration. The address function 2502 may be programmed to reconfigure the second address as often as it is instructed to. In one example, the address function 2502 is programmed to again respond to communications over the first address once the duration has expired. The mentioned default first address and the default second address may be, at each session, the same while the new second address may be, at each session, different. In one example, the address logic 2502 is configured to respond to communications to the first address and not to communications to the second and/or new address outside of said durations, and to communications to the second and/or new address and not to communications to the first address during the duration.

The logic circuit 2503 may include a time function 2529 such as a time or delay function that may be ran to determine the expiry of said time period. In one example the time period encoded in an enable command, or an associated duration, is used as a parameter for determining the end of the time period using the time function. In one example, the time function 2529 includes and/or uses a timer or delay circuit as explained above with reference to FIG. 16. The time function 2529 may be configured to monitor the time or delay circuit to determine the end of the duration, whereby upon determining the end of the duration the address function 2502 again sets the logic circuit 2503 to respond to communications to the first address. In another example a settable delay circuit is, after each enable command specifying the time parameter, set to expire at the end of the duration, whereby upon expiry the address function 2502 switches back to using the first address. In some instances, the timer or delay function 2529 may be integrated with, or considered part of, the address function 2502 to set communication addresses.

The logic circuit 2503 includes a memory 2507. The memory 2507 may include data to relate parameters to outputs, for example at least one LUT 2507-4 and/or algorithm 2507-5 that relate sets of parameters (e.g. class/sub-class/calibration etc.) to output count values, either directly or indirectly. While certain example logic circuits 2503 corresponding to FIG. 25 may not have four or more physical sensor cell arrays or sensor cells of certain other examples of this disclosure, the logic circuit 2503 may still distinguish class and sub-class and other parameters to be able to condition the output in correspondence with what the print apparatus logic circuit can validate. For example, a first class may be associated with different output count values depending on the presence or absence of a pneumatic event. For example, different classes may be associated with certain different operational calibration parameters. For example, certain classes may be associated with smoothly varying output count values, smoothly varying in a certain way, again depending on the calibration parameters or certain characteristics of that class. For example, a second class may be associated with first relatively low count values for certain sub-classes, and after some depletion of the print material has occurred, second relatively high count values with a minimum difference, for example of at least 10 counts, between these first and second count values. In accordance with these and other examples, identifying classes and sub-classes, similar to cell classes and cells, respectively, facilitates outputting a count value, for example using said data (LUT 2507-4, algorithm 2507-5) to relate these sets of parameters to certain outputs that the print apparatus logic circuit may validate Similar to earlier examples, the logic circuit 2503 may be configured to identify and generate output count values based on at least four or at least five classes and at least 20, 30, 40, 50, 80, 100, 120, for example at least 126 sub-classes, for some of the classes.

In this disclosure, a LUT 2507-4 includes one or more lists or tables to relate input parameters to outputs. In this disclosure, a look-up list is also considered to be encompassed by a LUT 2507-4. In one example, a LUT 2507-4 includes output count values. In another example, a LUT 2507-4 includes intermediate values to be used for relating parameters to output count values, for example after applying a further algorithm 2507-5, decoding function 2505 or randomizer function. For example, since there may be a limited amount of output count values (e.g. 256) and many more combinations of input parameters, a references or addresses related to output count values may be stored in the LUT, associated with combinations of parameters. Similarly input parameter values may be represented directly or indirectly (e.g. after a further conversion or calculation) in the LUT 2507-4. In other examples algorithms 2507-5 may be used to relate sets of input parameters to output count values. The LUTs 2507-4 and/or algorithm 2507-5 may be encoded in the memory 2507 in any way, for example, scrambled, encrypted, etc. The decoding function 2505 may be configured to identify the parameters and, relate these parameters to certain values in the LUT 2507-4 and/or algorithm 2507-5 to determine the output count value.

For example, a LUT may be generated during manufacture based on test cycles of a logic circuitry package of some of the other examples of this disclosure (e.g., 1302 of FIG. 13A, 400d of FIG. 4E, or 2201 FIGS. 22 and 24), whereby many or all combinations of input parameters may be related to output count values that the print apparatus validates.

The LUTs or lists 2507-4 may also relate time parameters to certain durations for responding to communications to the first versus the second or new address. In another example, algorithms 2507-5 may be used to relate time parameters to certain durations for responding to communications to the first versus the second or new address. In one example multiple adjacent time parameters could be related to a single duration for switching address. In another example, the LUT 2507-4 and/or algorithm 2507-5 can relate one duration to a plurality of time periods. In certain examples, there is a direct correlation between time periods and associated durations.

In one example, a decoding logic function 2505 is configured to identify, from a command stream, time parameters, address parameters, calibration parameters, class selection parameters, sub-class selection parameters and/or other parameters, to determine a corresponding output count value based on each of these parameters, for example using the LUT 2507-4 or parameters 2507-5.

The logic circuit 2503 is configured to render the lowest or highest output count value for certain calibration parameters; and output an "in-range" count value between and/or at distance (e.g. at least one count) from the lowest and highest output count value for certain other, operational, calibration parameters. In this disclosure, in-range count values are count values in a range of count values having at least one count distance from the lowest and/or highest count values of the range. The LUT 2507-4 and/or algorithm 2507-5 may be configured to associate different calibration parameters with a different output values for the same other parameters, to the extent that the output count values are in-range. The LUT 2507-4 and/or algorithm 2507-5 may be configured to associate different sub-class parameters with a different output values for the same other parameters, to the extent that the output count values are in-range. As explained already, it may be that for certain low amplifier parameter values in-range count values may be output for both the first and second class based on the same operational parameters including the low amplifier parameter, but generally, first operational parameters may apply to a first class and different, second operational parameters to a second class. The decoding function 2505 may be configured to identify, from different received commands, different calibration parameter functions, and for each of these calibration parameter functions, corresponding calibration parameter values. The logic circuit 2503 may condition the output based on the calibration parameter values in a way that is different for each corresponding calibration parameter function. For example, a (change in an) offset parameter value may have different effect on the output than a similar (change in an) amplifier parameter value. The decoding logic function 2505 may be configured to identify an offset and an amplifier parameter, whereby the logic circuit 2503 may be configured to change the output based on the offset parameter by an amount that is a function of the amplifier parameter. Again, in any of these examples, the output may be based on a stored LUT and/or algorithm, while in certain hybrid examples physical reference cells could be used to help generate the output. Similarly, the decoding function 2505 may identify (sub-)class parameter functions and (sub-)class parameter values, and the logic circuit 2503 may condition the output accordingly.

The LUT 2507-4 and/or algorithm 2507-5 may be configured so that, for a range of changing not-operational calibration parameters associated with the same class and sub-class, the associated output values remain the highest or lowest output value, that is, without changing, because these different not-operational calibration parameters are not associated with in-range values. At the same time, the logic circuit 2503 may be configured to, in a series of command-responses, vary in-range count values for different sub-class parameters (i.e. different sub-class parameter values), wherein other parameters including certain operational calibration parameters and a class parameter were last communicated before that series of command-responses. The varying in-range count values may approximately correspond to the different count values for different cells of FIGS. 18 and 19 where the variation is related to noise such as inherent strains or parasitic resistance. In another example, the logic circuit 2503 is configured to output the same in-range count values in response to certain class parameters and operational calibration parameters, e.g. along a straight horizontal line in FIG. 18 or 19, within the respective sub-range (e.g. 1890-4, 1890-2 or 1990-4), or having regular variations such as along a straight sloped line without noise or random deviations, also within the sub-range. In one example the circuit may be adapted to output varying count values for the first class and the same count value for different sub-classes for the same second class.

The decoding function 2505 and/or LUT 2507-4 may be configured to associate certain classes with a plurality of sub-classes, analogous to a first sensor 2255 and second sensor 2257 of FIG. 24. The decoding function 2505 and/or LUT 2507-4 may be configured to associate certain classes with a single sub-class or with no sub-class, analogous to single cell classes 2271, 2273 of FIG. 24.

The logic circuit 2503 may include a field or data portion 2565 storing a read/write history associated with read or write actions associated with said second or new address. The logic circuit 2503 may be configured to update the R/W history after subsequent writes and/or commands that specify the second and/or new address and a parameter (e.g., per the first field of FIG. 16A). The logic circuit 2503 may be configured to encode the R/W history in a way that is different than how the function and/or value of the respective command is encoded. The logic circuit 2503 may be configured to update the history data field 2565 after each respective read/write session, using an algorithmic function that may be partly based on the contents of the read/write session and/or other variables, which algorithmic function may be some form of bit scrambling, as explained with reference to the second validation above. Hence, upon detecting a command to return the R/W history value, the logic circuit 2503 may load the R/W history value in the read buffer 2522, whereby the data is differently encoded than the output count values associated with the other commands/parameters.

In other examples, the logic circuit 2503 comprises a first sensor 2555 and/or a second sensor 2557. The first sensor 2555 may be suitable to detect a pneumatic stimulus (e.g., in use, located near an air input of the component) and may be any of the first sensors mentioned in this disclosure, for example as described with reference to FIG. 21. The first and/or second sensor may be a single cell sensor or a sensor cell array of multiple cells. In this example, a signal from the first or second sensor 2555, 2557 may be another parameter as input for determining an output count value, for example using the LUT 2505-4 or algorithm 2505-5. For example, the first or second sensor 2555, 2557 may be consulted upon identifying a corresponding first or second class parameter. When a class parameter selects a second class, a print material level sensor 2557 and/or a data field 2527 may be consulted, and when a class parameter selects a first class, the first sensor 2555 may be consulted.

In one example, the memory 2507 includes a print material level field 2527. The print apparatus updates that field 2527 as a function of printed pages or drops while extracting print material from the print component. The data of field 2527 can be associated with print material level data. The logic circuit 2503 may, upon identifying a corresponding (hereafter: second) class, determine output count values based on the print material level field 2527. The logic circuit 2503 may be configured to start returning second, higher count values for (e.g., initial) sub-classes of the second class after determining that the level in the field 2527 has passed a certain threshold 2590. In another example, the logic circuit 2503 may return only relatively low, first count values until the field 2527 reaches said threshold 2590 whereby the logic circuit 2503 may not include the second sensor 2527. When the logic circuit 2503 does not generate second count values at a point or threshold 2590 where the print apparatus would expect so, the print apparatus may not be able to validate the logic circuit responses after such point. Hence, the print apparatus component may require replacement at or before such point, whereby in certain examples the depleted print material may still be substantial (for example half a volume of a certain reference extra-large cartridge volume, as represented by a product ID in the memory 2507) so that the component has a useful life.

In certain examples, the second sensor 2557 for detecting a change of print material level can be an analogue electrode or optical sensor or the like, adapted to determine a print material level change, whereby the detected level can be used as input parameter P2 for the LUT 2507-4 and/or algorithm 2507-5 (also see FIG. 26). In a further example the second sensor 2557 is a carriage movement sensor (e.g. accelerometer) to sense carriage movements, on the basis of which certain print material level data may be estimated, so that a number of carriage movements may serve as input parameter for the LUT 2507-4 and/or algorithm 2507-5, since the number of carriage movements may be correlated with a number of printed pages, and hence a print material level. In one example, the logic circuit 2503 may start using signals of the second sensor 2557 only when the value in the field 2527 has passed a certain threshold 2590.

In one example, the logic circuit 2503 is adapted to, during exhaustion of print material in a print apparatus component (which exhaustion in one example may be determined by monitoring updates of the print material level field 2527), in response to identical sub-class selection parameters associated with the second class, received at different points in time, output first lower count values (e.g., points on line 1894 of FIG. 18) and later higher count values (e.g., points on line 1893 of FIG. 18), wherein the higher count values of the higher line 1893 may be output after determining that a certain amount of depletion has occurred, for example on the basis of the field 2527 and the threshold 2590. For example, some of the higher count values 1893 may be output when the logic circuit 2503 determines that the status field 2527 passes the threshold 2590.

The logic circuit 2503 may include the first sensor 2555 to detect the effect of a pneumatic stimulus, such as a prime or hyperinflation event, as explained in various earlier examples. The sensor 2555 may detect when air is blown to the replaceable component. In certain examples the sensor may be applied in or near the air input, or in or near a print liquid output. In other examples, the sensor 2555 may be mounted on the exterior of the component to detect a wall deflection. In again other examples the sensor 2555 may be connected to a pressure structure to detect the pneumatic event through component pressurization. Different examples of suitable first sensors 2555 are explained throughout this disclosure, for example with reference to FIG. 21, and may include any pressure sensor; a strain gauge; a strain gauge supported by a wall of the reservoir; a strain gauge supported by a reservoir; a metal slug (e.g., with return spring) inside of an inductor; a manometer, for example using a conductive liquid and electrical contacts that are wetted when air pressure is applied, for example located at the air interface; a manometer with (e.g., optical) sensors to measure the location of the air to liquid interface; an accelerometer; a diaphragm or slug connected to a reed (or other) switch which can detect displacement of the diaphragm; a mechanically actuated switch actuated by air displacement, or another suitable sensing cell. The first sensor 2555 may be adapted to generate a signal associated with a presence or absence of a pneumatic stimulus, and/or a pressure condition of the reservoir.

Certain example print apparatus components may work in the print apparatus without an air input through-port or pressure structure, that is, these example components may function without the external pressurization induced by a print apparatus air output pen. For example, these components may be provided with a clearance to clear a print apparatus air pen. The first sensor 2555 may be provided near or at the clearance, or be alternatively connected to the clearance, to sense air being blown towards the replaceable print apparatus component by the print apparatus through the print apparatus air pen.

The logic circuit 2503 may be connected to the first sensor 2555 and may be configured to, upon receiving and identifying a parameter selecting a first class, consult the sensor 2555. The sensor signal may facilitate determining a presence or absence of the pneumatic stimulus and/or determine a certain pressure condition of the reservoir, which may in turn serve as another parameter to generate the output. The logic circuit 2503 may be configured to, upon selecting the first class and receiving a subsequent sub-class selection (and read request), output a relatively low count value when the sensor 2555 generates a signal associated with the pneumatic event, and, upon receiving the same sub-class selection, at an earlier or later point in time, output a relatively high count value when the sensor 2555 does not generate the signal associated with the pneumatic event or when it generates a different signal, associated with the absence of a pneumatic event.

For example, the logic circuit 2503 may select an output count value using the LUT 2507-4 and/or algorithm 2507-5 based on the detected presence or absence of the pneumatic stimulus, whereby the presence or absence may function as another parameter P2 for determining the output count value. FIG. 26 illustrates how one example of the logic circuitry package 2501 may include the first sensor 2555 and/or second sensor 2557 and use their output as parameters P1, P2, associated with pneumatic effects and/or print material depletion, respectively, as input, alongside other input parameters sent digitally by the print apparatus such as calibration parameters CP1, CP2, class selection parameters CS and/or sub-class selection parameters SCS, to generate the output value CV. In one example, the logic circuit 2503 has only a first sensor 2555. Different sets of all the parameters P1, CP1, CP2, CS, SCS or P2, CP1, CP2, CS, SCS are related to the different count values CV as already explained above. The output count values CV may be generated using the LUT 2507-4 and/or algorithm 2507-5 whereby said parameters P1, P2, CP1, CP2, CS, SCS may be used as input.

Back to FIG. 25, in a further "hybrid: example the logic circuit 2503 may include certain reference or "dummy" cells and/or cell arrays 2581A, for example to load data or signals of the print apparatus command stream and/or to provide for certain analogue characteristics of cells that the print apparatus may validate, such as parasitic resistance, noise or certain other not-nominal characteristics. The reference cells may be used to determine variations between cells. In addition, or alternatively, the logic circuit 2503 may include a randomizer function, for example to apply fuzzy random variables. Both the reference cells and/or the randomizer function are indicated by a circuit block 2581. These functions 2581 may modify output count values so as to mimic certain analogue characteristics.

Furthermore, reference or dummy cells, indicated in block 2581, may be used just to load the input bitstream or to facilitate testing by the print apparatus logic circuit. The reference or dummy cells may include different resistors of different nominal characteristics, at least one diode, or other cells. Reference or dummy cells may be provided in the same amount of classes and/or subclasses as the examples discussed elsewhere in this disclosure (e.g., with reference to FIG. 16, 17, 24). In other examples, the decoding function 2505 may include memory arrays such as shift registers similar to earlier explained decoding logic (e.g., 1605 of FIG. 16 or 2205 of FIG. 22), hereby the LUTs 2507-4 and/or algorithm 2507-5 may still be used to determine the output count value in a virtual fashion.

In the foregoing description, reference may have been made to lower and higher count values, or relatively low and relatively high count values. It should be understood that in such cases these count values are to be interpreted relative to each other, that is, that the higher or relatively high count values are higher than the lower or relatively low count values. Where high or low count values are mentioned separately, without an opposite low or high count value, respectively, these should be understood as having a certain distance, for example at least fifty counts or at least 20%, from an opposite lowest or highest count value, respectively, of the range.

In one example the logic circuitry package mainly includes hardwired routings, connections and interfaces between different components. In another example the logic circuitry package may also include at least one wireless connection, wireless communication path, or wireless interface, for internal and/or external signalling, whereby a wirelessly connected element may be considered as included in the logic circuitry package and/or replaceable component. For example, certain sensors may be wireless connected to communicate wirelessly to the logic circuit/sensor circuit. For example, sensors such as pressure sensors and/or print material level sensors may communicate wirelessly with other portions of the logic circuit. These elements, that communicate wirelessly with the rest of the logic circuit, may be considered part of the logic circuit or logic circuitry package. Also, the external interface of the logic circuitry package, to communicate with the print apparatus logic circuit, may include a wireless interface. Also, while reference may be made to power routings, power interfaces, or charging or powering certain cells, certain examples of this disclosure may include a power source such as a battery or a power harvesting source that may harvest power from data or clock signals.

It may be understood by a skilled person that in the foregoing description sometimes different denominations may be used for similar features. For example, certain class and sub-class selections may also have been referred to as class and sub-class parameters or class and sub-class selection parameters. For example, identifying a second class may refer to first, identifying the class parameter, and second, identifying that the parameter value refers to a second class, so that the logic circuit can generate output count values using the second class. For example, a command and a transaction may be the same. For example, a time period may also have been referred to as a time parameter. Also, in various examples a second (I2C) communication address encompasses both an initial or default second address and a different/new/temporary/re-configured second address, the latter sometimes simply referred to as different/new/temporary/re-configured address. If reference is made only to the second address without further context and without specifying that it is an initial/default or different/new/temporary/re-configured address, then the second address may be interpreted as encompassing both the default and different/new/temporary/re-configured address.

In several examples it is explained that the parameters upon which the logic circuit is to base its response may include a function and a value. It should be understood that the parameter function may identify the type of parameter. Other functions described in this disclosure include logic functions such as a calibration function, a class selection function, a sub-class selection function, a time function, a communication address setting function, etc. These logic functions may be embodied by one or a combination of dedicated hardware logic and a stored set of instructions, stored on a computer readable medium, to be executed by at least one processor. A parameter function may be configured to select a corresponding logic function.

As explained, in certain examples, the sensor 1955, 2155, 2255, 2555 (as addressed in FIGS. 19, 21, 24 and 25) can be used to detect a pressure gauge, a pressure change, a reservoir wall strain and/or a reservoir wall deflection. In further examples the sensor 1955, 2255, 2555 is adapted to detect these events for a collapsible, partly flexible reservoir such as a print liquid bag in a (e.g., replaceable) bag-in-box print liquid container. As the skilled person understands, these types of reservoirs may function without an air interface because they are configured to collapse as liquid is extracted out through the liquid output. Typically, these types of collapsible liquid reservoirs are associated with "off-axis" and/or relatively large format and/or relatively high consumption rate printers. Liquid may be extracted through external pressurization, for example using a pump in the print apparatus. In these examples the sensor need not be adapted to detect (the effect of) a pneumatic event. Rather, in these examples, sensors may be configured to detect a collapse or pressure or liquid outflow, which may be related liquid extraction and/or a remaining liquid level in the reservoir. For example, a measure of collapse of the print liquid reservoir can associated with the pressure and/or print liquid level. For example, at least one of a pressure, a relative pressure, and/or a pressure change can be sensed and associated with a print material level in the reservoir, for example especially near depletion and/or near full collapse. For these example components, the sensor could be configured to detect an effect of a pressurization by a difference in liquid outflow and/or a (relative) wall portion displacement or by other means. The sensor may be positioned against, or be in contact with, an interior of the reservoir wall, an exterior of the reservoir wall, and/or a liquid output. Because the pressure and/or wall displacement in these types of reservoirs can be related to liquid level, at least in an operational and/or installed condition, such sensor can be used to detect print liquid level. In fact, the same logic circuitry package or elements of the same logic circuitry package as explained in various examples of this disclosure can be associated with to such collapsible reservoir. In a further example, at least one strain gauge cell can be used to detect the collapse, similar to certain sensors described above. Also, other similar logic functions as explained above can be applied to these collapsible reservoirs, including the described decoding and calibration logic; use of different (sensor) cells and/or applying similar communication principles. For example, the logic circuitry package for such reservoir may include at least one strain gauge, absolute temperature sensor and crack sensor. Each different sensor can be provided with one or more cells.

Certain example circuits of this disclosure relate to outputs that vary in a certain way in response to certain commands, events and/or states. It is also explained that, unless calibrated in advance, responses to these same events and/or states may be "clipped", for example so that they cannot be characterized or are not relatable to these commands, events and/or states. For these example circuits where the output needs to be calibrated to obtain the characterizable or relatable output, it should be understood that also before required calibration (or installation) occurred these circuits are in fact already "configured" to provide for the characterizable output, that is, all means are present to provide for the characterizable output, even where calibration is yet to occur. It may be a matter of choice to calibrate a logic circuit during manufacture and/or during customer installation and/or during printing, but this does not take away that the same circuit is already "configured" to function in the calibrated state. For example, when sensors are mounted to a reservoir wall, certain strains in that wall over the lifetime of the component may vary and may be difficult to predict while at the same time these unpredictable strains affect the output of the logic circuit. Different other circumstances such as conductivity of the print material, different packaging, in-assembly-line-mounting, etc. may also influence how the logic circuit responds to commands/events/states so that a choice may be made to calibrate at or after a first customer installation. In any of these and other examples, it is advantageous to determine (operational) calibration parameters in-situ, after first customer installation and/or between print jobs, whereby, again, these should be considered as already adapted to function in a calibrated state. Certain alternative (at least partly) "virtual" embodiments discussed in this disclosure may operate with LUTs or algorithms, which may similarly generate, before calibration or installation, clipped values, and after calibration or installation, characterizable values whereby such alternative embodiment, should also be considered as already configured or adapted to provide for the characterizable output, even before calibration/installation.

In one example the logic circuitry package outputs count values in response to read request. In many examples the output of count values is discussed. In certain examples, each separate count value is output in response to each read request. In another example, a logic circuit is configured to output a series or plurality of count values in response to a single read request, for example, based on a series of pre-selected sub-classes or a complete cell array. In other examples, output may be generated without a read request.

Other examples of logic circuits of this disclosure output digital or analogue signals, that is, not necessarily count values. In an example of a logic circuit of this disclosure an analogue cell state is not converted to a digital count value output, but rather, output in an analogue fashion, or, digitized differently than count values. For example, analogue cell signals may be output whereby AD conversion is applied by the print apparatus logic circuit. In certain examples, the output is not communicated over an I2C communications interface but over another interface type, for example analogue or digital. In a further example, an analogue sensor assembly may be an intermediate product of a logic circuitry package that responds to and generates I2C communications.

In one example, the logic circuit includes an analogue sensor assembly of different cell arrays. Each cell of an array may return a signal according to (i) its analogue state and (ii) the applied calibration parameters. The analogue state of a cell may be determined by certain conditions such as, for example, print material level of a print material reservoir; absolute temperature; temperature changes; pneumatic events; pressure changes inside a print material reservoir and/or stress changes of a reservoir wall.

Certain example logic circuits may be provided with analogue or hybrid analogue/digital communication interfaces, adapted to output analogue signals, for example based on analogue cell states and the calibration parameters. Other example logic circuits are configured to generate analogue outputs directly through the print apparatus interface. Similar analogue output generating logic circuits may form intermediate logic circuitries such as the sensor assembly, corresponding to different embodiments explained in this description. Certain decoding and calibration functions explained in this disclosure may apply to both digital and analogue circuitries.

Each of the logic circuitry packages 400a-d, 806a-d, 900, 1401, 1501 described herein may have any feature of any other logic circuitry packages 400a-d, 806a-d, 900, 1401, 1501 described herein or of the processing circuitry 424. The processing circuitry 424 described herein may have any feature of the logic circuitry packages 400a-d, 806a-d, 900, 1401, 1501. Any logic circuitry packages 400a-d, 806a-d, 900, 1401, 1501 or the processing circuitry 424 may be configured to carry out at least one method block of the methods described herein. Any first logic circuit may have any attribute of any second logic circuit, and vice versa.

Examples in the present disclosure can be provided as methods, systems or machine-readable instructions, such as any combination of software, hardware, firmware or the like. Such machine readable instructions may be included on a machine readable storage medium (including but is not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g. a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

In accordance with this disclosure at least one replaceable print apparatus component, such as a print material container, cartridge or reservoir, logic circuitry package, logic circuit, integrated circuit or sensor circuit is provided, including any combination of any of the following features and aspects, whereby any feature or aspect may be omitted or included. From here on, the logic circuitry package, logic circuit, sensor circuit or integrated circuit will be referred to as circuit. In a first aspect, the circuit is for a replaceable print component, for example for mounting thereto. The circuit comprises an interface to communicate with a print apparatus, such as a logic circuit of the print apparatus. In one example, the circuit is configured to identify, from a command stream received from the print apparatus, parameters. The parameters may include a class parameter. In a further example, the circuit is configured to identify, from the command stream, a read request, and may be configured to output, via the interface, a count value in response to the read request, the count value based on identified received parameters.

In a second aspect, the circuit is configured to in response to an I2C power signal, act upon communications directed to a default first I2C communications address; and/or upon receiving a command including the first default I2C communications address and a time parameter, run a time function to determine the end of a duration based on the specified time parameter, and act upon commands directed to a default second I2C communications address; and/or upon receiving an address setting command specifying the second I2C communications address, an address function, and a new communications address, act upon commands sent to the new I2C communications address; and/or after the end of the duration, act upon communications directed to the default first I2C communications address.

In a third aspect, the circuit is configured to, upon receiving a first command specifying the new I2C communications address, a first calibration parameter function, and a calibration parameter value; and/or a second command specifying the new I2C communications address, a second calibration parameter function, and a calibration parameter value; and/or a third command specifying the new I2C communications address, a class parameter function, and a class parameter value; and/or a fourth command specifying the new I2C communications address, a sub-class parameter function, and a sub-class parameter value; and/or a read request; output one separate count value in response to each read request, whereby the magnitude of the count value depends on at least one of, or each of, the calibration parameter values, the class parameter value and the sub-class parameter value.

In a fourth aspect, the circuit comprises a first sensor to detect a pneumatic stimulus or pressurization applied by a print apparatus. For example, the circuit comprises an interface including contact pads to connect to a voltage and/or data source of the print apparatus logic circuit. In one example, the circuit is configured to output signals conditioned by the pneumatic stimulus or pressurization whereby the output is communicated via the contact pads.

In a fifth aspect, the circuit may be adapted for mounting to an at least partially collapsible print material reservoir. The circuit may comprise a communication interface to connect to a host print apparatus logic circuit, and a first sensor to detect a pressure, pressure change or displacement in the reservoir. The circuit may be configured to generate signals associated with a reservoir collapse via the communication interface, and condition the signals to correspond to a print material depletion.

In a sixth aspect, a replaceable print apparatus component may be provided a circuit in accordance with any of the mentioned aspects or features. The circuit may be configured to, in response to a series of commands including at least one of (i) a first command specifying the new I2C communications address and a first calibration parameter, (ii) a second command specifying the new I2C communications address and a second calibration parameter, (iii) a third command specifying the new I2C communications address and a class parameter, (iv) fourth commands specifying the new I2C communications address and sub-class parameters, and (v) at least one read request, generate one or more of (a) count values in a count value range defined by a highest and lowest count value, (b) the highest or lowest count value, in response to receiving a plurality of varying sub-class parameters preceded by a first class parameter and first non-operational calibration parameters or a second class parameter and second non-operational calibration parameters, (c) a first plurality of (e.g., varying) count values other than the highest or lowest count values in response to receiving the plurality of varying sub-class parameters preceded by the first class parameter and certain first operational parameters, and (d) a second plurality of (e.g., varying) count values other than the highest or lowest count values in response to receiving the plurality of varying sub-class parameters preceded by the second class parameter and certain second operational parameters, the second plurality of (e.g., varying) count values different than the first plurality of (e.g., varying) count values. In one example the circuit may be adapted to output varying count values associated with first class parameters and/or the same count value for different sub-classes associated with the same second class parameters.

Any of these aspects or combinations of any of these aspects may be combined with any of the following features or any combination of any of the following features, wherein each phrase represents a feature. The circuit may be configured to identify calibration parameters, condition output count values based on the calibration parameters, and output count values within a range, and having at least one count distance from ends of the range, for operational calibration parameters. The circuit may be configured to associate a first class parameter with a first class and a second class parameter with a second class, and at least some of the operational calibration parameters are different for different classes. The circuit may comprise at least three different cell classes each class including at least one cell, whereby cells of different classes have different nominal electrical characteristics, whereby the circuit is configured to select at least one cell of a certain class based on a last received class parameter, and convert an electrical analogue state of a selected cell to a corresponding output count value based on received parameters. The circuit may be configured to identify at least four different class parameters. The circuit may be configured to identify, from the command stream, a sub-class parameter, and output, in response to a read request, a count value based on the last-received class parameter and sub-class parameter. The circuit may be configured to identify more sub-class parameters than class-parameters. The circuit may be configured to associate at least two classes with at least 40, at least 100 sub-classes, or at least approximately 126 sub-classes, and other classes with not more than one sub-class.

The circuit may be configured to output a series of different count values in response to receiving a corresponding series of different sub-class parameters, following receiving a class parameter and certain operational calibration parameters for that class. The circuit may comprise different cell arrays wherein cells of a single array have approximately the same nominal characteristics. The circuit may be configured to base count values on electrical characteristics of selected cells, wherein the difference in count values are associated with, for at least one class, different positions of different cells along a print material reservoir wall, and/or, for at least one other class, increasing parasitic resistance along a length of the selected cell array. The circuit may be configured to identify a first or second class parameter associated with a first or second class, upon identifying the first or second class parameter, select a respective first or second class, identify a series of sub-class parameters and read requests while the respective first or second class is selected, and, in response to each read request, output a count value for each corresponding selected subclass, identify a third or fourth class parameter associated with a third or fourth class, and upon identifying the third or fourth class parameter and a subsequent read request, output a respective count value, wherein any sub-class parameter received between receiving the third or fourth class parameter and read request does not affect the output count value. The circuit may be configured to output one separate count value in response to each read request. Each parameter may be defined by a function and a value. The parameter function may be encoded in one data frame of a command and the parameter value in another data frame of the command. The circuit may comprise a plurality of logic functions to apply input parameters, and may be configured to select a logic function based on the identified parameter function and assign the identified parameter value to the selected logic function. The circuit may include decoding logic to identify parameters, the decoding logic comprising different memory fields having different addresses to store parameter values, which addresses are addressed by respective parameter functions, wherein each memory field address is associated with at least one corresponding logic function. The decoding logic may include multiplex logic to set or select the logic function based on the parameter value in the associated memory field. The circuit may be configured to identify class and sub-class parameter values in respective data frames based on a bit set including the least significant bit, while values of at least one other bit in the same data frame including the most significant bit do not affect the output count value or pertain to a different logic function. The circuit may be configured to identify a sub-class parameter value based on more bits, in the bit set including the least significant bit, than the class parameter value. The circuit may be configured to identify a class parameter value based on not more than the least significant and two following bits (2:0) in an eight bit data frame so that three bits including the least significant bit affect the output count value, while other bits in the data frame including the most significant bit do not affect the output count value. The circuit may be configured to identify a sub-class parameter value based on not more than the least significant and six following bits (6:0) in an eight bit data frame so that seven bits including the least significant bit affect the output count value, while the most significant bit in the data frame does not affect the output count value. The circuit may be configured to generate the count value using received parameters and based on at least one, or a combination, of a look-up table (LUT), an algorithm, and a physical sensor cell. The circuit may be configured to relate received parameters to an output count parameter using said at least one or combination of LUT, algorithm and physical sensor cell. The circuit may be configured to consult at least one sensor cell to detect a pneumatic stimulus upon identifying a first class parameter, and to relate the sensor signal as well as the other received parameters to an output count value to generate the related output count value. The circuit may be configured to consult at least one sensor cell upon identifying a second class parameter, and to relate the sensor signal as well as the other received parameters to an output count value to generate the related output count value. The circuit may be configured to consult the same sensor cell based on different sub-class parameters. The circuit may be configured to receive a command including a time period via a first address, and receive a new address via a default second address of the circuit, and, in response, respond to commands directed to the new address, at least until the end of a duration associated with the time period. The circuit may be configured to receive a command specifying a time parameter, the command directed to a first, default I2C communications address of the package which is to distinguish the component from other components installed in the same print apparatus in communications over a serial bus, and, in response to the command, enable the processing of communications directed to a second default and/or new I2C communications address for a duration based on the time parameter. The circuit may be configured to, in response to the command stream to the second address, for different parameters associated with different functions, apply the last received parameter for conditioning the output until it receives a new respective parameter, at least for the duration. Said command stream may be directed to the second and/or new I2C communications address, and the circuit may be configured to, after the duration, again, process commands directed to the first I2C communications address. The circuit may include a time function such as a timer and/or delay circuit to determine the duration. The circuit may be configured to output different count values in a range defined by a lowest and highest count values and a plurality of count values in between, wherein the lowest output count value of the range is a binary representation of 0 and the highest output count value is a binary representation of a maximum number of values that can be represented by a natural number of bytes, minus 1, for example 255 or 65535. The circuit may be configured to identify, from the command stream, a plurality of different calibration parameters associated with different calibration functions, and condition the count values based on these different calibration parameters. The circuit may be configured to identify parameters in a command stream, identify each parameter by a parameter function and a parameter value in a command, select a class and sub-class, and set calibration functions in accordance with respective different parameter functions and accompanying parameter values; and respond to each read request with an output count value based on the last identified functions and values. The circuit may be configured to identify an offset and an amplifier parameter, and change an output count value based on the offset parameter by an amount that is a function of the amplifier parameter. The circuit may be configured to, in response to identifying a first class parameter associated with a first class, and a series of different sub-class parameters, respond with in-range count values for first calibration parameters, and in response to identifying a second class parameter associated with a second class, and a series of different sub-class parameters, respond with in-range count values for second calibration parameters that include at least one different calibration parameter than the first calibration parameters. The at least one different calibration parameter may be at least one of the amplifier and offset parameter. The circuit may comprise cell arrays associated with different classes, each array including cells associated with different sub-classes. The circuit may comprise a sensor to detect an effect of a pneumatic stimulus, the circuit configured to consult the sensor in response to identifying a class parameter associated with a first class. The circuit may be configured to consult the sensor in response to identifying the class parameter associated with the first class, and, subsequently, a sub-class parameter and read request. The circuit may be configured to, in response to identifying said class parameters associated with the first class, output relatively low count values when the sensor detects the effect of an external pneumatic stimulus, and higher count values when no effect of the pneumatic stimulus is detected. The first sensor (of the first class) may be configured to detect a deformation of a reservoir wall and/or a pressure in a liquid reservoir. The first sensor may comprise a plurality of strain sensing cells. The circuit may be configured to identify a sub-class parameter in the command stream; and, in response to identifying a second class parameter associated with a second class, and a series of varying sub-class parameters, output first count values, associated with the sub-class parameters, and, after print liquid in a replaceable print component has been extracted, in response to the same parameters, output second count values, higher than the first count values, associated with the same sub-class parameters. The circuit may be configured to, for a certain print liquid level, in response to identifying the second class parameter associated with the second class, and a series of subsequent different sub-class parameters, for a partly depleted print liquid reservoir, output second count values, higher than a certain threshold, associated with a sub-set of the sub-class selections, and first count values, lower than said threshold, associated with the rest of the series sub-class selections. The circuit is configured to, for a certain print liquid level of a partly depleted print liquid reservoir, in response to identifying the second class parameters and series of subsequent different sub-class parameters, output second count values, associated with a sub-set of the sub-class selections, and first count values that are all at least a step change lower than the second count values, the first count values associated with the rest of the series sub-class selections, on another side of the step change in the outputs. The circuit may be configured to vary, for certain operational calibration parameters, the first count values of subsequent sub-classes less than five counts or less than two counts (wherein in another example the first count values are the same and do not vary), and the second count values of subsequent sub-classes less than five counts or less than two counts; and the step change between the first and second count values is at least 10 counts. The circuit may be configured to output at least one third count value in the step change, which third count value is between the first and second count values. The circuit may be configured to in response to receiving and identifying, at different points in time associated with different depletion levels of an associated print material reservoir, a second class parameter, certain operational calibration parameters for that class, and a series of sub-class parameters and respective read requests, output at a first point in time associated with a first print material level, relatively low count values associated with all sub-class parameters of the series, at a second point in time associated with a second print material level that is less than the first print material level, relatively high count values associated with a sub-set of the series of sub-class parameters and relatively low count values associated with remaining sub-class parameters of the series, and, at a third point in time associated with a third print material level that is less than the second print material level, relatively high count values associated with all sub-class parameters of the series. The difference between relatively high and relatively low count values may be at least 10 counts. The circuit may be configured to, in response to identifying the second class parameters, consult at least one of a sensor to determine print liquid level, and a field updated by the print apparatus that the print apparatus associates with print liquid level, in order to output the count value. The circuit may comprise different classes of sensors and multiple sensor cells associated with at least one sensor class, and may be configured to, in response to identifying a second class parameter, select the second sensor class, in response to subsequently identifying a series of sub-class parameters, select the corresponding cells of the second sensor class. The circuit may be configured to transmit data indicative of a print material fill amount in response to a request sent to a first address of the circuit, and, a second address of the circuit; so that these data transmissions correspond. The circuit may be configured to associate one of a plurality of classes with a single resistor that is part of the circuit. The resistor may be part of thin film circuitry including a sensor assembly of which the resistor is part, and configured to detect cracks in the thin film circuitry. The circuit may be configured to associate one of the plurality of classes with a single diode that is part of the circuit. The diode may be configured to detect an absolute temperature characteristic of the circuit. The circuit may be configured to, in a series of command-responses, vary in-range count values for different sub-class parameter values, wherein other parameters including certain operational calibration parameters and a class parameter were last communicated before the series of command-responses with no changes in between. The circuit may comprise at least two or at least three different cell classes, wherein cells associated with different classes have different nominal electrical characteristics, and cells associated with the same class have the same nominal electrical characteristics. The circuit may comprise a plurality of cell arrays of different cell classes and single cells of again different cell classes, as well as calibration and decoding logic. The cells and/or logic functions may be part of thin film circuitry. The circuit is part of thin film circuitry that has a length:width aspect ratio equal to or above approximately 20:1, and, has a length of at least approximately 10 mm. The circuit may comprise two cell arrays of nominally different cells, addressable by the same class and sub-class parameters. The two cell arrays may be a heater array and a temperature sensor cell array wherein the circuit may be configured to select heaters and sensor cells in pairs, and/or individually. The circuit may comprise a plurality of calibration logic functions. The circuit may be configured to identify, from the parameters, different calibration parameters having different parameter functions, to set the different calibration logic functions in accordance with the corresponding calibration parameter values. The different calibration logic functions may comprise at least one, and/or any combination of at least two of, a gain amplifier, an offset circuit, an analogue-to-digital converter and a digital-to-analogue converter. The calibration logic functions may comprise a calibration cell array to stimulate a sensor cell array. The circuit may be configured to address the calibration cell array by the same class and sub-class parameters as the sensor cell array. The calibration cell array may comprise a heat resistor array. The calibration logic functions may include at least one of a heat time and heat power function. The circuit may comprise a memory storing at least one operational calibration parameter associated with at least one corresponding class, wherein the circuit may be configured to, upon receiving the operational calibration parameter and corresponding class parameter from the print apparatus logic circuit, respond with an in-range count value. The circuit may be configured to identify said parameters directed to a second communication address and wherein the at least one stored operational calibration parameter is provided to the print apparatus logic circuit in response to a separate read request directed to a first communication address of the circuit. The operational calibration parameter may be stored in the memory as part of digitally signed data. The circuit may be configured to identify sub-class parameters and comprising multiplex logic to select a cell based on the identified class and/or sub-class parameters. The circuit may comprise a memory field that the print apparatus logic circuit is to associate with a print material level, wherein the circuit may be configured to, when a value in the field represents an at least approximately half full reservoir, in response to receiving second class parameters and certain operational calibration parameters, and subsequently a series of sub-class parameters, return a corresponding series of smoothly varying count values without any significant step change of more than 10 counts between subsequent outputs. The circuit may comprise a memory, storing a count that represents the number of sub-classes of at least two classes. The circuit may include different classes of cells wherein the count represents the number of cells in each of two different cell arrays of different classes. The circuit may be configured to indicate the number of sub-classes in response to a request directed to a first address and also in response to a request directed to the second address. The circuit may store the count as part of digitally signed data, wherein the digitally signed count is provided in response to the request directed to the first address. The circuit may be configured to communicate via a first and/or second and/or new communications address, which addresses have a standard I2C address format. The circuit may be configured to be associated with a single print component by the print apparatus logic circuit, comprising at least two communication addresses of 7 or 10 bits. The circuit may include a serial bus interface comprising at least a data path, power path, ground and a clock path to connect to the print apparatus logic circuit. The circuit may comprise a read buffer to output the count values. The circuit may be configured to respond to different print apparatus commands including said parameters so that the print apparatus logic circuit decodes and accept the responses and is enabled to withdraw print material from the print apparatus component associated with the circuit to subsequently print images or objects. Each circuit may be for association with a different print material type, such as a different print agent colour, of the same printer platform, wherein second addresses of the different packages are the same. The circuit may be configured to output, for each class value, count values in a count value range, a highest or lowest output count value of the range for certain calibration parameter values associated with respective calibration parameter functions, in-range count values between, and having at least one count distance from, the highest and lowest output count value for certain other, operational, calibration parameter values associated with the same respective calibration parameter function. The circuit may be configured to, in a series of command-responses, vary the in-range count values upon receiving varying operational calibration parameter values. The circuit may be configured to, output in-range count values in response to different class parameter values based on different operational calibration parameters. The circuit may be configured to, in a series of command-responses, vary in-range count values for a sequence of different sub-class parameter values, the sequence preceded by the same class parameter value. The count value range may correspond to a natural number of bytes. The circuit may be configured to output a different count value with respect to a previous count value, in response to receiving at least one different parameter value with respect to a previously received parameter value of the same parameter function. The circuit may include at least one sensor cell to detect an effect of a pneumatic stimulus, wherein the circuit may be configured to, when receiving a class parameter value associated with a first class, condition the count value depending on a state of the at least one sensor cell. The circuit may be configured to, when the class parameter value is associated with the first class, and upon receiving certain operational calibration parameter values and certain sub-class parameter values, output lower count values when a pneumatic stimulus is detected as compared to higher count values when no pneumatic stimulus is detected. The circuit may be configured to when receiving a class parameter value associated with a second class, and a series of certain varying sub-class parameter values, output (i) first count values, associated with the sub-class parameter values, and, (ii) after print liquid in a replaceable print component has been extracted, second count values, higher than the first count values, associated with the same sub-class parameter values. The circuit may be configured to, for a certain print liquid level, when receiving a class parameter value associated with a second class, and a series of subsequent different sub-class parameter values, for a partly depleted print liquid reservoir, output second count values, higher than a certain threshold, associated with a sub-set of the sub-class parameter values of the series, and first count values, lower than said threshold, associated with the rest of the series of sub-class parameter values. The circuit may include a processor and a memory storing at least one base key and instructions to instruct the processor to cryptographically authenticate responses using the base key, in response to authenticated commands to the first communications address outside of said time period. The circuit may include a timer or delay circuit to run the time function.

The circuit may comprise a first sensor to detect a pneumatic stimulus or pressurization applied by a print apparatus, and an interface including contact pads to connect to a voltage and/or data source of the print apparatus logic circuit, the sensor circuit configured to output signals conditioned by the pneumatic stimulus or pressurization via the contact pads. The first sensor may be configured to detect an air impulse applied to the print apparatus to an associated print material reservoir. The print material may be print liquid and the first sensor may be configured to detect a pressure event to increase pressure in the print material reservoir to push-prime print liquid out of the reservoir towards the print apparatus. The circuit may be configured to, in enabled and/or powered state, output a different voltage during the pneumatic stimulus as compared to a point in time when the effect of the pneumatic stimulus has substantially ceased. The circuit may be configured to, in enabled and/or powered state, output a lower voltage during the pneumatic stimulus as compared to a point in time when the effect of the pneumatic stimulus has substantially ceased. The circuit may be configured to, in enabled and/or powered state, output a different voltage at a higher internal reservoir pressure or more than 7 kPa gauge pressure as compared to gauge pressure in the reservoir of approximately zero or lower. The circuit may be configured to, in enabled and/or powered state, output a lower voltage at a higher internal reservoir pressure or more than 7 kPa gauge pressure as compared to gauge pressure in the reservoir of approximately zero or lower. The circuit may comprise a digital to analogue and/or analogue to digital converter, the sensor circuit configured to output digital count values and to decrease a digital output value in response to the pneumatic stimulus as compared to outside of a pressure event when the effect has substantially ceased. The first sensor may comprise at least one cell configured to change a voltage output at a deflection. The circuit may be configured to detect when at least one of a start-up prime, a supply change prime, and a printhead recovery squish prime is applied to the print material container. The circuit may be configured to base the output on a signal of the first sensor upon receiving an associated first class parameter via the interface. The circuit may be configured to identify a plurality of class parameters and to base the output on a different sensor, and/or different data or a different algorithm, upon receiving a second class parameter via the interface. The circuit may be configured to identify a plurality of sub-class parameters, upon receiving the first class parameter and subsequently a plurality of sub-class parameters, vary the output based on one sensor signal for all sub-class parameters, or a respective one of a plurality of cells of the first sensor for each sub-class parameter. The circuit may be configured to, upon receiving a first class parameter and a plurality of different sub-class parameters, output a plurality of different signals associated with the same pneumatic stimulus. The circuit may be configured to, upon receiving the first class parameter and the same sub-class parameter at subsequent points in time during a pneumatic stimulus cycle, output a different signal at each corresponding time. The different output signals may correspond to different reservoir pressures. The circuit may be configured to, upon receiving a second class parameter and subsequently again the same sub-class parameters, provide different outputs than for the first class parameter. The output may, upon receiving the second class parameter, be associated with a print material depletion. The circuit may comprise a print material sensor. The circuit may be configured to, upon receiving the second class parameter, base the output on a signal of the print material sensor. The first sensor may include an elongate cell or cell array having a length at least five times, ten times or twenty times greater than a width and/or thickness. The circuit may comprise a thin film stack comprising the first sensor and having said elongate shape. The first sensor may comprise an array of sensor cells. The circuit may be configured to identify class and sub-class parameters and to select the first sensor based on a first class parameter and the cells based on the sub-class parameters. The cells in the array may be nominally the same. The array may include at least 10, 20, 40, 100, 120 or at least approximately 126 cells. The cells may extend along a length of the first sensor. The first sensor may comprise at least one strain gauge. The first sensor may comprise at least one of a pressure sensor; a strain gauge; a metal slug inside of an inductor; a manometer; an accelerometer; an optical sensor to detect liquid displacement as a result of the pneumatic stimulus; a diaphragm or slug connected to a switch; and a mechanically actuated switch actuated by air displacement. The circuit may be configured to receive, in addition to class and/or sub-class parameters to use the first sensor, calibration parameters and condition the output based on these calibration parameters. The circuit may comprise calibration logic to calibrate the output based on the calibration parameters. The circuit may comprise at least one further, different, sensor including at least one of a print material level sensor, diode, and resistor. The circuit may comprise, in addition to said first sensor, a print material level sensor, crack detect sensor and/or absolute temperature sensor. The circuit may be configured to receive class parameters and associate each class parameter with a different one of said sensors. The at least one different sensor may be of a different class than the first sensor comprises only one cell. The circuit may comprise, in addition to the first sensor, at least one sensor cell array including at least approximately 10, 20, 40, 100, 120 or 126 cells. The first sensor may comprise first sensor cells, and the circuit may further comprise a print material level sensor cell array having the same amount of cells as the first sensor cells. The sensors of different classes may be nominally different sensors having different electrical characteristics. The different sensors may be provided on the same substrate. The substrate may be a thin film substrate to a support thin film circuitry comprising the different sensors. The circuit may comprise a print material sensor including at least one temperature sensor cell, and at least one corresponding heater cell to heat the temperature sensor cell; the sensor circuit configured to set a heat level and/or time of a heater cell based on corresponding received calibration parameters, and output a signal representative of the temperature of the corresponding temperature cell. The circuit may comprise cells of different classes and common calibration logic to calibrate outputs of the different classes. The circuit may be configured to identify, from a command stream, a plurality of different calibration parameter functions, and for each of these calibration parameter functions a corresponding plurality of calibration parameter values; and condition the output based on the calibration parameter values in a way that is different for each calibration parameter function. The circuit may comprise different calibration logic functions comprising at least one of a converter between analogue and digital, an offset circuit, and a gain amplifier. The circuit may be configured to identify, from an input command stream, an offset and an amplifier parameter to change an output based on an offset parameter by an amount that is a function of the amplifier parameter. The circuit may be configured to output, for each received class parameter, count values in a count value range, a highest or lowest output count value of the range for certain calibration parameters, iin-range count values between, and having at least one count distance from, the highest and lowest output count value for certain other calibration parameters, wherein the other calibration parameters may herein be defined as operational calibration parameters. The circuit may be configured to, in a series of command-responses, vary the in-range count values upon receiving varying operational calibration values for the same class and/or sub-class parameters. The interface may be an I2C serial bus interface to connect to the print apparatus I2C communication bus. The circuit may be configured to receive communications via a first communications address, and in response to a command to enable a second communications address, enable the second communications address. The sensor circuit of any previous claim configured to, upon receiving a command including a time period via a default first communications address and a new communications address via a default second communications address, respond to commands directed to the new communications address until the end of a duration based on the time period. The circuit may be configured to output said signals based on the first sensor in response to commands sent over the default second communications address or new second communications address. The circuit may be configured to transmit, outside of said time period and in response to communications sent to the first address, communications that are authenticated using a key, and, during said time period and in response to communications sent to the second or new address, communications which are not authenticated using that key. The circuit may be configured to output signals of all of a plurality of different sensors in response to respective commands to the second address. The circuit may be configured to output digital count values in a range of count values and to clip a count value beyond the highest and/or lowest count value of the range. The circuit may comprise decoding logic to identify class, sub-class and calibration parameters. The circuit may be configured to condition the output based on identified parameters. The circuit may comprise sensors of different classes, some of the sensors comprising a plurality of cells associated with different sub-classes, and calibration logic of different functions, wherein the decoding logic is configured to select each sensor, sensor cell and calibration logic function based on the received parameters. The decoding logic may be configured to set the respective calibration function based on the received calibration value. The decoding logic may comprise at least partly hard-wired decoding logic including at least one of a shift register arrangement, and/or for example at least one of multiplexers, flip-flops and latches, and/or resettable or over-writable memory arrays to load the parameters and set or select the different cells and/or functions. The circuit may be configured to output different count values in a range defined by a lowest and highest count values and a plurality of count values in between, wherein the lowest output count value of the range is a binary representation of 0 and the highest output count value is a binary representation of a maximum number of values that can be represented by a natural number of bytes, minus 1, for example 255 or 65535. The circuit may be configured to, in response to receiving certain operational calibration parameters associated with in-range output count values, and a first class parameter corresponding to the first sensor, output at least one relatively low count value when the first sensor detects the effect of an external pneumatic stimulus or pressurization, and at least one relatively high count value when no effect of the external pneumatic stimulus or pressurization is detected by the first sensor. The circuit may be configured to, in response to receiving certain operational calibration parameters associated with in-range output count values, configured to, for a certain print material level, in response to receiving a second class parameter, certain operational calibration parameters for that class, and a series of different sub-class parameters, output higher count values, associated with a sub-set of cell selections, and lower count values, associated with the rest of the series cell selections.

A further feature includes a plurality of circuits wherein the first addresses of the different circuits are different. In the plurality of circuits each sensor circuit may be to be associated with a different print material type, such as a different print agent color, for the same printer platform, configured to respond to communications via a default first and a different default second communications address wherein the default second communications address of the different sensor circuits is the same and the default first communications address of the different sensor circuits is different.

Further features for combination or association with any of the aforementioned features and/or aspects may include a replaceable print apparatus component. The component may be a print liquid cartridge or container. The component may have a print liquid reservoir with a print liquid output, the component to output liquid from the reservoir through the liquid output, to a print apparatus having a printhead, whereby the component may comprise the circuit, for example, have the circuit mounted thereto. The component may comprise a socket or clearance to receive or clear an air pen of the print apparatus. The component may comprise an air input to connect to an air output of the print apparatus. The air input may be connected to a pressure structure whereby the pressure structure pressurizes the liquid reservoir by receiving pressurized air from the print apparatus air interface. The reservoir may be defined by relatively rigid walls, wherein the sensor to detect an effect of a pneumatic event may be positioned at, and/or may be in contact with, at least one of an interior of the reservoir wall, an exterior of the reservoir wall, a reservoir pressurization structure, an air input, a clearance to clear an air pen, and a liquid output. The effect of the pneumatic event may include at least one of a changing pressure in the reservoir or liquid output; a deflection or stress change of a portion of a reservoir wall; displaced air in or around an air interface and/or pressure structure; and displacement of part of a pressure structure; and temporarily increased print material output flow. The reservoir may be for liquid. The component may have a height that is greater than a width and a length that greater than the height, the width extending between two sides. The circuit may comprise interface pads for communicating with the print apparatus logic circuit and the interface pads can be provided at an inner side of one of the sides facing a cut-out for a data interconnect to be inserted. The interface pads may extend along a height direction near a top and front of the component, and the liquid and air interface of the component may be provided at the front on the same vertical reference axis parallel to the height direction wherein the vertical axis is parallel to and distanced from the axis that intersects the interface pads. The liquid reservoir may be defined by relatively rigid walls. The sensors and/or cells may be provided inside the liquid reservoir. The circuit may be provided along an inner side wall of the reservoir. The component may not include a printhead. The circuit may be configured to generate at least one first count value in response to receiving a corresponding at least one sub-class parameter, preceded by a first class parameter and certain first operational parameters and when a pneumatic stimulus is applied to the replaceable print component, and at least one second count value higher than the at least one first count value in response to receiving the same at least one sub-class parameter, preceded by the first class parameter and the first operational parameters and when no pneumatic stimulus is applied to the replaceable print component. The replaceable print component may comprise a sensor to detect the pneumatic stimulus, the circuit configured so that a state of the sensor determines the output count values associated with the first class parameter. The replaceable print apparatus component may comprise a print liquid reservoir, an air input socket to receive an air pen of a print apparatus, and a liquid output to deliver the liquid through the liquid output towards a printhead of the print apparatus. The circuit may be configured to upon receiving the second class parameter, and said series of varying sub-class parameters, generate (i) first count values, associated with the sub-class parameters, and, (ii) after print liquid has been extracted from a reservoir of the component, second count values, higher than the first count values, associated with the same series of sub-class parameters. The circuit may be configured to, upon receiving a third class parameter and certain third operational calibration parameters and/or a fourth class parameter and certain fourth operational calibration parameters, generate one count value associated with the third class and/or one count value associated with the fourth class, irrespective of any sub-class parameters that are communicated between the third and/or fourth class parameters and the corresponding read request. The air input may, in use, connect to a print apparatus air output, wherein the pneumatic stimulus comprises receiving pressurized air through the air input from the print apparatus air output. The pressure structure may be adapted to provide for a back pressure in an operational state and when no pressurized air is applied. The first sensor may be configured to respond to a change of pressure inside the reservoir of at least 7, 13 or 20 kPa in less than 3 seconds. The first sensor may comprise at least one strain sensing cell and is mounted to a wall of the reservoir. The circuit may be configured to respond with a different count value in response to a read request when there is a normal operating gauge pressure inside the reservoir of between approximately −10 and approximately 0 kPa as compared to when the gauge pressure in the reservoir is higher than 7 kPA, higher than 14 kPA or higher than 20 kPA. The circuit may be configured to output a higher count value at said normal operating gauge pressure than at said higher pressure, at least after receiving certain operational calibration parameters. The circuit may be configured to upon receiving a second class parameter, and a series of varying sub-class parameters, generate (i) first count values, associated with the sub-class parameters, and, (ii) after print material has been extracted from the reservoir, second count values, higher than the first count values, associated with the same sub-class parameters. The first sensor may be provided in the inside of the reservoir, for example against an inner side wall. The rest of the circuit may also be provided against the inner side wall. The first sensor may be provided outside of the reservoir. The first sensor may be provided at an air input interface to sense that pressurized air is applied to the air input socket by a host print apparatus. The first sensor may be provided at a print material output interface to sense that print material in the reservoir is pressurized by the host print apparatus. Sensor cells may be covered by print material in the reservoir. The component may comprise a relatively hard-shell print liquid reservoir. The first sensor may extend inside the reservoir vertically along a front, closer to the front than the back, along a side, closer to one side than an opposite side of the reservoir. The component may comprise connecting circuitry between the interface and the rest of the sensor circuit wherein the connecting circuitry extends from the outside to the inside of the print liquid reservoir. The first sensor may be configured to detect a leakage of the reservoir during a pneumatic stimulus, pressurization and/or prime event.

The circuit of certain of the foregoing aspects and features may be for an at least partially collapsible print material reservoir. Such circuit may comprise a communication interface to connect to a host print apparatus logic circuit, and a first sensor to detect a pressure, pressure change or displacement in the reservoir, and the circuit may be configured to generate signals associated with a reservoir collapse via the communication interface, and condition the signals to correspond to a print material depletion. An at least partially collapsible print material reservoir, or box with such reservoir, may be provided comprising any of the aforementioned example circuits.

What is claimed is:

1. A logic circuitry package for a replaceable print component, the logic circuitry package comprising:
   an interface to communicate with a host logic circuit of a host; and
   at least one logic circuit to:
      identify, from a command stream received from the host logic circuit, parameters including a class parameter,
      identify, from the command stream, a read request, and
      output, via the interface, a count value in response to the read request, the count value based on the class parameter.

2. The logic circuitry package of claim 1, wherein the at least one logic circuit is configured to:
   identify a calibration parameter, and
   condition the count value based on the calibration parameter.

3. The logic circuitry package of claim 1, wherein the at least one logic circuit is configured to:
   identify, from the command stream, a sub-class parameter, and
   output, in response to the read request, the count value based on the last-received class parameter and sub-class parameter.

4. The logic circuitry package of claim 1, further including a plurality of cell arrays, wherein cells of a single array have approximately the same nominal characteristics, the at least one logic circuit configured to base count values on electrical characteristics of selected cells, wherein a difference in count values are associated with, for at least one class, at least one of different positions of different cells along a print material reservoir wall, or, for at least one other class, increasing parasitic resistance along a length of the selected cell array.

5. The logic circuitry package of claim 1, wherein the at least one logic circuit is configured to:
   identify a first or second class parameter associated with a first or second class,
   upon identifying the first or second class parameter, select a respective first or second class,
   identify a series of sub-class parameters and read requests while the respective first or second class is selected, and, in response to each read request, output a count value for each corresponding selected subclass,
   identify a third or fourth class parameter associated with a third or fourth class, and
   upon identifying the third or fourth class parameter and a subsequent read request, output a respective count value, wherein any sub-class parameter received between receiving the third or fourth class parameter and read request does not affect the output count value.

6. The logic circuitry package of claim 1, wherein the at least one logic circuit is configured to identify class and sub-class parameter values in respective data frames based on a bit set including the least significant bit, while values of at least one other bit in the same data frame including the most significant bit do not affect the output count value or pertain to a different logic function.

7. The logic circuitry package of claim 1, wherein the at least one logic circuit is configured to generate the count value using received parameters and based on at least one, or a combination, of:
   a look-up table (LUT),
   an algorithm, and
   a physical sensor cell.

8. The logic circuitry package of claim 1, wherein the at least one logic circuit is configured to consult a sensor cell to detect a pneumatic stimulus upon identifying a first class parameter, and to relate a sensor signal of the sensor cell and other received parameters to the count value.

9. The logic circuitry package of claim 8, wherein the at least one logic circuit is configured to consult the sensor cell upon identifying a second class parameter, and to relate the sensor signal and other received parameters to the count value.

10. The logic circuitry package of claim 1, configured to:
receive a command including a time period via a first address, and
receive a new address via a default second address of the logic circuitry package, and, in response, respond to commands directed to the new address, at least until the end of a duration associated with the time period.

11. The logic circuitry package of claim 1, configured to:
receive a command specifying a time parameter, the command directed to a first, default I2C communications address of the logic circuitry package which is to distinguish the replaceable print component from other components installed in the host, and,
in response to the command, enable the processing of a command stream directed to a second default and/or new I2C communications address for a duration based on the time parameter.

12. The logic circuitry package of claim 11, wherein the at least one logic circuit is configured to, in response to the command stream to the second address, for different parameters associated with different functions, apply the last received parameter for conditioning the output until the at least one logic circuit receives a new respective parameter, at least for the duration.

13. The logic circuitry package of claim 11, wherein the command stream is directed to the second and/or new I2C communications address, and the logic circuitry package is configured to, after the duration, process commands directed to the first I2C communications address.

14. The logic circuitry package of claim 11, wherein the at least one logic circuit is configured to identify, from the command stream, a plurality of different calibration parameters associated with different calibration functions, and condition count values based on these different calibration parameters.

15. The logic circuitry package of claim 1, wherein the at least one logic circuit is configured to:
identify parameters in a command stream,
identify respective parameters by a parameter function and a parameter value in a command,
select a class and sub-class, and set calibration functions in accordance with respective different parameter functions and accompanying parameter values, and
respond to respective read requests with an output count value based on the last identified functions and values.

16. The logic circuitry package of claim 1, wherein the at least one logic circuit is configured to:
in response to identifying a first class parameter associated with a first class, and a series of different sub-class parameters, respond with in-range count values for first calibration parameters, and
in response to identifying a second class parameter associated with a second class, and a series of different sub-class parameters, respond with in-range count values for second calibration parameters that include at least one different calibration parameter than the first calibration parameters.

17. The logic circuitry package of claim 1, further including a sensor to detect an effect of a pneumatic stimulus, the at least one logic circuit configured to consult the sensor in response to identifying a class parameter associated with a first class.

18. The logic circuitry package of claim 17, wherein the at least one logic circuit is configured to:
consult the sensor in response to identifying a sub-class parameter and read request, and
in response to identifying the class parameter associated with the first class, output relatively low count values when the sensor detects the effect of an external pneumatic stimulus, and higher count values when no effect of the pneumatic stimulus is detected.

19. The logic circuitry package of claim 17, wherein the sensor is configured to detect a deformation of a reservoir wall and/or a pressure in a liquid reservoir.

20. The logic circuitry package of claim 1, wherein the at least one logic circuit is configured to associate one of a plurality of classes with a single resistor that is part of the at least one logic circuit, the resistor being part of thin film circuitry including a sensor assembly of which the resistor is part, and configured to detect cracks in the thin film circuitry.

* * * * *